US012638664B2

(12) United States Patent
Pandit et al.

(10) Patent No.: US 12,638,664 B2
(45) Date of Patent: May 26, 2026

(54) INBUILT MICROSCOPY WITH LIGHT GUIDING ELEMENTS FOR SMARTPHONE AND OTHER DEVICES

(71) Applicant: REVOLTEQ TECHNOLOGIES PRIVATE LIMITED, Gujarat (IN)

(72) Inventors: Aniruddha Bhalchandra Pandit, Maharashtra (IN); Jayeshkumar Sevantilal Mevada, Gujarat (IN)

(73) Assignee: REVOLTEQ TECHNOLOGIES PRIVATE LIMITED, Gujarat (IN)

( * ) Notice: Subject to any disclaimer, the term of this patent is extended or adjusted under 35 U.S.C. 154(b) by 636 days.

(21) Appl. No.: 18/001,957

(22) PCT Filed: May 28, 2021

(86) PCT No.: PCT/IN2021/050523
§ 371 (c)(1),
(2) Date: Dec. 15, 2022

(87) PCT Pub. No.: WO2021/240551
PCT Pub. Date: Dec. 2, 2021

(65) Prior Publication Data
US 2023/0228982 A1     Jul. 20, 2023

(30) Foreign Application Priority Data
May 28, 2020    (IN) ............................. 202021003723

(51) Int. Cl.
*G02B 21/00*          (2006.01)
*G02B 21/02*          (2006.01)
(Continued)

(52) U.S. Cl.
CPC ......... *G02B 21/0008* (2013.01); *G02B 21/02* (2013.01); *G02B 21/06* (2013.01); *G02B 21/08* (2013.01); *G02B 21/241* (2013.01)

(58) Field of Classification Search
CPC ........ G02B 21/02; G02B 21/06; G02B 21/08; G02B 21/241; G02B 21/0008; G02B 21/082; G02B 21/24; G02B 21/361
See application file for complete search history.

(56) References Cited

U.S. PATENT DOCUMENTS

2006/0192081 A1     8/2006   Cartlidge et al.
2011/0085032 A1     4/2011   Kim
(Continued)

FOREIGN PATENT DOCUMENTS

CN          110286481 A  *  9/2019   ............... G02B 1/00
WO          2006083081      8/2006
(Continued)

OTHER PUBLICATIONS

"International Application No. PCT/IN2021/050523, International Preliminary Report on Patentability mailed Nov. 17, 2022", (Nov. 17, 2022), 7 pgs.
(Continued)

*Primary Examiner* — Jia X Pan
(74) *Attorney, Agent, or Firm* — Schwegman Lundberg & Woessner, P.A.

(57)          ABSTRACT
The present subject matter described an optical microscopy device (3) for a portable imaging system, such as a smartphone. The optical microscopy device (3) comprises an optical lens assembly with eight to fifteen lens elements. The optical lens assembly has an optical magnification in a range of about 1× to about 7.8×, an airy radius in a range of about 3 micron to about 23.25 micron, a depth of field in a range of about 20 micron to about 338 micron, a numerical aperture in a range of about 0.015 to about 0.115, a half field of view in a range of about 12 degrees to about 30 degrees, and a length in a range of about 6.5 millimeter (mm) to about 57 mm.

20 Claims, 39 Drawing Sheets

(51) Int. Cl.
    *G02B 21/06*         (2006.01)
    *G02B 21/08*         (2006.01)
    *G02B 21/24*         (2006.01)

(56)            References Cited

U.S. PATENT DOCUMENTS

| | | | |
|---|---|---|---|
| 2014/0267670 A1 | 9/2014 | Tipgunlakant et al. | |
| 2015/0103413 A1* | 4/2015 | Uchida .................. | G02B 13/18 |
| | | | 359/694 |

FOREIGN PATENT DOCUMENTS

| | | |
|---|---|---|
| WO | 2014046126 | 3/2014 |
| WO | WO-2017068501 A1 | 4/2017 |
| WO | WO-2019002873 A1 | 1/2019 |
| WO | WO-2021240551 A1 | 12/2021 |

OTHER PUBLICATIONS

"International Application No. PCT/IN2021/050523, International Search Report and Written Opinion mailed Sep. 1, 2021", (Sep. 1, 2021), 10 pgs.

"International Application No. PCT/IN2021/050523, Notification of Publication of Corrected Priority Claim mailed Mar. 16, 2022", (Mar. 16, 2022), 3 pgs.

"Japanese Application No. 2023-506352, Office Action dated May 20, 2025", w English Decision, (May 20, 2025), 6 pgs.

"European Application No. 21736057.7, Office Action dated Dec. 1, 2025", Dec. 1, 2025, 6 pgs.

Anonymous, "Properties of Microscope Objectives | MicroscopyU en-US", Retrieved from the Internet URLhttpsweb.archive.orgweb20200417061918 httpswww.microscopyu.commicroscopy-basics properties-of-microscopeobjectives [retrieved on Mar. 22, 2024], Apr. 17, 2020, 9 pgs.

Anonymous, "Olympus Microscopy Resource Center Anatomy of the Microscope—Magnification", XP055337727, Retrieved from the Internet URLhttpsweb.archive.org web20070225122007 httpwww.olympusmicro.comprimeranatomymagnification.html [retrieved on Jan. 23, 2017], Feb. 25, 2007, 6 pgs.

Rainer, Wegerhoff, "Basics of Light Microscopy Imaging and Imaging Microscopy", XP055825048, [retrieved on Jul. 16, 2021], Jan. 20, 2011, 56 pgs.

* cited by examiner

3

3-1     3-2        3-N

INBUILT MICROSCOPY WITH LIGHT GUIDING ELEMENTS FOR SMARTPHONE AND OTHER DEVICES

PRIORITY CLAIM TO RELATED APPLICATIONS

This application is a U.S. national stage filing under 35 U.S.C. § 371 from International Application No. PCT/IN2021/050523, filed on 28 May 2021, and published as WO2021/240551 on 2 Dec. 2021, which claims the benefit under 35 U.S.C. 119 to India application No. 202021003723, filed on 28 Jun. 2020, the benefit of priority of each of which is claimed herein, and which applications and publication are hereby incorporated herein by reference in their entirety.

TECHNICAL FIELD

The present subject matter relates to inbuilt optical microscopy devices with light guiding elements for smartphones and other portable imaging systems or devices. More specifically, the present subject matter relates to smartphones or other portable imaging systems or devices with integrated microscopy features and wavelength-guiding characteristics that allows light of a desirable wavelength to pass through as per the required light sensing applications. The said optical microscopy devices, smartphones, and portable imaging systems can be used for the quantitative and qualitative analysis of micron size objects in a desirable wavelength of the light or objects that emit light of a specific wavelength.

BACKGROUND

The smartphone and other portable computing devices can be considered as the pinnacle of consumer technology of the modern Information Age. A standard smartphone is a portable computer with a digital camera, a high-resolution display, a range of remote sensors, an audio-visual interfacing, and an Internet access and interconnectivity. This is all combined in an accessible package with constantly evolving software and associated applications.

Microscopes are generally used to view objects that are too small to be seen by the unaided eye. Optical microscopes use visible light and an assembly of optical lenses to magnify images of small objects. Optical microscopes are used in observing small structures, determining pathology, and diagnosing diseases. The conventional portable microscopy assemblies are available in the form of external optical attachments to the smartphones or other portable computing devices. But it has several limitations. The external optical attachments for the microscopy functionality have limitations as they have limited field of view, are bulky, are not compatible for all digital device, and are not user-friendly for focusing and microscopy. The microscopy performance of the conventional optical attachments varies with respect to different models of smartphones with different quality of cameras. The external optical attachments for smartphones are not user-friendly because the location of the camera varies across smartphones.

US20110085032A1 discloses a microscope camera, where the camera comprises: a lens unit including a plurality of lenses for enlarging an object; an illumination unit for illuminating the object; a camera module configured to receive an enlarged light image of an object from the lens unit, convert the image to an electrical signal, and convert the electrical signal to a DC data; and an interface unit configured to connect the camera module to a mobile terminal for transmitting the DC data to the mobile terminal. The interface unit may be a USB interface configured to be connected to the mobile terminal via a USB [Universal Serial Bus] cable.

US20140267670A1 discloses systems and methods for implementing a mobile microscopy tool using a mobile computing device, such as a smartphone, and the associated image acquisition and analysis functionality. The image acquisition optics may incorporate any well-known and commercially available optical components, such as one or more objective lenses, pupils, etc., positioned in the optical path of the camera to enable the camera to acquire a high-resolution image of the removable medium.

Furthermore, most of the external optical attachments for smartphones have a fixed optical system; hence, it has limitation for focusing of objects of variable sizes on the same plane. The external optical attachment for the microscopic functionality makes it inaccessible to users for qualitative & quantitative estimation of objects.

Furthermore, some of the objects has ability to emit light rays of specific wavelengths that are characteristic of the respective objects and are therefore useful for qualitative and quantitative analysis of such objects. This said characteristic feature of light is useful in the diagnosis of many pathological samples, for example, a biomarker-dye complex. Most of the external optical attachments for portable microscopy are not affordable.

Therefore, to overcome the problems/limitations said in the prior art, there is a need to develop optical microscopy devices for enabling the inbuilt microscopy feature in smartphones and other portable imaging systems. In addition to the inbuilt microscopy feature, the features of light guiding, variable imaging resolution, variable depth of field, variable optical magnification, and wide field of view are also desirable to be enabled. Furthermore, the inbuilt microscopy feature with the variable optical magnification, and the variable depth of field facilitate in increasing the flexibility to view a wide range of objects using the smartphones and the portable imaging systems. The smartphones and other portable imaging systems with the integrated microscopy feature, the light guiding feature makes them accessible to users, such as researchers, pupils, and professionals for education purposes, onsite diagnosis, and in qualitative and quantitative analysis of objects.

OBJECTS OF THE PRESENT SUBJECT MATTER

The principal object of the present subject matter is to overcome all the mentioned and existed drawbacks of the prior arts by providing inbuilt microscopy with light guiding to smartphones and other portable imaging systems or devices.

The main objective of present subject matter is to provide a smartphone or other portable imaging systems or devices with inbuilt microscopy features with light guiding characteristics without any external attachment.

Another objective of present subject matter is to provide a smartphone or other portable imaging systems or devices with inbuilt microscopy features, such as variable depth of field, variable optical magnification, variable resolution without any optical and spherical aberrations.

Yet another objective of present subject matter is to provide a smartphone or other portable imaging systems or devices with integrated microscopy features for automated qualitative and quantitative estimation of any object that is not visible to the naked eye.

Yet another object of the present subject matter is to provide a smartphone or other portable imaging systems or devices with integrated microscopy features of variable depth of field, resolution and depth of focus with self or controlled focusing ability for objects of variable size.

Yet another object of the present subject matter is to provide an optical microscopy device for light field and filter field microscopy functionality having optical magnification from 1× to 7.8×.

BRIEF DESCRIPTION OF THE DRAWINGS

The foregoing summary, as well as the following detailed description of the present subject matter, is better understood when read in conjunction with the appended drawings. For the purpose of illustrating the present subject matter, exemplary constructions of the present subject matter are shown in the drawings. However, the present subject matter is not limited to the specific process and structures disclosed herein. The description of a process step or a structure referenced by a numeral in a drawing is applicable to the description of that method step or structure shown by that same numeral in any subsequent drawing herein.

DETAILED DESCRIPTION

Figure 1A:
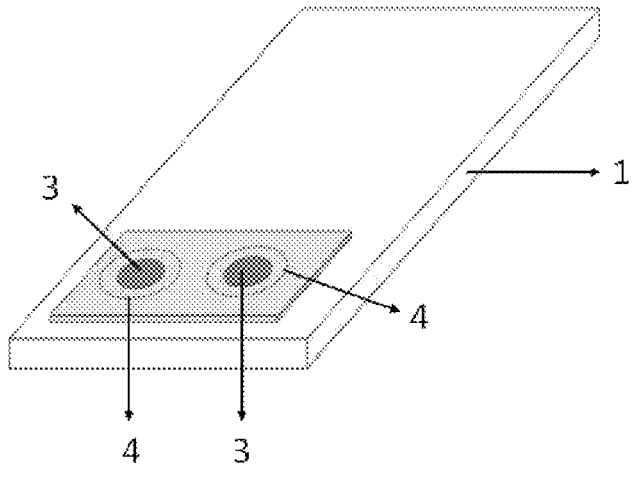
FIGS. 1a and 1b show portable imaging systems with two optical microscopy devices, in accordance with the present subject matter.

Detailed embodiments of the present subject matter are disclosed herein, however, it is to be understood that the disclosed embodiments are merely exemplary of the present subject matter, which may be embodied in various forms. Therefore, specific functional and structural details disclosed herein are not to be interpreted as limiting, but merely as a basis for the claims and as a representative basis for teaching one skilled in the art to variously employ the present subject matter in virtually any appropriately detailed structure.

The present subject matter overcomes the aforesaid drawbacks of conventional devices. The objects, features, and advantages of the present subject matter will now be described in greater detail. Also, the following description includes various specific details and is to be regarded as merely exemplary. Accordingly, those of ordinary skill in the art will recognize that: without departing from the scope and spirit of the present disclosure and its various embodiments there may be any number of changes and modifications described herein.

It must also be noted that as used herein and in the appended claims, the singular forms "a", "an," and "the" include plural references unless the context clearly dictates otherwise. Although any systems and methods similar or equivalent to those described herein can be used in the practice or testing of embodiments of the present subject matter, the preferred, systems are now described.

Unless defined otherwise, all technical and scientific terms used herein have the same meaning as commonly understood by one of ordinary skill in the art to which the present subject matter belongs.

The word "system" and "device" may be used interchangeably through the disclosure. In addition to the features and components described herein, the systems or the devices may include one or more other components, such as a process, a memory, an interface, a display screen, an image capturing unit, a graphical user interface.

Throughout the disclosure, term 'assembly' or 'smartphone' or 'smartphone with integrated microscopy features' used herein refers to an instrument that contain a built-in camera lens assembly, a camera, and a display screen to produce a simple microscope platform; a digital image capturing assembly; or a device for qualitative or quantitative estimation. The terms 'assembly', 'smartphone' and 'smartphone with integrated microscopy features' can be used interchangeably throughout the specification.

Throughout the disclosure, term 'other device' or 'other device with integrated microscopy features' used herein refers to an image capturing assembly, a digital portable device for image capturing or any of digital device for observation of object. The terms 'other device' and 'other device with integrated microscopy features' can be used interchangeably throughout the specification.

The present subject matter discloses optical microscopy devices for enabling integrated microscopy and light guiding features in a portable imaging system, such as a smartphone and other devices. The optical microscopy devices with the light guiding feature allow light of a desirable wavelength to pass through, as per the required light sensing applications. The integrated microscopy features include variable depth of field, resolution, field of view, and magnification. The light guiding feature can be used for the quantitative and qualitative analysis of micron-size objects that emit the light. The light guiding feature can also be used for observing micron-size objects under the light of a desirable wavelength. The term "micron" herein may be understood as micrometer (μm).

The optical microscopy devices of the present subject matter are compact and allow for inbuilt light field and filter field microscopy with variable optical magnification, resolution, field of view, and high depth of field microscopy functionality. The optical microscopy device of the present subject matter is used in a portable imaging system. The portable imaging system may include, but is not limited to, a smartphone, a mobile phone, a portable computing device, a portable medical device, a portable microscope, or a portable analytical instrument. The portable computing device may include, but is not limited to, a laptop, a netbook, a notebook, a sub-notebook, a tablet computing device, and an Ultrabook computer. The portable medical device may include, but is not limited to, a small pocket size medical device, an analytical instrument, a diagnosis device, and a quantitative and qualitative analytical instrument. The portable microscope may include, but is not limited to, a pocket size portable microscope and a portable digital microscope device.

The optical microscopy device of the present subject matter comprises multiple elements, which are sequentially arranged from the object side to the image side for the microscopy functionality in portable imaging systems, such as the smartphones and/or other devices.

In an example of the present subject matter, the optical microscopy device includes an optical lens assembly with eight to fifteen lens elements. The multiple lens element in the optical microscopy device provide microscopy features such as variable optical magnification, resolution, field of view, and high depth of field. The optical lens assembly has an optical magnification in a range of about 1× to about 7.8×, an airy radius in a range of about 3 micron to about 23.25 micron, a depth of field in a range of about 20 micron to about 338 micron, a numerical aperture in a range of about 0.015 to about 0.115, a half field of view in a range of about 12 degrees to about 30 degrees, and a length in a range of about 6.5 millimeter (mm) to about 57 mm.

In an example, the optical microscopy device includes a focusing unit with focusing mechanism for controlled focusing of object at various depth of fields. The focusing unit has a barrel, where the optical lens assembly of the optical microscopy device is disposed within the barrel of the focusing unit. The focusing unit is to operate the optical lens assembly for focusing while imaging an object.

In an example, the optical microscopy device includes a light guiding unit to pass light of a specific wavelength therethrough. The light guiding unit includes a wavelength specific optical filter. In an example, the light guiding element is a first lens element of the optical lens assembly configured as a wavelength specific optical filter. In another example, the light guiding element is a wavelength specific optical filter positioned between a first lens element and a second lens element of the optical lens assembly, or in front of the first lens element, or after the last lens element of the optical lens assembly, or between an adjacent pair of lens elements of the optical lens assembly.

In an example, the optical microscopy device includes a light source for light field and filter field microscopy. The light source is placed adjacent to the optical lens assembly to emit light such that the emitted light is incident on a sample held within a sample holder, when the sample holder is placed over the optical lens assembly.

In an example, the optical microscopy device includes an image capturing unit adjacent to the optical lens assembly to image an object in field of view of the optical lens assembly. The image capturing unit includes an image sensor or a camera having an image sensor/image sensor with a wavelength specific optical filter or an IR filter for light field and filter field microscopy. The image capturing unit may be a photo sensor or a camera with a pixel size in a range of 0.3 megapixel (MP) to 350 MP.

In an example, one or more optical microscopy devices are embedded in a portable imaging system, such as a smartphone as per the required features/applications, for example, wavelength selectivity, variable optical magnification, variable resolution, variable depth of field, etc. Multiple optical microscopy devices in the portable imaging system increase applicability of the portable imaging system towards imaging of micron-size objects or objects that emit light of a specific wavelength.

The optical microscopy devices may be embedded in the portable imaging system at any location forming patterns of various shapes, such as circular, hexagonal, square, or any other geometrical shape.

In an example, the lens elements of the optical microscopy device are made of materials, such as, but not limited to, plastic, glass, polymer, or any material having desirable refractive index and Abbe number.

In an example, the optical microscopy device of the present subject matter includes two or more correction lenses for correction of optical and spherical aberrations. The number, shape, position, spacing, and arrangement of the lens elements in the optical microscopy device of the present subject matter may vary depending on the desirable microscopy features, such as resolutions, field of view, optical magnification, depth of field, etc. The properties of the lens elements of the optical microscopy device, such as, but not limited to, power distribution, lens shapes, positions, materials, shape, thickness, spacing, aperture location, geometry, surface shape of lens element may be selected to reduce the optical, chromatic, spherical aberrations and the effect across the field of view including one or more of but not limited to lens flare, aberrations, field curvature etc. The optical microscopy device of the present subject matter may also include one or more aperture stops, arranged at specific positions between the lens elements, to correct the aberrations.

In an example, the lens elements in the optical microscopy device may have a positive refractive power or a negative refractive power. The lens elements may be aspheric, meniscus concave or convex in peripheral or axial region of any of the image or object side. The inflection point on the any of the surface of the lens element is located near to the image sensor or the object side. The inflection point may be such that it prevents the aberrations in the entire optical microscopy device.

In an example, the first and second lens elements collect the light from wide area, while the subsequent lens elements are used for the correction of the aberrations due to first and second lens elements. One or more subsequent lens elements may be used as correction lens element(s) for the better correction of optical and spherical aberrations. The subsequent two lens elements after the correction lens element(s) have positive refractive power and they play key role in optical magnification. These two lens elements have a greater light conversion ability and positive refractive power, hence, a greater chances of correction of optical and chromatic aberrations. The light guiding element is located in place of the first lens element, or located between the image sensor and the last lens element. In an example, the light guiding element may be an external element.

In an example, the optical magnification of the optical microscopy device is greater than 1× and more specifically the optical magnification is in range from 1× to 7.8×. The optical microscopy device provides a varying optical magnification to view objects of varying sizes and varying surface characteristics. Furthermore, variable magnification from 20× to 1000× or more than 1000× can achieve through the digital magnification or digital zooming. In an example, the image sensor may have a pixel size of about 0.5 to 6 microns.

The present subject matter describes a compact optical microscopy device for microscopy functionality. In an example, the optical microscopy device has a length in a range of about 5 mm to 60 mm, more particularly in a range of about 6.5 mm to about 57 mm, to fulfill demands of the compactness so as to fit within a portable imaging system, such as a smartphone.

In an example, the optical microscopy device provides integrated microscopy features with light-guiding characteristics, wherein the first lens element plays dual functionality of light guiding and protecting the lens element from physical and chemical stress. The first lens element comprises a layer structure where an outer layer comprises the scratch resistance and chemical resistance layer and a subsequent layer guides light of a specific wavelength. The intermediate layer has a high refractive index.

In an example, the light guiding element may include a glass filter, a color filter, or an optical filter, or a gelatin filter, or a dichroic filter, or any other optical filter.

In an example, the image capturing element may be an image sensor or a photo sensor made from an integrated circuit technology or a photosensor technology. The image sensor may be, but is not limited to, a CMOS sensor or a CDD sensor.

The present subject matter is further explained in detail with the help of drawings.

Figure 1B:
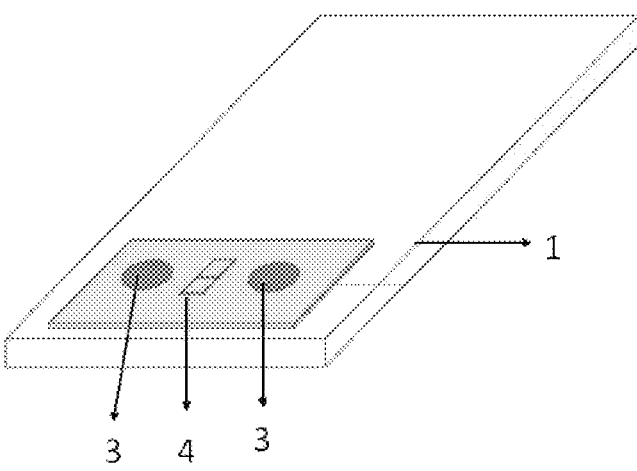

Referring to figures, FIGS. 1a and 1b show portable imaging systems 1 with two optical microscopy devices 3, 1 in accordance with the present subject matter. The portable imaging system 1 may include, but is not limited to, a smartphone, a mobile phone, a portable computing device, a portable medical device, a portable microscope, or a portable analytical instrument. The portable computing device may include, but is not limited to, a laptop, a netbook, a notebook, a sub-notebook, a tablet computing device, and an Ultrabook computer. The portable medical device may include, but is not limited to, a small pocket size medical device, an analytical instrument, a diagnosis device, and a quantitative and qualitative analytical instrument. The portable microscope may include, but is not limited to, a pocket size portable microscope and a portable digital microscopy device.

Although FIGS. 1a and 1b show two optical microscopy devices 3 in the portable imaging system 1, in an example, the portable imaging system 1 may include any number of optical microscopy devices 3. In an example, the portable imaging system 1 may include one to six optical microscopy devices 3.

Each optical microscopy device 3 is embedded inside the portable imaging system 1, for example, while manufacturing the portable imaging system 1. The optical microscopy device 3 may replace the existing camera lens assembly within the portable imaging system 1 or may be embedded as an additional unit for enabling microscopy feature in the portable imaging system 1.

In an example, each optical microscopy device 3 comprises a light source 4 arranged in periphery of the optical microscopy device 3. In another example, the light source 4 may be external to the optical microscopy device 3, as shown in FIG. 1b. The light source 4 may a white light source or a light source of specific and desirable wavelength. Some examples of the optical microscopy device 3 are illustrated and described with reference to FIGS. 2, 3a, and 3b.

Figure 2:
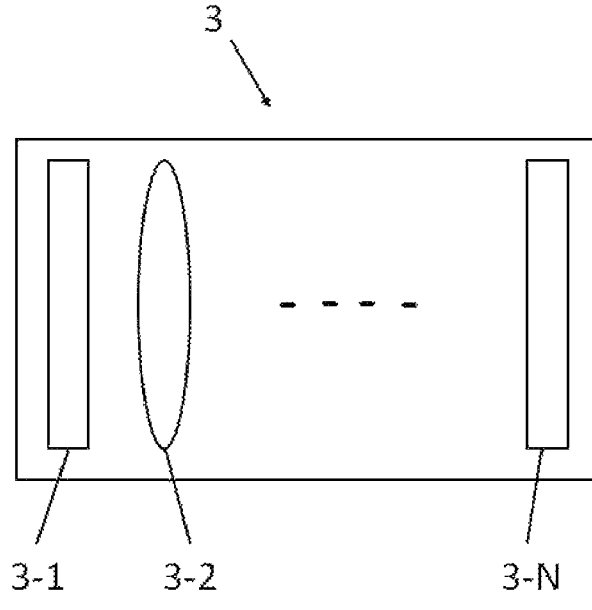
FIG. 2 illustrates an optical microscopy device, in accordance with an example of the present subject matter.

FIG. 2 illustrates an optical microscopy device 3, in accordance with an example of the present subject matter. The optical microscopy device 3 includes an optical lens assembly having a plurality of lens elements 3-1, 3-2, . . . , 3-N, where N eight to fifteen. In an example, the optical lens assembly of the optical microscopy device 3 may include eight lens elements, ten lens elements, eleven lens elements, twelve lens elements, fourteen lens elements, or fifteen lens elements. Various examples of optical microscopy device 3 are described in detail later in the description and illustrated through FIGS. 5 to 16.

The optical lens assembly of the present subject matter enables the optical microscopy device 3 to have an optical magnification in a range of about 1× to about 7.8×, an airy radius in a range of about 3 micron to about 23.25 micron, a depth of field in a range of about 20 micron to about 338 micron, a numerical aperture in a range of about 0.015 to about 0.115, a half field of view in a range of about 12 degrees to about 30 degrees, and a length in a range of about 6.5 millimeter (mm) to about 57 mm. The optical microscopy device 3 when embedded inside a portable imaging system 1 enables microscopy feature in the portable imaging system 1.

Figure 3A:
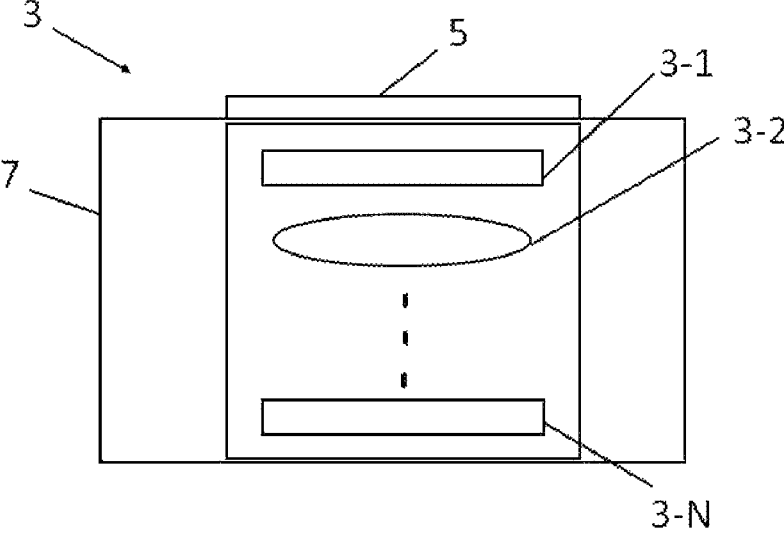
FIG. 3a illustrates an optical microscopy device, in accordance with another example of the present subject matter.

FIG. 3a illustrates an optical microscopy device 3, in accordance with another example of the present subject matter. The optical microscopy device 3 of FIG. 3a includes the optical lens assembly, similar to as described for FIG. 2. Additionally, the optical microscopy device 3 of FIG. 3a includes a focusing unit 7 having a barrel. The optical lens assembly is disposed within the barrel of the focusing unit 7. The focusing unit is configured to operate the optical lens assembly for focusing while imaging an object.

In an example, the focusing unit 7 has a controlled movement for focusing an object. The mechanism involved in the movement of the focusing unit 7 may include, but is not limited to, a piezoelectric movement mechanism or an electromagnetic movement mechanism. It may be noted that a software or a mobile application may be utilized for controlling the movement of the focusing unit 7 for focusing of an object.

In an example, the portable imaging system 1 in which the optical microscopy device 3 is embedded may provide an auto-focusing feature. The auto-focusing feature provides flexibility for observing objects of different sizes and located at the various distance with high resolution, wide field of view, and without any spherical and optical aberrations. The auto-focusing and high-resolution image capturing ability of the optical microscopy device 3 provides more user-friendly portable imaging system for viewing objects without any external attachment which is otherwise conventionally used.

Further, as shown in FIG. 3a, the optical microscopy device 3 includes a light guiding unit 5 to allow light of a specific wavelength to pass therethrough. The light guiding unit 5 is a wavelength specific optical filter. As shown in FIG. 3a, the light guiding unit 5 is positioned in front of the first lens element 3-1 of the optical lens assembly of the optical microscopy device 3.

In another example, the light guiding element 5 is a first lens element 3-1 of the optical lens assembly of the optical microscopy device 3, where the first lens element 3-1 is configured as a wavelength specific optical filter. In another example, the light guiding element 5 is positioned between a first lens element 3-1 and a second lens element 3-1 of the optical lens assembly of the optical microscopy device 3. In another example, the light guiding element 5 is positioned after the last lens element 3-N of the optical lens assembly of the optical microscopy device 3. In an example, the light guiding element 5 is positioned between any adjacent pair of lens elements of the optical lens assembly of the optical microscopy device 3.

Figures 3B, 4:
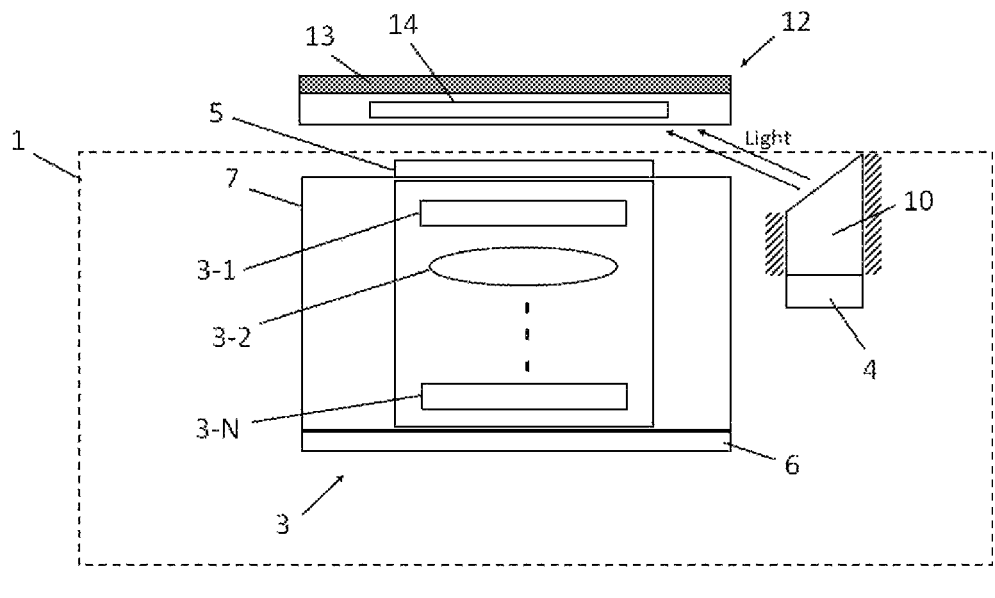
FIG. 3b illustrates an optical microscopy device, in accordance with another example of the present subject matter.
FIG. 4 illustrates an assembly with a sample holder and an integrated light source.

FIG. 3b illustrates an optical microscopy device 3, in accordance with another example of the present subject matter. The optical microscopy device 3 of FIG. 3b includes the optical lens assembly, the focusing unit 7, and the light guiding element 5, similar to as described for FIG. 3a. Additionally, the optical microscopy device 3 of FIG. 3b includes a light source 4 placed adjacent to the optical lens assembly to emit light such that the emitted light is incident on a sample held within a sample holder 12, when the sample holder 12 is placed over the optical lens assembly. In an example, the light source 4 may be a white LED with diffuser or an LED with of a specific wavelength. The sample holder 12 is a transparent chamber that can hold a sample. The sample holder 12 may hold a glass slide 14 on which the sample may be placed.

The optical microscopy device 3 also includes a light focusing element 10 to direct the light from the light source 4 to the object in the sample holder 12. The light focusing element 10 may be an optical fiber or an optically transparent rod coated with the reflective materials. The light focusing element 10 facilitates in directing the light at angled in such a way that light is incident on the sample holder 12 at critical angle for the total internal reflection of light inside the sample holder or inside the glass slide 14 holding the sample.

Further, a planar surface 13 of the sample holder 12 is blackened, as shown in FIG. 3b, and the light is made incident through the other planar surface of the sample holder 12. The sample is placed between the blackened planar surface 13 and the planar surface through which the light is made incident to view the light emit from the object against the dark background.

In an example, the light source 4 provides for a dual mode observation of object under light field and filter field, where the object in the sample illuminates light of a specific wavelength.

Further, as shown in FIG. 3b, the optical microscopy device 3 includes an image capturing unit 6, positioned adjacent to the optical lens assembly of the optical microscopy device 3 to image an object in field of view of the optical lens assembly. The image capturing unit 6 may include an image sensor or a camera having an image sensor/image sensor with/wavelength specific filter or IR filter for light field and filter field microscopy. In an example, the image capturing unit 6 is a photo sensor or a camera with a pixel size in a range of 0.3 megapixel (MP) to 350 MP.

FIG. 4 illustrates an assembly 11 with a sample holder 12 and an integrated light source 4. The light source 4 is an LED as described earlier. As shown, the light source 4 is arranged in periphery of the sample holder 12. As with the sample holder 12 of FIG. 3b, the sample holder 12 of FIG. 4 has a blackened planar surface 13. The light is made incident through the other planar surface of the sample holder 12. The sample is placed between the blackened planar surface 13 and the planar surface through which light is made incident to view the light emit from the object against the dark background.

As described earlier, the light from the light source 4 is angled in such a way that light is incident on the sample holder 12 at critical angle for the total internal reflection of light inside the sample holder or inside the glass slide 14 holding the sample. The light of a specific wavelength passes through to the object in the sample. The object accordingly emits the light which can be observed through the optical microscopy device 3 when the assembly 11 with the sample holder 12 is placed over the optical microscopy device 3.

In an example, the quantitative and qualitative analysis of the image(s) captured through the optical microscopy device 3 may be performed using a conventional algorithm or software.

The present subject matter was experimented in details using in the following examples of the optical lens assembly of the optical microscopy device 3. FIG. 5a to FIG. 16c represents example layouts of the optical lens assembly of the optical microscopy devices, and associated distortion plots and modulation transfer function (MTF) plots, results of the individual embodiments of in accordance with the present subject matter. The examples describe and demonstrate embodiments within the scope of the present subject matter. The examples are provided herein solely for the purpose of illustration and is not to be construed as limitations of the present subject matter, as many variations thereof are possible without departing from spirit and scope.

The numeral values provided the present disclosure may include tolerance of about ±5%. The numeral values provided herein may have been rounded-off to the nearest decimal place for the sake of simplicity.

It may be noted that the serial numbering of the rows of the tables for each embodiment has one to one correspondence.

EXAMPLES

Example 1

Figure 5A:
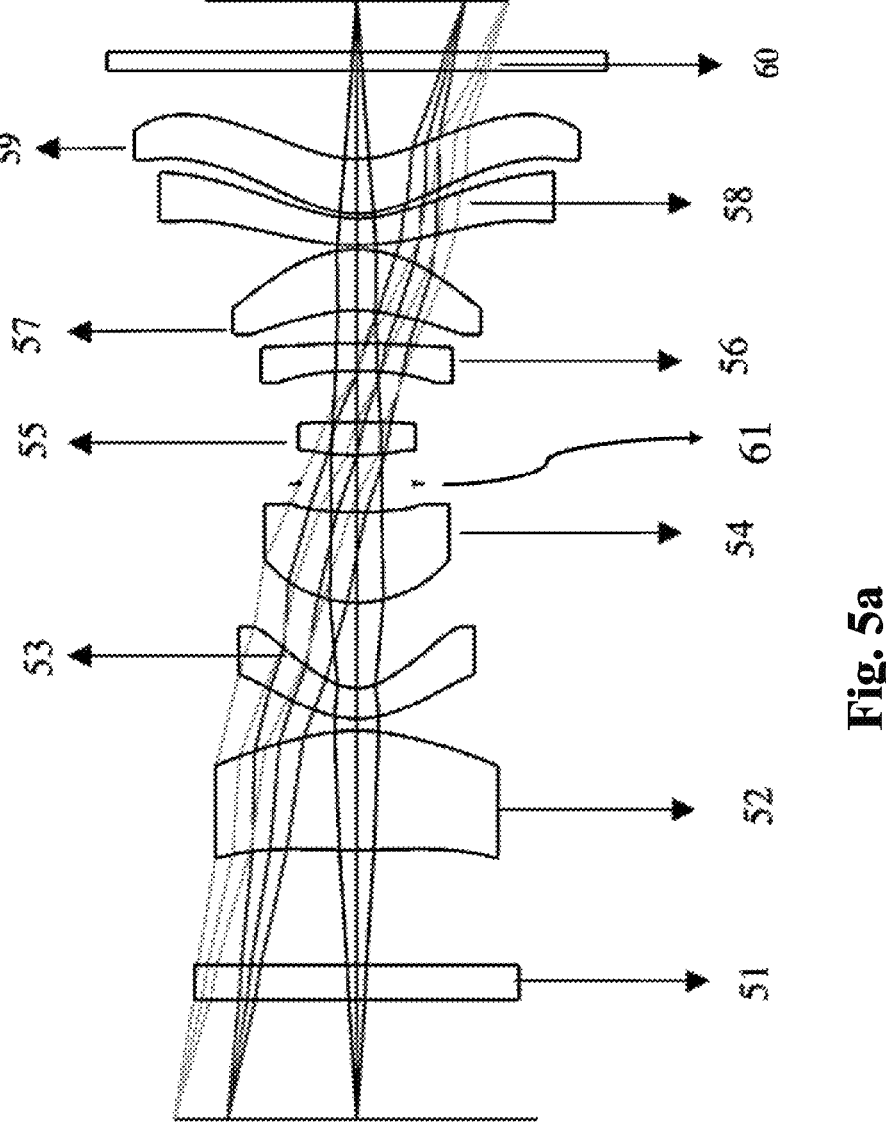
FIG. 5a to FIG. 16c represents example layouts of optical microscopy devices, and associated distortion plots and modulation transfer function (MTF) plots, in accordance with the present subject matter.

The optical lens assembly [3] in the first embodiment comprises ten lens elements which are sequentially arranged from object side to image side. The aperture stop [61] is located between the fourth and fifth lens elements. First four lens elements can act as objective assembly. The layout diagram is shown in FIG. 5a.

Figure 5B:
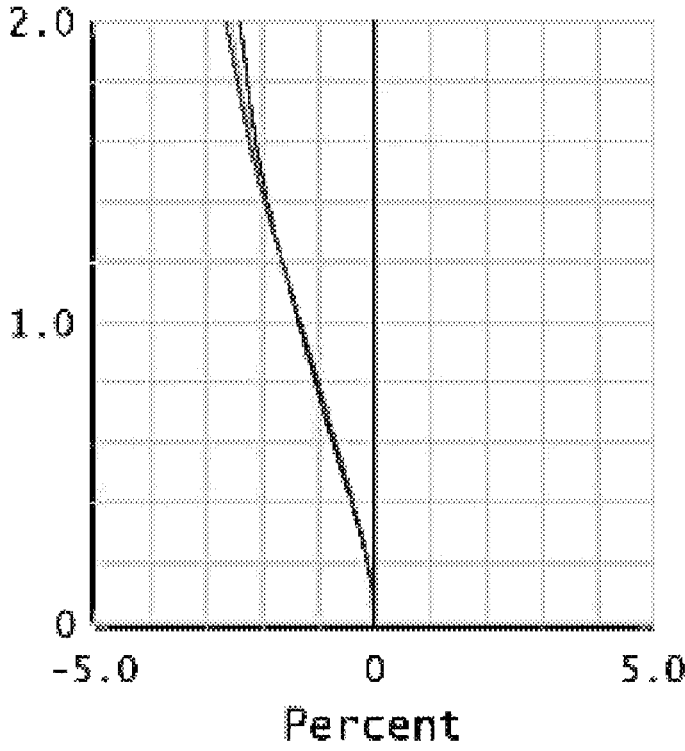
Figure 5C:
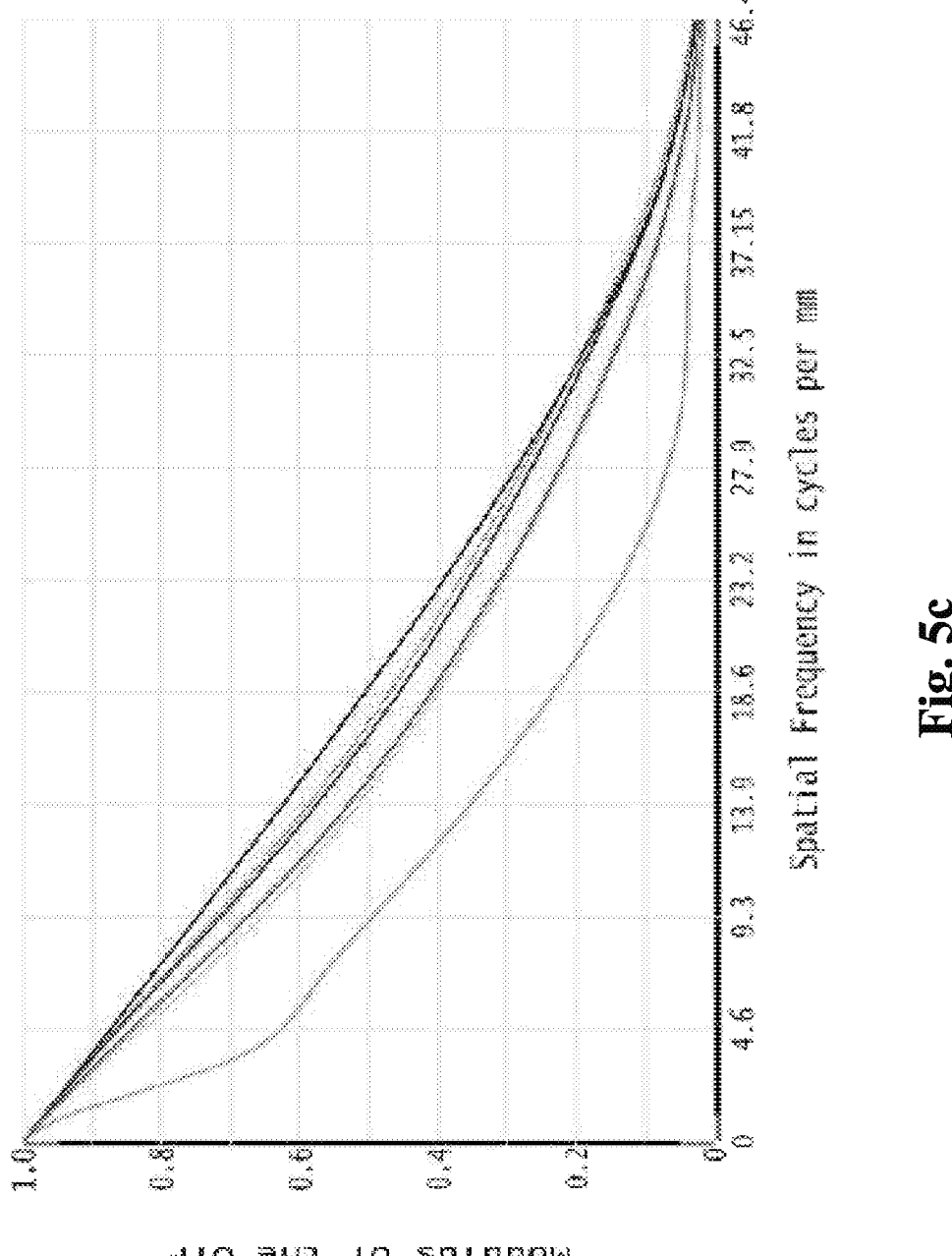

The first lens element [51] is protective layer or filter of glass or plastic or polymer or composite material and having refractive index is greater than 1. The second lens element [52] has a positive refractive power with biconvex surface. The third lens element [53] has a negative refractive power. The object side surface of the third lens element is Convex and image side surface is Concave in vicinity of axis. The fourth lens element [54] is having a positive refractive power. The object side surface of fourth lens element is convex portion in vicinity of axis and image side surface is concave. The fifth lens element [55] has a positive refracting power. The object and image side surfaces are convex. The sixth lens element [56] has a negative refracting power. The object side surface is a concave surface comprising a concave portion in a vicinity of the optical and is meniscus. The image-side surface is a convex surface comprising a convex portion in a vicinity of a periphery of the sixth lens element and is meniscus. The seventh lens element [57] has positive refracting power. The object side surface is a concave surface near the vicinity of the optical axis and is meniscus. The image side surface is convex near the optical axis. The eighth lens element [58] has negative refracting power. The object side surface comprises a convex portion in a vicinity of the optical axis and a concave portion in a vicinity of a periphery of the eighth lens element. The ninth lens element [59] has positive refracting power. The image side surface comprises a concave portion in a vicinity of the optical axis and a convex portion in a vicinity of a periphery of the ninth lens element. The tenth lens element [60] is an optical filter or an IR filter. The optical lens assembly data of the first embodiment is shown in Table 1A and aspheric data is shown in Table 1B. The distortion plot and MTF plot are shown in FIGS. 5c and 5b. The optical lens assembly [3] of the first embodiment has:

Magnifications=1×; Numerical aperture=0.072; Focal Length=3.232 mm;

System length=12.67 mm; HFOV=12.6 degree; Depth of field=103.83 microns;

Airy radius=4.767 microns.

11

TABLE 1A

Optical assembly data of first embodiment

| S. No. | Lens Element Number | Radius of Curvature (mm) | Thickness (mm) of lens element OR air gap (mm) with the previous or next element | Refractive Index | Abbe Number |
|---|---|---|---|---|---|
| 0 |  | Infinity | 1.35E+00 |  |  |
| 1 | 1 | Infinity | 4.00E-01 | 1.52 | 64.2 |
| 2 |  | Infinity | 1.30E+00 |  |  |
| 3 | 2 | 1.31E+01 | 1.35E+00 | 1.53 | 55.8 |
| 4 |  | -1.80E+00 | 1.33E-01 |  |  |
| 5 | 3 | 1.02E+00 | 3.45E-01 | 1.63 | 23.4 |
| 6 |  | 5.08E-01 | 9.67E-01 |  |  |
| 7 | 4 | 1.28E+00 | 1.03E+00 | 1.52 | 52.2 |
| 8 |  | 5.20E+00 | 3.21E-01 |  |  |
| 9 | Aperture Stop | Infinity | 3.21E-01 |  |  |
| 10 | 5 | 2.51E+00 | 3.75E-01 | 1.54 | 55.9 |
| 11 |  | -4.07E+01 | 5.77E-01 |  |  |
| 12 | 6 | -3.85E+00 | 3.15E-01 | 1.63 | 23.4 |
| 13 |  | -7.23E+00 | 3.78E-01 |  |  |
| 14 | 7 | -1.54E+00 | 6.84E-01 | 1.53 | 55.8 |
| 15 |  | -1.25E+00 | 5.00E-02 |  |  |
| 16 | 8 | 2.26E+00 | 3.01E-01 | 1.61 | 25.6 |
| 17 |  | 1.29E+00 | 5.00E-02 |  |  |
| 18 | 9 | 1.00E+00 | 6.27E-01 | 1.53 | 55.8 |
| 19 |  | 1.22E+00 | 9.99E-01 |  |  |
| 20 | 10 | Infinity | 2.10E-01 | 1.52 | 66.2 |
| 21 |  | Infinity | 5.84E-01 |  |  |

TABLE 1B

Aspheric data of first embodiment

| S.No | Conic | order 4 | order 6 | order 8 | order 10 | order 12 | order 14 | order 16 |
|---|---|---|---|---|---|---|---|---|
| 0 | 0.00E+00 | 0.00E+00 | 0.00E+00 | 0.00E+00 | 0.00E+00 | 0.00E+00 | 0.00E+00 | 0.00E+00 |
| 1 | 0.00E+00 | 0.00E+00 | 0.00E+00 | 0.00E+00 | 0.00E+00 | 0.00E+00 | 0.00E+00 | 0.00E+00 |
| 2 | 0.00E+00 | 0.00E+00 | 0.00E+00 | 0.00E+00 | 0.00E+00 | 0.00E+00 | 0.00E+00 | 0.00E+00 |
| 3 | -1.00E+00 | -4.12E-02 | 2.63E-03 | 4.19E-04 | 1.20E-04 | -4.67E-05 | 3.66E-06 | 0.00E+00 |
| 4 | -1.18E+01 | -1.67E-02 | 6.93E-04 | 7.12E-04 | -4.52E-05 | -1.63E-05 | 2.00E-06 | 0.00E+00 |
| 5 | -2.89E+00 | 9.75E-03 | -2.08E-02 | 4.82E-03 | -1.19E-04 | -5.03E-04 | 6.80E-05 | 0.00E+00 |
| 6 | -1.80E+00 | 1.88E-02 | -5.61E-02 | -2.05E-03 | 6.31E-03 | -1.14E-03 | 4.56E-05 | 0.00E+00 |
| 7 | -4.74E-01 | 1.88E-02 | 3.54E-02 | -1.29E-02 | -2.61E-02 | 2.57E-02 | 1.48E-02 | -1.41E-02 |
| 8 | -1.00E+00 | 8.30E-02 | 1.38E-01 | -1.38E-01 | 6.39E-02 | 5.54E-01 | -6.03E-01 | 0.00E+00 |
| 9 | 0.00E+00 | 0.00E+00 | 0.00E+00 | 0.00E+00 | 0.00E+00 | 0.00E+00 | 0.00E+00 | 0.00E+00 |
| 10 | -3.68E+00 | -1.01E-02 | -3.50E-02 | -4.32E-02 | -2.66E-02 | -8.27E-02 | -7.30E-04 | -7.67E-04 |
| 11 | 9.98E-01 | -6.52E-02 | -5.42E-02 | -2.91E-02 | -2.16E-02 | -5.21E-02 | -1.58E-03 | 3.53E-03 |
| 12 | 9.86E-01 | -4.97E-02 | -1.77E-02 | 9.96E-03 | -1.49E-02 | 2.49E-02 | 1.86E-04 | -1.65E-03 |
| 13 | -8.28E+01 | 1.27E-02 | -6.84E-03 | 1.32E-03 | 5.84E-04 | 7.57E-04 | -7.62E-05 | 1.00E-04 |
| 14 | -8.37E+00 | -2.27E-02 | 2.47E-02 | -7.50E-03 | -3.85E-04 | -6.53E-04 | 1.71E-05 | 1.08E-04 |
| 15 | -1.34E+00 | -9.85E-03 | 2.86E-03 | -4.76E-05 | 7.39E-04 | 2.11E-04 | 8.69E-05 | 0.00E+00 |
| 16 | -9.90E+00 | -1.42E-02 | 1.42E-03 | -2.18E-04 | -9.90E-07 | -1.03E-06 | -1.19E-07 | 0.00E+00 |
| 17 | -5.46E+00 | -1.33E-02 | 4.86E-04 | -4.64E-05 | 4.29E-06 | 2.36E-07 | 1.17E-08 | 0.00E+00 |
| 18 | -3.57E+00 | -1.76E-02 | -2.75E-04 | 3.04E-05 | 3.56E-06 | 5.05E-07 | 0.00E+00 | 0.00E+00 |
| 19 | -4.04E+00 | -2.10E-02 | 4.74E-04 | -2.86E-05 | -4.14E-06 | -4.18E-07 | 0.00E+00 | 0.00E+00 |
| 20 | 0.00E+00 | 0.00E+00 | 0.00E+00 | 0.00E+00 | 0.00E+00 | 0.00E+00 | 0.00E+00 | 0.00E+00 |
| 21 | 0.00E+00 | 0.00E+00 | 0.00E+00 | 0.00E+00 | 0.00E+00 | 0.00E+00 | 0.00E+00 | 0.00E+00 |

The optical lens assembly of the first embodiment includes:

a first lens element having a planar object side surface, a planar image side surface, a thickness of about 0.40 mm, a refractive index of about 1.52, and Abbe number of about 64.2;

a second lens element having an object side surface of a radius of curvature of about 13.10 mm, an image side surface of a radius of curvature of about −1.80 mm, a thickness of about 1.35 mm, a refractive index of about 1.53, and Abbe number of about 55.8;

a third lens element having an object side surface of a radius of curvature of about 1.02 mm, an image side surface of a radius of curvature of about 0.508 mm, a thickness of about 0.345 mm, a refractive index of about 1.63, and Abbe number of about 23.4;

a fourth lens element having an object side surface of a radius of curvature of about 1.28 mm, an image side surface of a radius of curvature of about 5.20 mm, a thickness of about 1.03 mm, a refractive index of about 1.52, and Abbe number of about 52.2;

a fifth lens element having an object side surface of a radius of curvature of about 2.51 mm, an image side surface of a radius of curvature of about −40.70 mm, a thickness of about 0.375 mm, a refractive index of about 1.54, and Abbe number of about 55.9;

a sixth lens element having an object side surface of a radius of curvature of about −3.85 mm, an image side surface of a radius of curvature of about −7.23 mm, a thickness of about 0.315 mm, a refractive index of about 1.63, and Abbe number of about 23.4;

a seventh lens element having an object side surface of a radius of curvature of about −1.54 mm, an image side surface of a radius of curvature of about −1.25 mm, a thickness of about 0.684 mm, a refractive index of about 1.53, and Abbe number of about 55.8;

an eighth lens element having an object side surface of a radius of curvature of about 2.26 mm, an image side surface of a radius of curvature of about 1.29 mm, a thickness of about 0.301 mm, a refractive index of about 1.61, and Abbe number of about 25.6;

a ninth lens element having an object side surface of a radius of curvature of about 1.00 mm, an image side surface of a radius of curvature of about 1.22 mm, a thickness of about 0.627 mm, a refractive index of about 1.53, and Abbe number of about 55.8; and a tenth lens element having a planar object side surface, a planar image side surface, a thickness of about 0.21 mm, a refractive index of about 1.52, and Abbe number of about 66.2, wherein the optical lens assembly comprises an aperture stop positioned between the fourth lens element and the fifth lens element, wherein the aperture stop is a planar element having a thickness of about 0.321.

Example 2

Figure 6A:
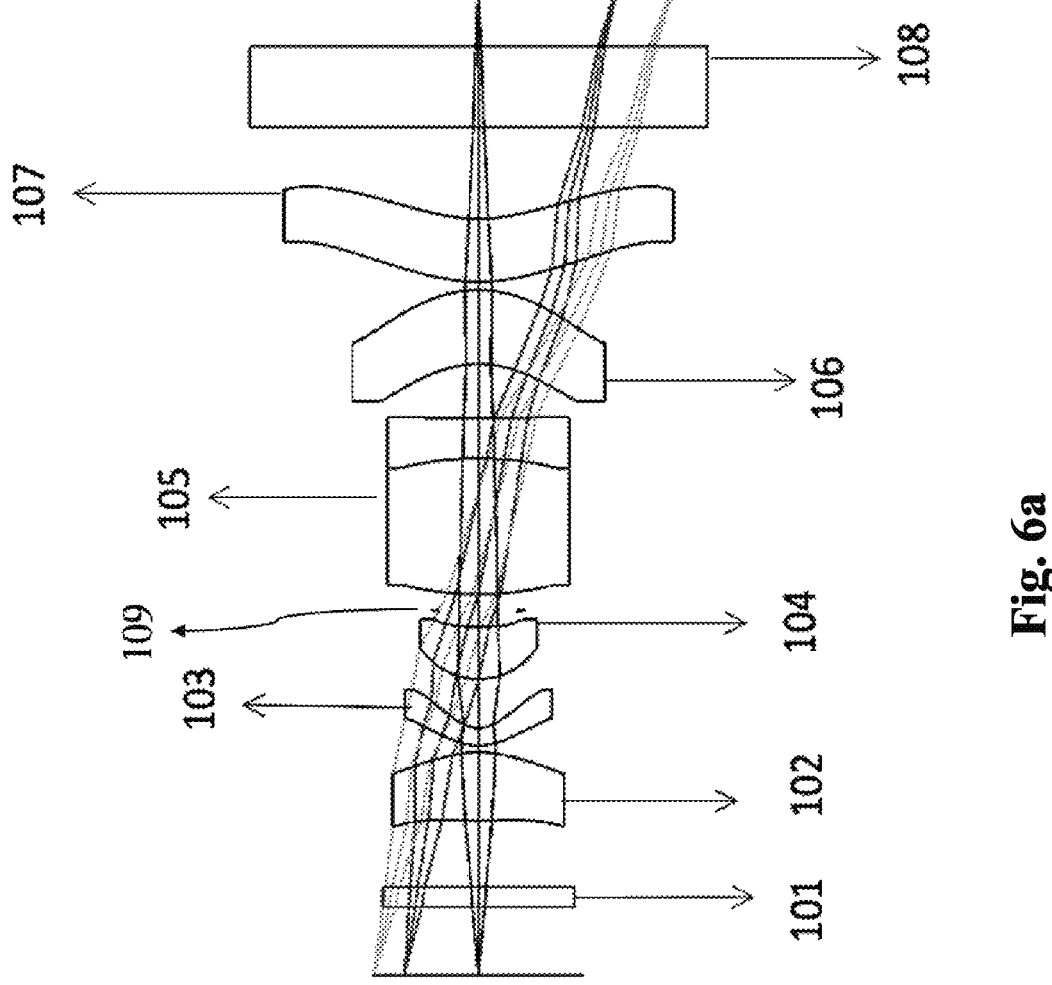

The optical lens assembly [3] in the second embodiment comprises eight lens elements which are sequentially arranged from object side to image side. The aperture stop [109] is located between the fourth and fifth lens elements. First four elements can act as objective assembly. The layout diagram is shown in FIG. 6a.

The first element [101] is a protective layer or an optical filter of glass or plastic or polymer or composite materials and having refractive index is greater than 1. The second lens [102] element has a positive refractive power with biconvex surface. The third lens [103] element has a negative refractive power. The object side surface of the third lens element is Convex and image side surface is Concave in vicinity of axis. The fourth lens [104] element has a positive refractive power. The object side surface of fourth element is convex portion in vicinity of axis and image side surface is concave. The fifth lens [105] element is a doublet and has a refracting power. Both the object-side surface is convex surfaces, and the image-side is convex. The sixth lens [106] element has a strong negative refracting power. The object-side surface is a concave surface, and the image-side surface is a convex surface. The seventh lens [107] element has refracting power. The object-side surface is a convex surface comprising a convex portion and is meniscus in the vicinity of the optical axis. The image-side surface is a convex surface comprising a convex portion and meniscus

TABLE 2A

The optical lens assembly data for second embodiment

| S. No. | Lens Element Number | Radius of Curvature (mm) | Thickness (mm) of lens element OR air gap (mm) with the previous or next element | Refractive Index | Abbe Number |
|---|---|---|---|---|---|
| 0 | | Infinity | 1.35E+00 | | |
| 1 | 1 | Infinity | 4.00E−01 | 1.517 | 64.2 |
| 2 | | Infinity | 1.30E+00 | | |
| 3 | 2 | 1.31E+01 | 1.35E+00 | 1.53 | 55.8 |
| 4 | | −1.80E+00 | 1.33E−01 | | |
| 5 | 3 | 1.02E+00 | 3.45E−01 | 1.632 | 23.4 |
| 6 | | 5.08E−01 | 9.67E−01 | | |
| 7 | 4 | 1.28E+00 | 1.03E+00 | 1.522 | 52.2 |
| 8 | | 5.20E+00 | 1.00E−01 | | |
| 9 | Aperture Stop | Infinity | 3.21E−01 | | |
| 10 | 5 | 2.30E+01 | 1.07E+01 | 1.7433 | 49.2 |
| 11 | 5 | −2.30E+01 | 3.20E+00 | 1.8466 | 23.8 |
| 12 | | 4.14E+02 | 4.24E+00 | | |
| 13 | 6 | −7.59E+00 | 5.84E+00 | 1.50914 | 56.4 |
| 14 | | −8.31E+00 | 6.40E−01 | | |
| 15 | 7 | 1.29E+01 | 4.96E+00 | 1.50914 | 56.4 |
| 16 | | 1.13E+01 | 7.20E+00 | | |
| 17 | 8 | Infinity | 6.40E+00 | 1.5168 | 64.2 |
| 18 | | Infinity | 6.38E+00 | | |

TABLE 2B

The aspheric data of second embodiment

Figure 6B:
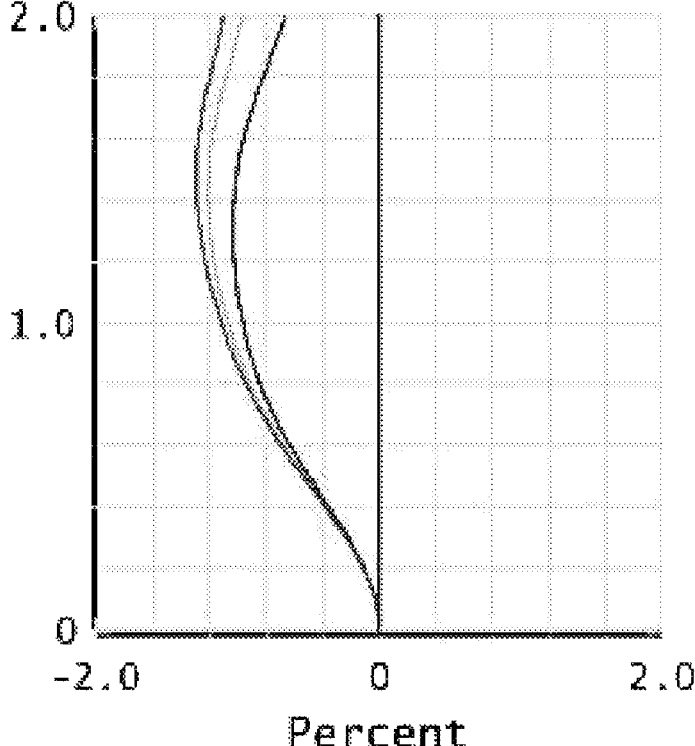
Figure 6C:
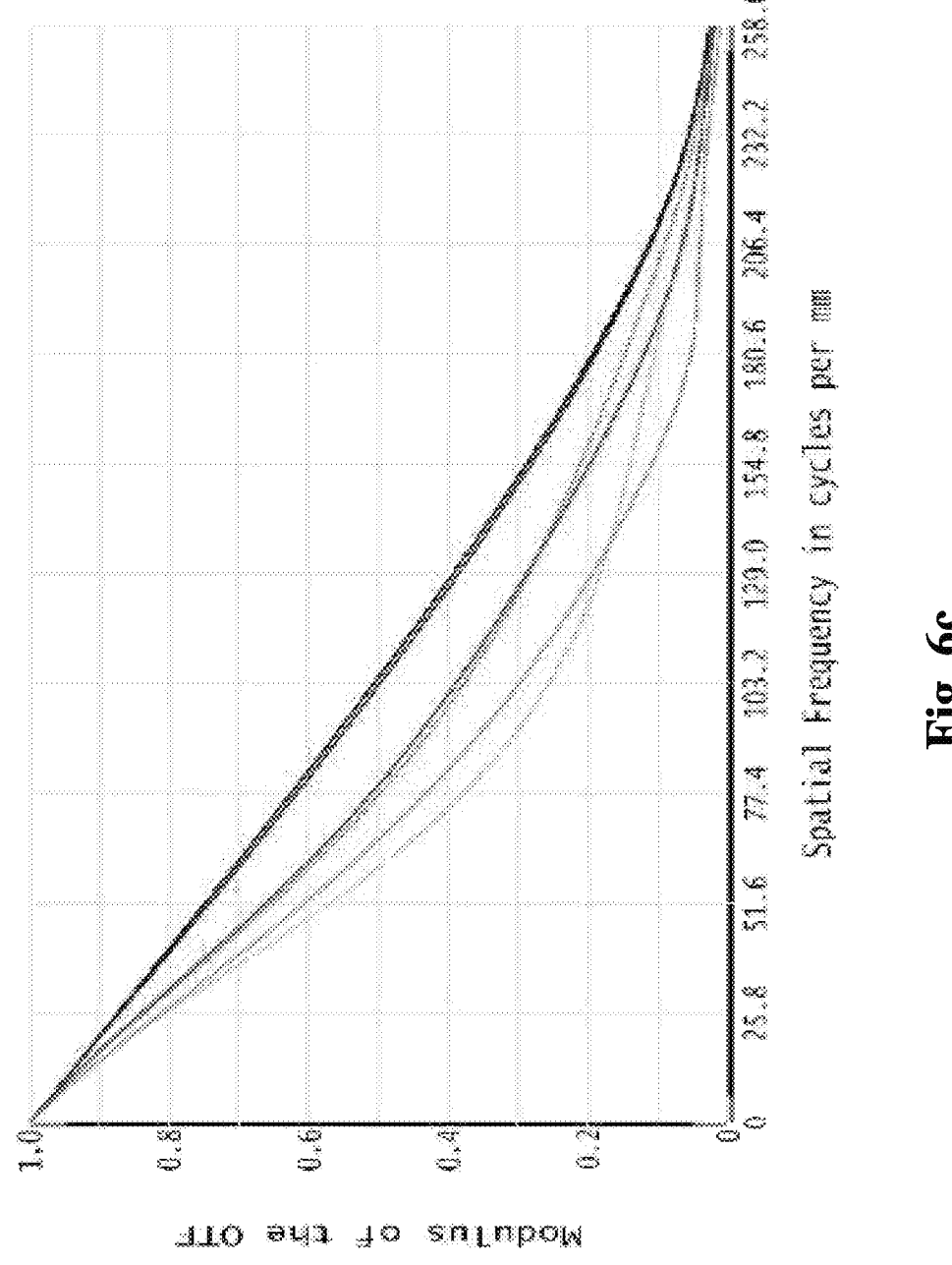

| S. No | Conic | Order 4 | Order 6 | Order 8 | Order 10 | Order 12 | Order 14 | Order 16 |
|---|---|---|---|---|---|---|---|---|
| 0 | 0.00E+00 | 0.00E+00 | 0.00E+00 | 0.00E+00 | 0.00E+00 | 0.00E+00 | 0.00E+00 | 0.00E+00 |
| 1 | 0.00E+00 | 0.00E+00 | 0.00E+00 | 0.00E+00 | 0.00E+00 | 0.00E+00 | 0.00E+00 | 0.00E+00 |
| 2 | 0.00E+00 | 0.00E+00 | 0.00E+00 | 0.00E+00 | 0.00E+00 | 0.00E+00 | 0.00E+00 | 0.00E+00 |
| 3 | −1.00E+00 | −4.12E−02 | 2.63E−03 | 4.19E−04 | 1.20E−04 | −4.67E−05 | 3.66E−06 | 0.00E+00 |
| 4 | −1.18E+01 | −1.67E−02 | 6.93E−04 | 7.12E−04 | −4.52E−05 | −1.63E−05 | 2.00E−06 | 0.00E+00 |
| 5 | −2.89E+00 | 9.75E−03 | −2.08E−02 | 4.82E−03 | −1.19E−04 | −5.03E−04 | 6.80E−05 | 0.00E+00 |
| 6 | −1.80E+00 | 1.88E−02 | −5.61E−02 | −2.05E−03 | 6.31E−03 | −1.14E−03 | 4.56E−05 | 0.00E+00 |
| 7 | −4.74E−01 | 1.88E−02 | 3.54E−02 | −1.29E−02 | −2.61E−02 | 2.57E−02 | 1.48E−02 | −1.41E−02 |
| 8 | −1.00E+00 | 8.30E−02 | 1.38E−01 | −1.38E−01 | 6.39E−02 | 5.54E−01 | −6.03E−01 | 0.00E+00 |
| 9 | 0.00E+00 | 0.00E+00 | 0.00E+00 | 0.00E+00 | 0.00E+00 | 0.00E+00 | 0.00E+00 | 0.00E+00 |
| 10 | 0.00E+00 | 0.00E+00 | 0.00E+00 | 0.00E+00 | 0.00E+00 | 0.00E+00 | 0.00E+00 | 0.00E+00 |
| 11 | 0.00E+00 | 0.00E+00 | 0.00E+00 | 0.00E+00 | 0.00E+00 | 0.00E+00 | 0.00E+00 | 0.00E+00 |
| 12 | 0.00E+00 | 0.00E+00 | 0.00E+00 | 0.00E+00 | 0.00E+00 | 0.00E+00 | 0.00E+00 | 0.00E+00 |
| 13 | −4.25E+00 | −4.56E−04 | 4.14E−06 | 3.80E−08 | −2.35E−10 | −2.87E−12 | 1.84E−14 | −2.59E−16 |
| 14 | −2.22E+00 | −6.56E−05 | −1.71E−06 | 4.84E−08 | −4.89E−10 | 5.45E−12 | −3.90E−14 | 9.90E−17 |
| 15 | −3.63E+00 | −8.80E−05 | 4.06E−07 | −2.54E−10 | −4.53E−12 | −2.35E−15 | −3.52E−18 | 1.18E−19 |
| 16 | −6.98E+00 | −4.67E−05 | −2.71E−09 | 7.36E−10 | −1.29E−12 | −1.96E−14 | 4.54E−17 | 1.73E−20 |
| 17 | 0.00E+00 | 0.00E+00 | 0.00E+00 | 0.00E+00 | 0.00E+00 | 0.00E+00 | 0.00E+00 | 0.00E+00 |
| 18 | 0.00E+00 | 0.00E+00 | 0.00E+00 | 0.00E+00 | 0.00E+00 | 0.00E+00 | 0.00E+00 | 0.00E+00 | in near the optical axis. The eighth lens [108] element has refracting power and is the filter or IR filter. The optical lens assembly data of the second embodiment is shown in Table. 2A and aspheric data is shown in Table.2B. The distortion plot and MTF plot are shown in FIGS. 6c and 6b. The optical assembly [3] of second embodiment has:

Magnifications=7.8×; Numerical aperture=0.015; Focal Length=5.14 mm;

System length=56.87 mm; HFOV=12.6 degree; Depth of field=68.55 microns;

Airy radius=23.25 micron

The optical lens assembly of the second embodiment includes:

a first lens element having a planar object side surface, a planar image side surface, a thickness of about 0.40 mm, a refractive index of about 1.517, and Abbe number of about 64.2;

a second lens element having an object side surface of a radius of curvature of about 13.10 mm, an image side surface of a radius of curvature of about −1.80 mm, a thickness of about 1.35 mm, a refractive index of about 1.53, and Abbe number of about 55.8;

a third lens element having an object side surface of a radius of curvature of about 1.02 mm, an image side surface of a radius of curvature of about 0.508 mm, a thickness of about 0.345 mm, a refractive index of about 1.632, and Abbe number of about 23.4;

a fourth lens element having an object side surface of a radius of curvature of about 1.28 mm, an image side surface of a radius of curvature of about 5.20 mm, a thickness of about 1.03 mm, a refractive index of about 1.522, and Abbe number of about 52.2;

a fifth lens element having a first sub-lens element and a second sub-lens element abutting each other, the first sub-lens element having an object side surface of a radius of curvature of about 23.00 mm, an image side surface of a radius of curvature of about 23.00 mm, a thickness of about 10.7 mm, a refractive index of about 1.7433, and Abbe number of about 49.2, and the second sub-lens element having an object side surface of a radius of curvature of about –23.00 mm, an image side surface of a radius of curvature of about 414.00 mm, a thickness of about 3.2 mm, a refractive index of about 1.8466, and Abbe number of about 23.8;

a sixth lens element having an object side surface of a radius of curvature of about –7.59 mm, an image side surface of a radius of curvature of about –8.31 mm, a thickness of about 5.84 mm, a refractive index of about 1.50914, and Abbe number of about 56.4;

a seventh lens element having an object side surface of a radius of curvature of about 12.90 mm, an image side surface of a radius of curvature of about 11.30 mm, a thickness of about 4.96 mm, a refractive index of about 1.50914, and Abbe number of about 56.4;

an eighth lens element having a planar object side surface, a planar image side surface, a thickness of about 6.40 mm, a refractive index of about 1.5168, and Abbe number of about 64.2, wherein the optical lens assembly comprises an aperture stop positioned between the fourth lens element and the fifth lens element, wherein the aperture stop is a planar element having a thickness of about 0.321.

Example 3

Figure 7A:
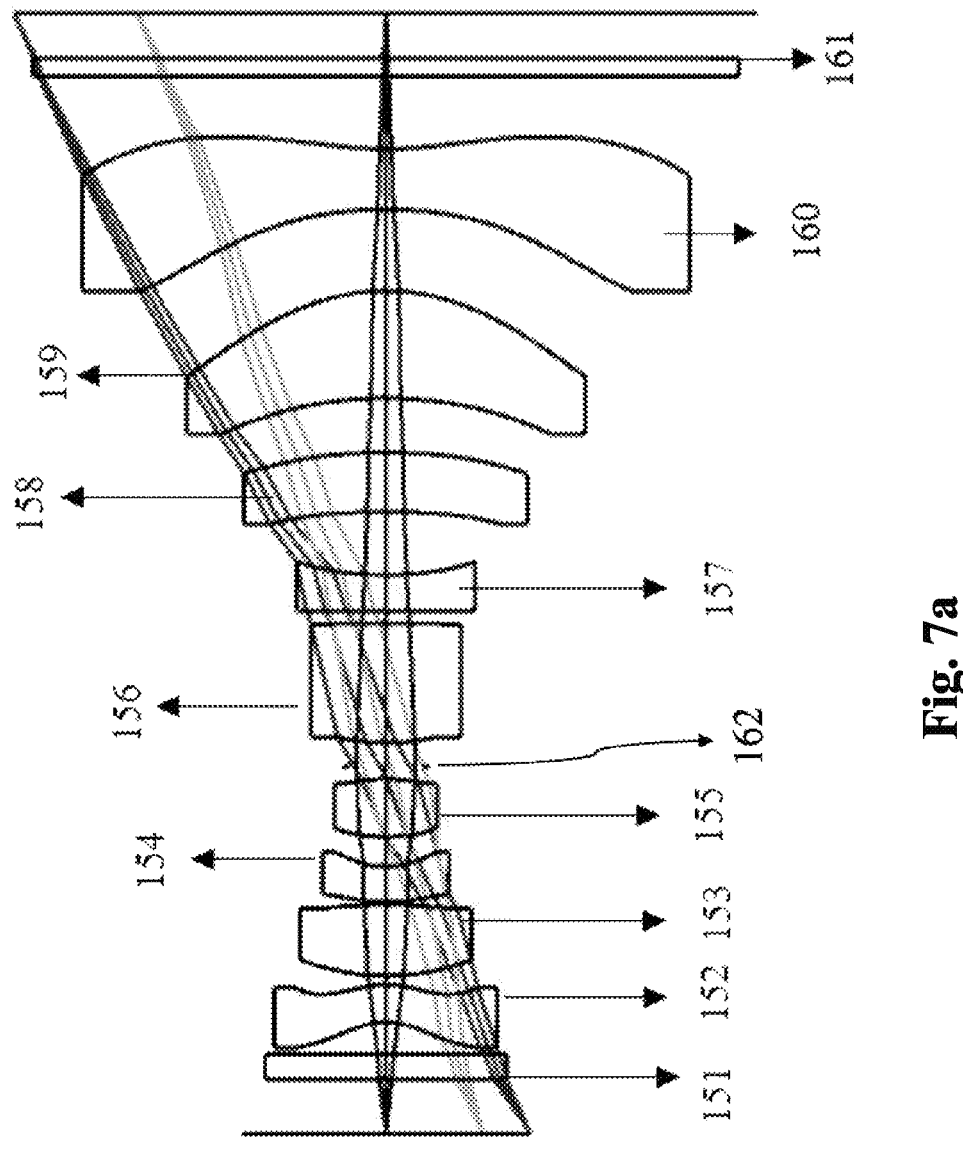

The optical lens assembly [3] in the third embodiment comprises eleven lens elements which are sequentially arranged from object side to image side. The aperture stop [162] is located between the fifth and sixth lens elements. First five elements can act as objective assembly. The layout diagram is shown in FIG. 7a.

Figure 7B:
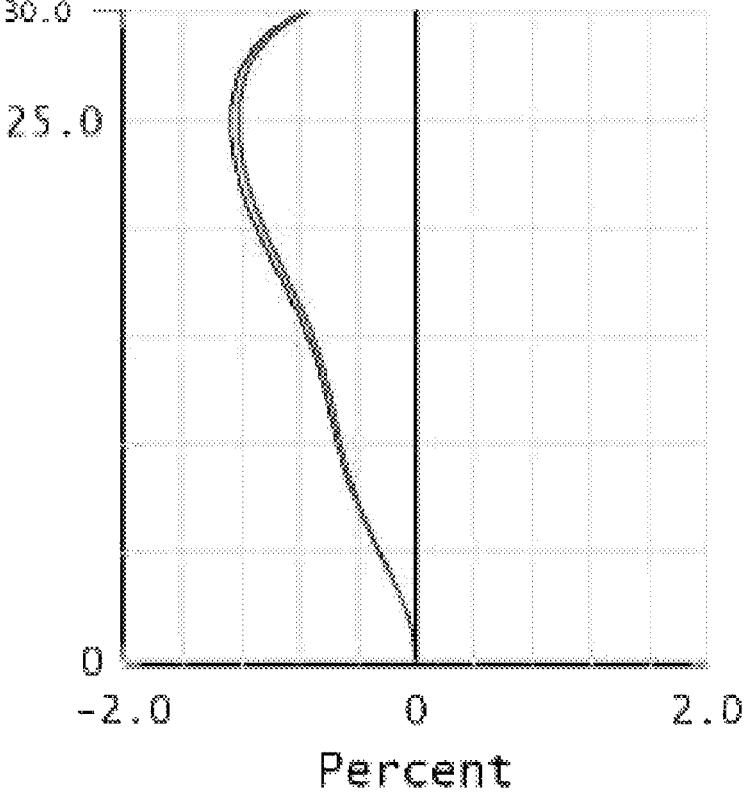
Figure 7C:
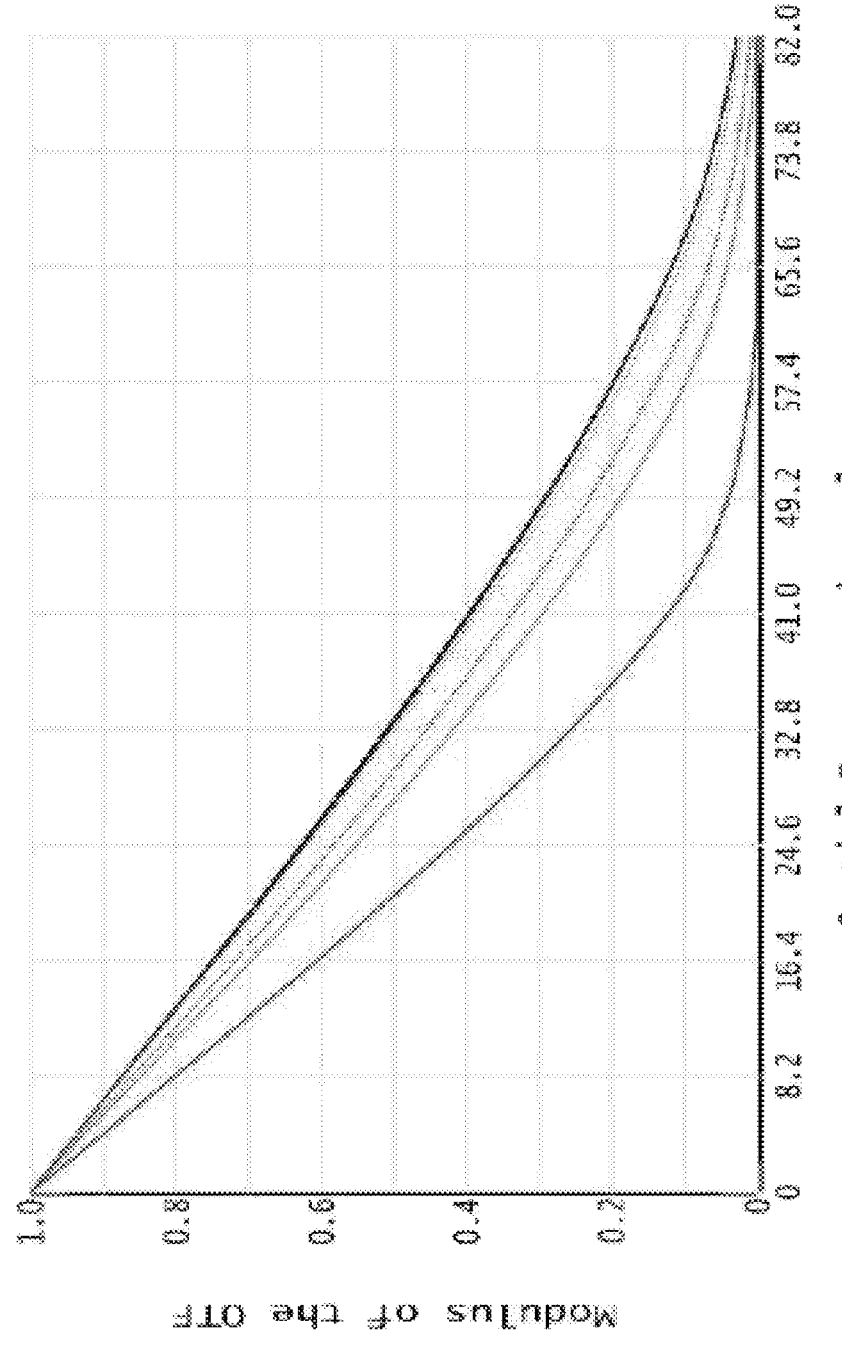

The first lens element [151] is protective layer or filter of glass or plastic or polymer or composite materials having refractive index is greater than 1. The second lens [152] element has negative refracting power. The image side surface comprises a convex portion in a vicinity of the optical axis and a concave portion in a vicinity of a periphery. The object side surface comprises a concave portion in a vicinity of the optical axis. The third lens [153] element has positive refracting power. Both the object-side and image-side surfaces are convex surfaces. The fourth lens [154] element has negative refracting power. The image side surface is a concave surface near the optical axis and the object side surface is a convex surface. The fifth lens [155]

element has positive refracting power. Both the object-side and image-side surfaces are convex surfaces. The sixth lens [156] element has positive refracting power. Both the object-side surface is convex surfaces. The seventh lens [157] element has negative refracting power. The image-side surface is a concave surface. The eighth lens [158] element has a refracting power. The object-side surface is a concave surface, and the image-side surface is a convex surface. The ninth lens [159] element has positive refracting power. The object-side surface is a concave surface near the vicinity of the optical axis and the image-side surface is a convex surface near the optical axis. The tenth lens [160] element has negative refracting power. The object-side surface comprises a concave portion in a vicinity of the optical axis. The image-side surface comprises a concave portion in a vicinity of the optical axis and a convex portion in a vicinity of a periphery of the tenth lens element. The eleventh element [161] is the filter or IR filter. The optical lens assembly data of third embodiment is shown in Table. 3A and aspheric data is shown in Table. 3B. The layout, distortion plot and MTF plot is shown in FIGS. 7a, 7b and 7c. The optical assembly [3] of third embodiment has:

Magnifications=5×; Numerical aperture=0.025; Focal Length=0.6176 mm;

System length=7.65928 mm; HFOV=30 degree; Airy radius=14.74 microns;

Depth of field=39.73 micron

TABLE 3A

The optical assembly data for third embodiment

| S. No. | Lens Element Number | Radius of curvature (mm) | Thickness (mm) of lens element OR air gap (mm) with the previous or next element | Refractive index | Abbe Number |
|---|---|---|---|---|---|
| 0 | | Infinity | 2.23E−01 | | |
| 1 | 1 | Infinity | 1.05E−01 | 1.517 | 64.2 |
| 2 | | Infinity | 1.34E−01 | | |
| 3 | 2 | −2.84E−01 | 1.54E−01 | 1.535 | 56 |
| 4 | | −4.09E−01 | 3.71E−02 | | |
| 5 | 3 | 1.04E+00 | 2.93E−01 | 1.544 | 56.1 |
| 6 | | −2.41E+00 | 1.28E−02 | | |
| 7 | 4 | 8.37E−01 | 1.45E−01 | 1.635 | 23.9 |
| 8 | | 3.65E−01 | 1.25E−01 | | |
| 9 | 5 | 1.03E+00 | 2.37E−01 | 1.544 | 56.1 |
| 10 | | −7.50E−01 | 5.00E−02 | | |
| 11 | Aperture Stop | Infinity | 1.00E−01 | | |
| 12 | 6 | 1.87E+00 | 9.90E−01 | 1.545 | 56.2 |
| 13 | | −1.29E+01 | 1.00E−01 | | |
| 14 | 7 | −7.78E+01 | 3.00E−01 | 1.632 | 23.4 |
| 15 | | 3.13E+00 | 5.20E−01 | | |
| 16 | 8 | −7.80E+00 | 4.90E−01 | 1.632 | 23.4 |
| 17 | | −5.36E+00 | 4.50E−01 | | |
| 18 | 9 | −3.73E+00 | 8.90E−01 | 1.545 | 56.2 |
| 19 | | −1.73E+00 | 6.70E−01 | | |
| 20 | 10 | −3.74E+00 | 5.00E−01 | 1.545 | 56.2 |
| 21 | | 3.35E+00 | 6.00E−01 | | |
| 22 | 11 | Infinity | 1.50E−01 | 1.516 | 64.1 |
| 23 | | Infinity | 3.84E−01 | | |

TABLE 3 B

Aspheric data of third embodiment

| S.No | Conic | Order 4 | Order 6 | Order 8 | Order 10 | Order 12 | Order 14 | Order 16 |
|---|---|---|---|---|---|---|---|---|
| 0 | 0.00E+00 | 0.00E+00 | 0.00E+00 | 0.00E+00 | 0.00E+00 | 0.00E+00 | 0.00E+00 | 0.00E+00 |
| 1 | 0.00E+00 | 0.00E+00 | 0.00E+00 | 0.00E+00 | 0.00E+00 | 0.00E+00 | 0.00E+00 | 0.00E+00 |
| 2 | 0.00E+00 | 0.00E+00 | 0.00E+00 | 0.00E+00 | 0.00E+00 | 0.00E+00 | 0.00E+00 | 0.00E+00 |
| 3 | −2.61E+00 | 5.19E+00 | −1.99E+01 | 4.74E+01 | −4.44E+01 | −2.10E+01 | 5.62E+01 | 1.06E+01 |

TABLE 3 B-continued

| | | | Aspheric data of third embodiment | | | | |
|---|---|---|---|---|---|---|---|---|
| S.No | Conic | Order 4 | Order 6 | Order 8 | Order 10 | Order 12 | Order 14 | Order 16 |
| 4 | −4.64E+00 | 5.47E+00 | 4.02E+00 | −9.87E+01 | 2.69E+02 | 1.06E+02 | −1.04E+03 | 1.42E+03 |
| 5 | 0.00E+00 | 0.00E+00 | 0.00E+00 | 0.00E+00 | 0.00E+00 | 0.00E+00 | 0.00E+00 | 0.00E+00 |
| 6 | −3.79E+01 | −5.30E−01 | 8.82E+00 | −4.06E+01 | 3.65E+01 | 3.73E+02 | 6.59E+02 | −8.41E+03 |
| 7 | 1.73E+00 | 6.12E−03 | −5.00E+01 | 8.55E+01 | 5.05E+02 | −2.14E+03 | −6.50E+03 | 3.99E+04 |
| 8 | −8.19E−01 | 6.16E−01 | −6.39E+01 | −2.31E+01 | 1.36E+03 | 5.06E+03 | −4.76E+04 | −1.36E+04 |
| 9 | 7.23E+00 | 3.72E+00 | 7.95E+00 | 1.26E+00 | −1.62E+03 | 1.20E+04 | 3.54E+04 | 0.00E+00 |
| 10 | −2.20E+00 | 1.15E+00 | 2.31E+01 | −1.39E+01 | 3.36E+03 | −6.05E+03 | 8.71E+04 | 0.00E+00 |
| 11 | 0.00E+00 | 0.00E+00 | 0.00E+00 | 0.00E+00 | 0.00E+00 | 0.00E+00 | 0.00E+00 | 0.00E+00 |
| 12 | 8.61E−02 | −3.69E−03 | −1.14E−03 | −2.92E−03 | 6.64E−04 | 3.53E−04 | −7.12E−04 | 0.00E+00 |
| 13 | −3.00E+01 | 4.47E−03 | 5.94E−03 | −2.09E−03 | −8.74E−03 | −4.98E−03 | 6.91E−03 | 0.00E+00 |
| 14 | −3.00E+01 | 8.27E−03 | 4.19E−02 | −2.66E−02 | −6.90E−03 | 9.56E−03 | 7.35E−05 | 0.00E+00 |
| 15 | −2.30E+00 | 2.27E−02 | 5.44E−02 | −3.29E−02 | 2.42E−02 | −1.22E−03 | 2.94E−04 | 0.00E+00 |
| 16 | 8.25E+00 | −4.32E−02 | −4.03E−03 | 1.57E−02 | −3.75E−03 | −8.88E−03 | 7.63E−03 | 0.00E+00 |
| 17 | 2.99E+00 | −2.26E−02 | 3.04E−03 | 2.19E−03 | −2.68E−04 | −1.46E−04 | 1.06E−04 | 0.00E+00 |
| 18 | 3.07E−01 | −8.54E−03 | 2.67E−03 | −6.87E−04 | 4.38E−05 | 8.97E−05 | 2.90E−07 | 0.00E+00 |
| 19 | −3.57E+00 | −3.59E−02 | 1.03E−02 | −2.05E−03 | 3.62E−04 | −3.27E−06 | −7.47E−07 | 0.00E+00 |
| 20 | −2.03E+00 | −3.54E−02 | 9.40E−03 | −4.07E−04 | −1.45E−04 | 2.68E−05 | −1.43E−06 | 0.00E+00 |
| 21 | −2.14E+01 | −2.92E−02 | 4.93E−03 | −6.84E−04 | 6.24E−05 | −4.40E−06 | 1.88E−07 | 0.00E+00 |
| 22 | 0.00E+00 | 0.00E+00 | 0.00E+00 | 0.00E+00 | 0.00E+00 | 0.00E+00 | 0.00E+00 | 0.00E+00 |
| 23 | 0.00E+00 | 0.00E+00 | 0.00E+00 | 0.00E+00 | 0.00E+00 | 0.00E+00 | 0.00E+00 | 0.00E+00 |
| | 0.00E+00 | 0.00E+00 | 0.00E+00 | 0.00E+00 | 0.00E+00 | 0.00E+00 | 0.00E+00 | 0.00E+00 |

The optical lens assembly of the third embodiment includes:

a first lens element having a planar object side surface, a planar image side surface, a thickness of about 0.105 mm, a refractive index of about 1.517, and Abbe number of about 64.2;

a second lens element having an object side surface of a radius of curvature of about −0.284 mm, an image side surface of a radius of curvature of about −0.409 mm, a thickness of about 0.154 mm, a refractive index of about 1.535, and Abbe number of about 56.0;

a third lens element having an object side surface of a radius of curvature of about 1.04 mm, an image side surface of a radius of curvature of about −2.41 mm, a thickness of about 0.293 mm, a refractive index of about 1.544, and Abbe number of about 56.1;

a fourth lens element having an object side surface of a radius of curvature of about 0.837 mm, an image side surface of a radius of curvature of about 0.365 mm, a thickness of about 0.145 mm, a refractive index of about 1.635, and Abbe number of about 23.9;

a fifth lens element having an object side surface of a radius of curvature of about 1.03 mm, an image side surface of a radius of curvature of about −0.75 mm, a thickness of about 0.237 mm, a refractive index of about 1.544, and Abbe number of about 56.1;

a sixth lens element having an object side surface of a radius of curvature of about 1.87 mm, an image side surface of a radius of curvature of about −12.90 mm, a thickness of about 0.99 mm, a refractive index of about 1.545, and Abbe number of about 56.2;

a seventh lens element having an object side surface of a radius of curvature of about −7.78 mm, an image side surface of a radius of curvature of about 3.13 mm, a thickness of about 0.30 mm, a refractive index of about 1.632, and Abbe number of about 23.4;

an eighth lens element having an object side surface of a radius of curvature of about −7.80 mm, an image side surface of a radius of curvature of about −5.36 mm, a thickness of about 0.49 mm, a refractive index of about 1.632, and Abbe number of about 23.4;

a ninth lens element having an object side surface of a radius of curvature of about −3.73 mm, an image side surface of a radius of curvature of about −1.73 mm, a thickness of about 0.89 mm, a refractive index of about 1.545, and Abbe number of about 56.2;

a tenth lens element having an object side surface of a radius of curvature of about −3.74 mm, an image side surface of a radius of curvature of about 3.35 mm, a thickness of about 0.50 mm, a refractive index of about 1.545, and Abbe number of about 56.2; and an eleventh lens element having a planar object side surface, a planar image side surface, a thickness of about 0.15 mm, a refractive index of about 1.516, and Abbe number of about 64.1, wherein the optical lens assembly comprises an aperture stop positioned between the fifth lens element and the sixth lens element, wherein the aperture stop is a planar element having a thickness of about 0.10.

Example 4

Figure 8A:
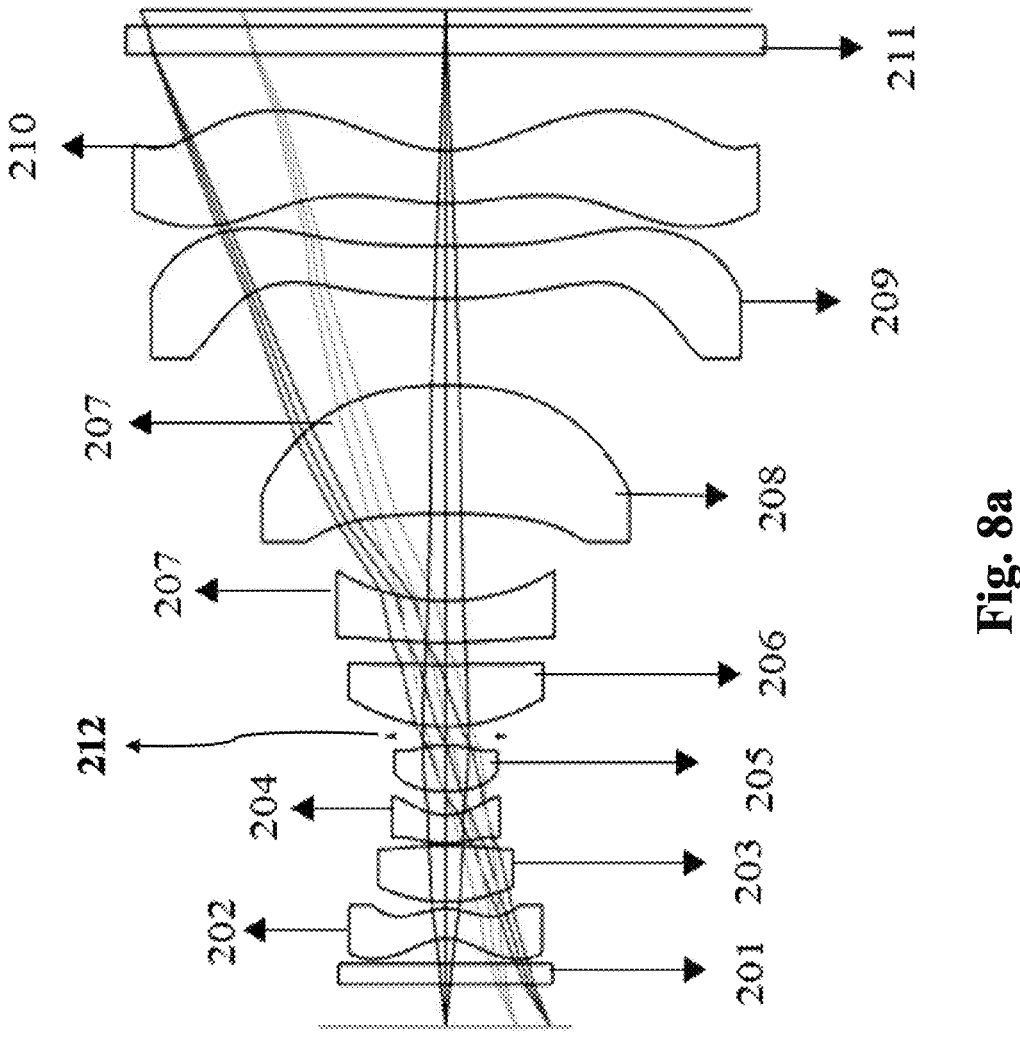

The optical lens assembly [3] in fourth embodiment comprises eleven lens elements which are sequentially arranged from object side to image side. The aperture stop [212] is located between the fifth and sixth lens elements. First five elements can act as objective assembly. The layout diagram is shown in FIG. 8a.

The first lens element [201] is protective layer or filter of glass or plastic or polymer or composite materials having refractive index is greater than 1. The second lens [202] element has negative refracting power. The image side surface comprises a convex portion in a vicinity of the optical axis and a concave portion in a vicinity of a periphery. The object side surface comprises a concave portion in a vicinity of the optical axis. The third lens [203] element has positive refracting power. Both the object-side and image-side surfaces are convex surfaces. The fourth lens [204] element has negative refracting power. The image side surface is a concave surface near the optical axis and the object side surface is a convex surface. The fifth lens [205] element has positive refracting power. Both the object-side and image-side surfaces are convex surfaces. The sixth lens

Figure 8B:
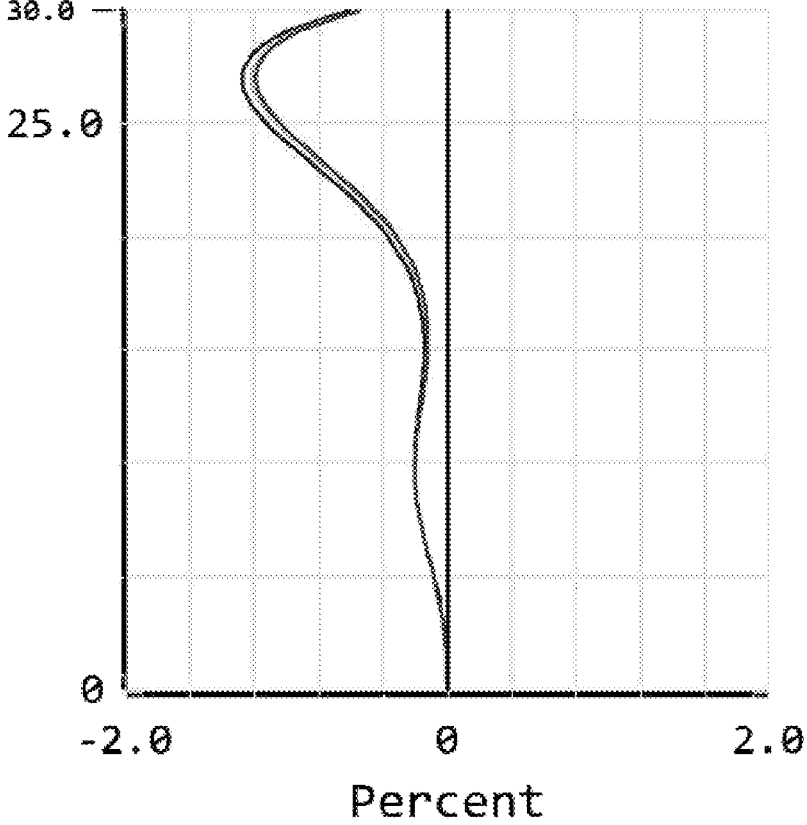
Figure 8C:
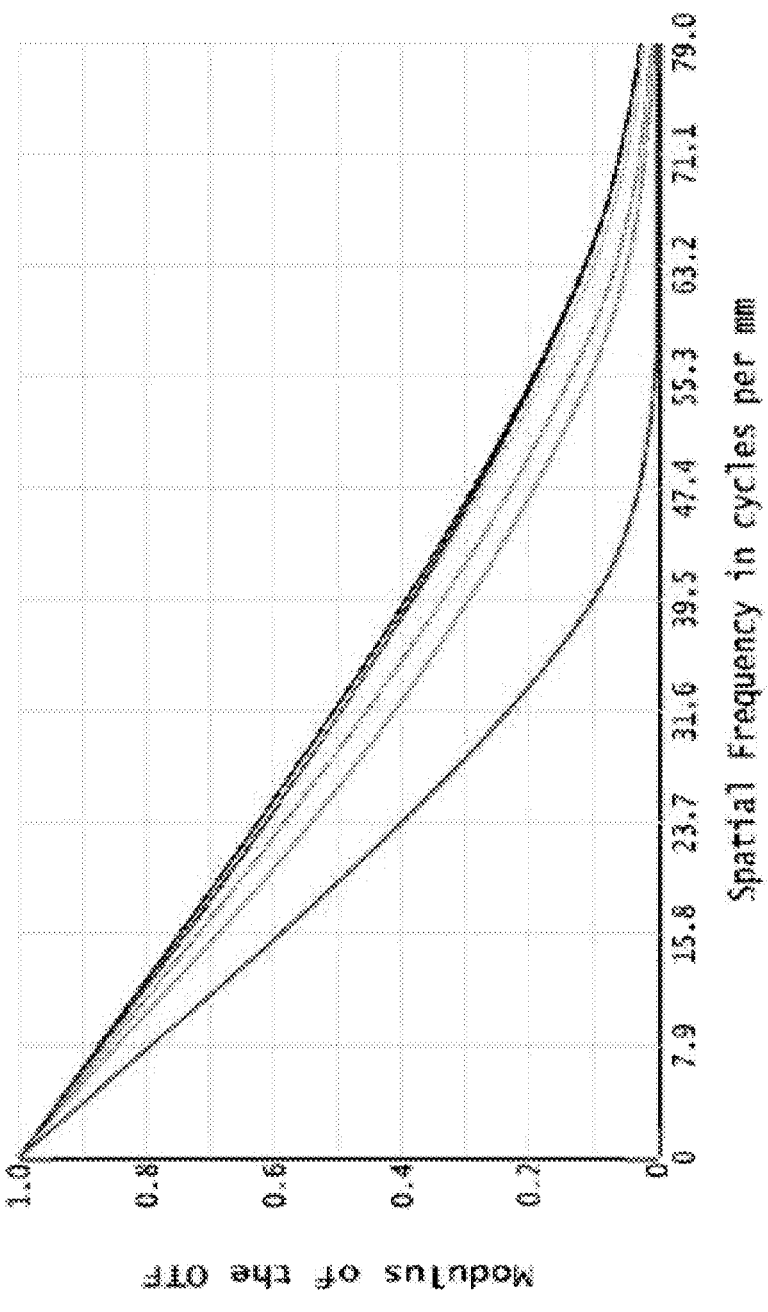

[206] element is having positive refractive power. The object side surface of the first lens element is convex. The image side surface of first lens element has a convex surface. Both the image and object sides of the lens are aspherical. The seventh lens [207] element is having a negative refractive power. The object side surface of the seventh lens element is convex. The image side surface of seventh lens element has a concave surface. Both the image and object sides of the lens are aspherical. The eighth lens [208] element is having a positive refractive power. The object side surface of the eighth lens element is concave and the image side surface of eight lens element has a convex surface. Both the image and object sides of the lens are aspherical. The ninth lens [209] element with negative refractive power has a concave image-side surface, the object-side surface and the image-side surface of the ninth lens element are aspheric, and inflection points are formed on the object-side surface and the image-side surface of the ninth lens element. The tenth lens [210] element having negative refractive power has a convex object-side surface and a concave image-side surface, the object-side surface and the image-side surface of the tenth lens element are aspheric, and inflection points are formed on the object-side surface and the image-side surface of the tenth lens element. The eleventh element [211] is a filter or IR filter. The optical lens assembly data of fourth embodiment is shown in Table.4a and aspheric data is shown in Table. 4b. The distortion plot and MTF plot is shown in FIGS. 8b and 8c. The optical assembly [3] of fourth embodiment has:

Magnifications=6×; Numerical aperture=0.024; Focal Length=0.677 mm;

System length=9.0321 mm; HFOV=30 degree; Depth of field=30.17 microns;

Airy radius=8.28 microns

TABLE 4A

| | | | Thickness (mm) of lens element | | |
| S. No. | Lens Element Number | Radius of Curvature (mm) | OR air gap (mm) with the previous or next element | Refractive Index | Abbe Number |
|---|---|---|---|---|---|
| 0 | | Infinity | 2.23E−01 | | |
| 1 | 1 | Infinity | 1.05E−01 | 1.5167 | 64.2 |
| 2 | | Infinity | 1.34E−01 | | |
| 3 | 2 | −2.84E−01 | 1.54E−01 | 1.5348 | 56.0 |
| 4 | | −4.09E−01 | 3.71E−02 | | |
| 5 | 3 | 1.04E+00 | 2.93E−01 | 1.5441 | 56.1 |
| 6 | | −2.41E+00 | 1.28E−02 | | |
| 7 | 4 | 8.37E−01 | 1.45E−01 | 1.6355 | 23.9 |
| 8 | | 3.65E−01 | 1.25E−01 | | |
| 9 | 5 | 1.03E+00 | 2.37E−01 | 1.5441 | 56.1 |
| 10 | | −7.50E−01 | 5.00E−02 | | |
| 11 | Aperture Stop | Infinity | 5.00E−02 | | |
| 12 | 6 | 2.37E+00 | 6.44E−01 | 1.544 | 55.9 |
| 13 | | 5.00E+01 | 2.32E−01 | | |
| 14 | 7 | 7.37E+00 | 4.32E−01 | 1.632 | 23.4 |
| 15 | | 2.69E+00 | 9.08E−01 | | |
| 16 | 8 | −1.34E+01 | 1.34E+00 | 1.544 | 55.9 |
| 17 | | −4.61E+00 | 9.00E−01 | | |
| 18 | 9 | 6.26E+00 | 5.50E−01 | 1.544 | 55.9 |
| 19 | | 1.00E+02 | 4.44E−01 | | |
| 20 | 10 | 3.23E+00 | 5.50E−01 | 1.544 | 55.9 |
| 21 | | 1.50E+00 | 1.00E+00 | | |
| 22 | 11 | Infinity | 3.00E−01 | 1.517 | 64.2 |
| 23 | | Infinity | 1.66E−01 | | |

TABLE 4B

Aspheric data of fourth embodiment

| S.No | Conic | Order 4 | Order 6 | Order 8 | Order 10 | Order 12 | Order 14 | Order 16 |
|---|---|---|---|---|---|---|---|---|
| 0 | 0.00E+00 | 0.00E+00 | 0.00E+00 | 0.00E+00 | 0.00E+00 | 0.00E+00 | 0.00E+00 | 0.00E+00 |
| 1 | 0.00E+00 | 0.00E+00 | 0.00E+00 | 0.00E+00 | 0.00E+00 | 0.00E+00 | 0.00E+00 | 0.00E+00 |
| 2 | 0.00E+00 | 0.00E+00 | 0.00E+00 | 0.00E+00 | 0.00E+00 | 0.00E+00 | 0.00E+00 | 0.00E+00 |
| 3 | −2.61E+00 | 5.19E+00 | −1.99E+01 | 4.74E+01 | −4.44E+01 | −2.10E+01 | 5.62E+01 | 1.06E+01 |
| 4 | −4.64E+00 | 5.47E+00 | 4.02E+00 | −9.87E+01 | 2.69E+02 | 1.06E+02 | −1.04E+03 | 1.42E+03 |
| 5 | 0.00E+00 | 0.00E+00 | 0.00E+00 | 0.00E+00 | 0.00E+00 | 0.00E+00 | 0.00E+00 | 0.00E+00 |
| 6 | −3.79E+01 | −5.30E−01 | 8.82E+00 | −4.06E+01 | 3.65E+01 | 3.73E+02 | 6.59E+02 | −8.41E+03 |
| 7 | 1.73E+00 | 6.12E−03 | −5.00E+01 | 8.55E+01 | 5.05E+02 | −2.14E+03 | −6.50E+03 | 3.99E+04 |
| 8 | −8.19E−01 | 6.16E−01 | −6.39E+01 | −2.31E+01 | 1.36E+03 | 5.06E+03 | −4.76E+04 | −1.36E+04 |
| 9 | 7.23E+00 | 3.72E+00 | 7.95E+00 | 1.26E+00 | −1.62E+03 | 1.20E+04 | 3.54E+04 | 0.00E+00 |
| 10 | −2.20E+00 | 1.15E+00 | 2.31E+01 | −1.39E+01 | 3.36E+03 | −6.05E+03 | 8.71E+04 | 0.00E+00 |
| 11 | 0.00E+00 | 0.00E+00 | 0.00E+00 | 0.00E+00 | 0.00E+00 | 0.00E+00 | 0.00E+00 | 0.00E+00 |
| 12 | 3.40E−02 | 2.51E−03 | 2.31E−03 | −1.13E−03 | −1.00E−03 | 6.22E−06 | 0.00E+00 | 0.00E+00 |
| 13 | −1.00E+00 | −9.82E−03 | 1.24E−02 | −5.75E−02 | 2.00E−03 | 0.00E+00 | 0.00E+00 | 0.00E+00 |
| 14 | −2.00E+01 | −3.58E−02 | 2.28E−02 | −7.30E−03 | 6.74E−04 | 0.00E+00 | 0.00E+00 | 0.00E+00 |
| 15 | −4.45E+00 | −1.99E−03 | 1.86E−02 | −5.59E−03 | 1.34E−03 | 0.00E+00 | 0.00E+00 | 0.00E+00 |
| 16 | −1.00E+00 | −2.42E−02 | 2.78E−03 | −3.13E−03 | 9.15E−04 | −3.87E−06 | −8.79E−05 | 2.24E−05 |
| 17 | 3.10E+00 | −2.61E−02 | 5.44E−03 | −1.22E−03 | 1.19E−04 | 0.00E+00 | 0.00E+00 | 0.00E+00 |
| 18 | −1.99E+00 | −1.68E−03 | −1.65E−03 | −1.33E−04 | 7.52E−07 | 1.66E−06 | 0.00E+00 | 0.00E+00 |
| 19 | −1.00E+00 | 2.94E−02 | −7.09E−03 | 5.71E−04 | −1.52E−05 | −1.86E−07 | 0.00E+00 | 0.00E+00 |
| 20 | −2.00E+01 | −4.34E−02 | 6.34E−03 | −3.54E−04 | 7.34E−06 | 0.00E+00 | 0.00E+00 | 0.00E+00 |
| 21 | −4.76E+00 | −3.00E−02 | 4.67E−03 | −5.28E−04 | 2.15E−05 | 8.04E−07 | −5.49E−08 | 0.00E+00 |
| 22 | 0.00E+00 | 0.00E+00 | 0.00E+00 | 0.00E+00 | 0.00E+00 | 0.00E+00 | 0.00E+00 | 0.00E+00 |
| 23 | 0.00E+00 | 0.00E+00 | 0.00E+00 | 0.00E+00 | 0.00E+00 | 0.00E+00 | 0.00E+00 | 0.00E+00 |

The optical lens assembly of the fourth embodiment includes:

a first lens element having a planar object side surface, a planar image side surface, a thickness of about 0.105 mm, a refractive index of about 1.5167, and Abbe number of about 64.2;

a second lens element having an object side surface of a radius of curvature of about –0.284 mm, an image side surface of a radius of curvature of about –0.409 mm, a thickness of about 0.154 mm, a refractive index of about 1.5348, and Abbe number of about 56.0;

a third lens element having an object side surface of a radius of curvature of about 1.04 mm, an image side surface of a radius of curvature of about –2.41 mm, a thickness of about 0.293 mm, a refractive index of about 1.5441, and Abbe number of about 56.1;

a fourth lens element having an object side surface of a radius of curvature of about 0.837 mm, an image side surface of a radius of curvature of about 0.365 mm, a thickness of about 0.145 mm, a refractive index of about 1.6355, and Abbe number of about 23.9;

a fifth lens element having an object side surface of a radius of curvature of about 1.03 mm, an image side surface of a radius of curvature of about –0.75 mm, a thickness of about 0.237 mm, a refractive index of about 1.5441, and Abbe number of about 56.1;

a sixth lens element having an object side surface of a radius of curvature of about 2.37 mm, an image side surface of a radius of curvature of about 50.00 mm, a thickness of about 0.644 mm, a refractive index of about 1.544, and Abbe number of about 55.9;

a seventh lens element having an object side surface of a radius of curvature of about 7.37 mm, an image side surface of a radius of curvature of about 2.69 mm, a thickness of about 0.432 mm, a refractive index of about 1.632, and Abbe number of about 23.4;

an eighth lens element having an object side surface of a radius of curvature of about –13.40 mm, an image side surface of a radius of curvature of about –4.61 mm, a thickness of about 1.34 mm, a refractive index of about 1.544, and Abbe number of about 55.9;

a ninth lens element having an object side surface of a radius of curvature of about 6.26 mm, an image side surface of a radius of curvature of about 10.0 mm, a thickness of about 0.55 mm, a refractive index of about 1.544, and Abbe number of about 55.9;

a tenth lens element having an object side surface of a radius of curvature of about –3.23 mm, an image side surface of a radius of curvature of about 1.50 mm, a thickness of about 0.55 mm, a refractive index of about 1.544, and Abbe number of about 55.9; and an eleventh lens element having a planar object side surface, a planar image side surface, a thickness of about 0.30 mm, a refractive index of about 1.517, and Abbe number of about 64.2, wherein the optical lens assembly comprises an aperture stop positioned between the fifth lens element and the sixth lens element, wherein the aperture stop is a planar element having a thickness of about 0.05.

Example 5

Figure 9A:
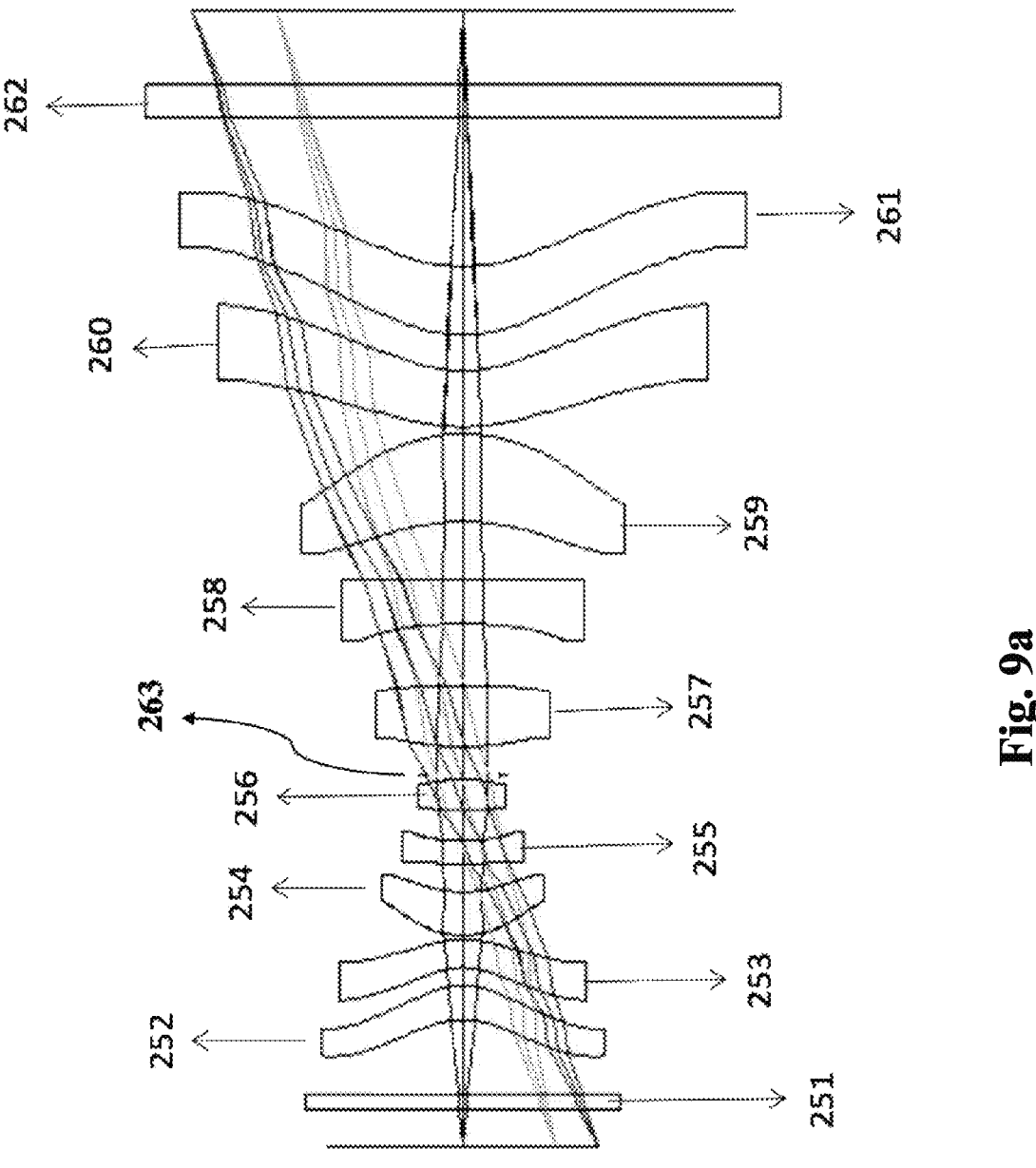

The optical lens assembly [3] in fifth embodiment comprises twelve lens elements which are sequentially arranged from object side to image side. The aperture stop [263] is located between the sixth and seventh lens elements. First six elements can act as objective assembly. The layout diagram is shown in FIG. 9a.

Figure 9B:
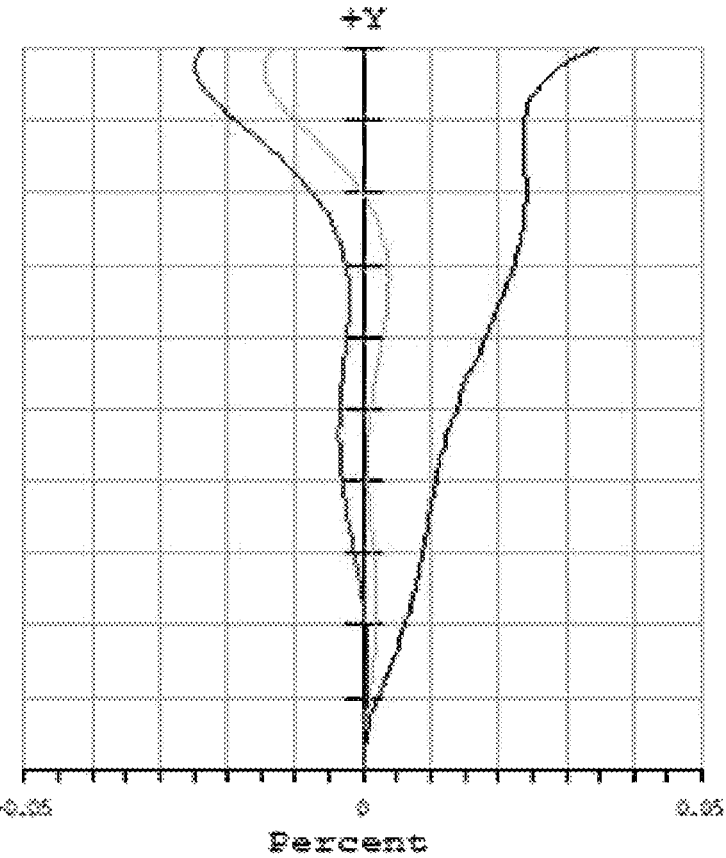
Figure 9C:
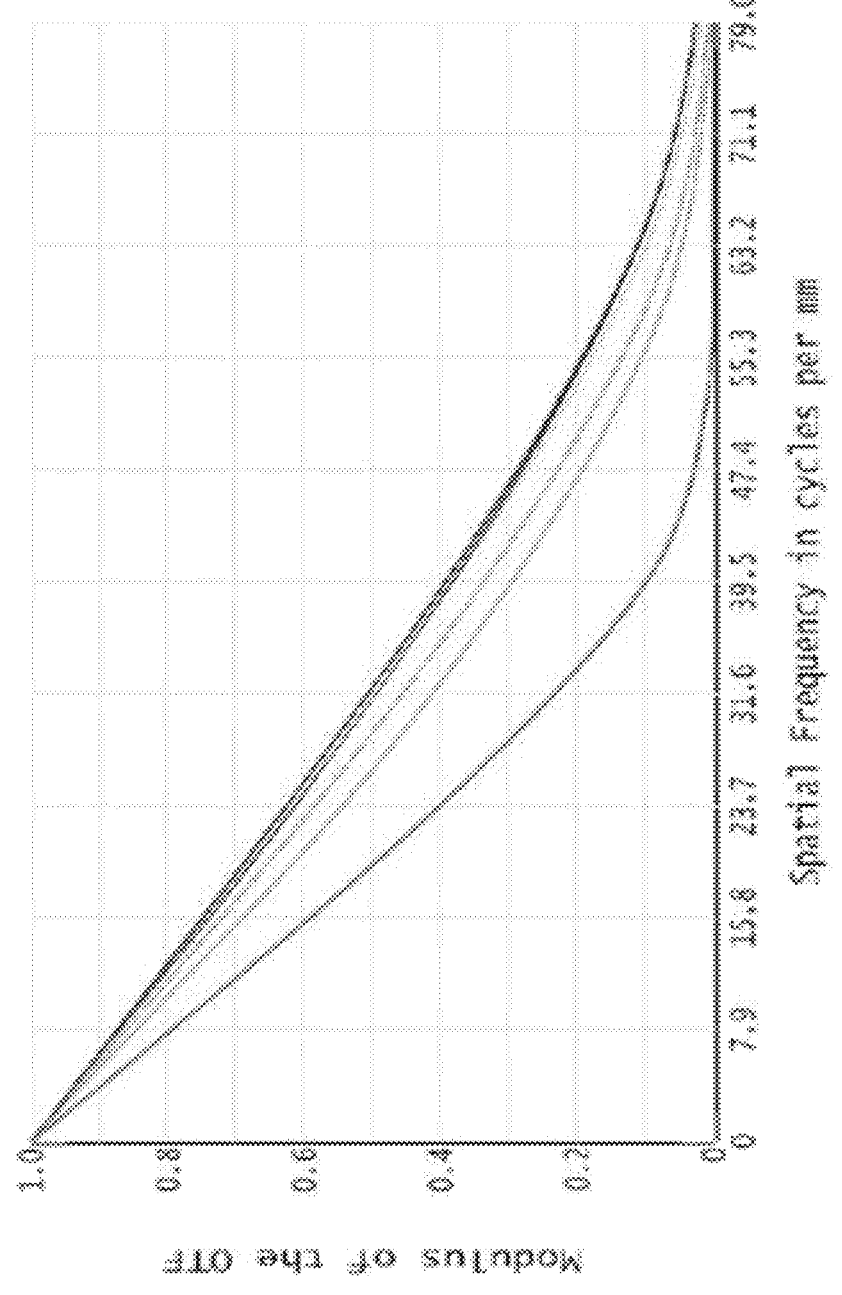

The first lens element [251] is protective layer or filter of glass or plastic or polymer or composite materials having refractive index is greater than 1. The second lens [252] element is having positive refractive power. The image side surface of the second lens element is Convex portion in vicinity of optical axis, concave portion in a vicinity of a periphery of the lens element. The object side surface of second lens element is Concave portion in vicinity of optical axis and convex in the vicinity of a periphery. The third lens [253] element is having negative refractive power. The image side surface of the second lens element is Convex near optical axis and object side surface is Concave near optical axis. The fourth lens [254] element is having positive refractive power. The image side surface of third lens element is Concave and object side surface is Convex. The fifth lens [255] element is having negative refractive power. Both image side surface of the fourth lens element is concave. The sixth lens [256] element is having positive refractive power. The image side surface of the fifth lens element is Convex and object side surface is Plane or convex. The seventh lens [257] element has positive refracting power. The object-side surface is a convex surface and meniscus. The eight-lens [258] element has negative refracting power. The object-side surface is a concave surface. The ninth lens [259] element has positive refracting power. The object-side surface is a concave surface comprising a concave portion in a vicinity of the optical and is meniscus. The image-side surface is a convex surface comprising a convex portion in a vicinity of a periphery of the eighth lens element and is meniscus. The ten-lens [260] element has negative refracting power. The object-side surface is a convex surface near the vicinity of the optical axis and is meniscus. The image-side surface is concave near the optical axis. The eleventh lens [261] element has positive refracting power. The object-side surface comprises a convex portion in a vicinity of the optical axis and a concave portion in a vicinity of a periphery of the tenth lens element. The image-side surface comprises a concave portion in a vicinity of the optical axis and a convex portion in a vicinity of a periphery of the tenth lens element. The twelfth lens [262] element is the filter or IR filter. The optical lens assembly data of fifth embodiment is shown in Table. 5A and aspheric data is shown in Table. 5 B. The distortion plot and MTF plot is shown in FIGS. 9b and 9c. The optical assembly [3] of fifth embodiment has:

Magnifications=2×; Numerical aperture=0.050; Focal Length=1.42983 mm;

System length=7.348 mm; HFOV=25 degree; Depth of field=58.23 microns;

Airy radius=7.142 microns

TABLE 5A

| | | | Optical lens assembly data of fifth embodiment | | |
|---|---|---|---|---|---|
| S. No | Lens Element Number | Radius of Curvature (mm) | Thickness (mm) of lens element OR air gap (mm) with the previous or next element | Refractive index | Abbe number |
| 0 | | Infinity | 2.49E−01 | | |
| 1 | 1 | Infinity | 1.05E−01 | 1.52 | 64.2 |
| 2 | | Infinity | 5.01E−01 | | |
| 3 | 2 | −1.70E+00 | 2.30E−01 | 1.53 | 55.8 |
| 4 | | −2.11E+00 | 1.20E−01 | | |
| 5 | 3 | −2.08E+00 | 1.87E−01 | 1.53 | 55.8 |

TABLE 5A-continued

Optical lens assembly data of fifth embodiment

| S. No | Lens Element Number | Radius of Curvature (mm) | Thickness (mm) of lens element OR air gap (mm) with the previous or next element | Refractive index | Abbe number |
|---|---|---|---|---|---|
| 6 | | −1.37E+00 | 2.50E−02 | | |
| 7 | 4 | 1.53E+00 | 2.92E−01 | 1.53 | 55.8 |
| 8 | | 1.28E+00 | 1.92E−01 | | |
| 9 | 5 | 8.97E−02 | 1.50E−01 | 1.63 | 23.4 |
| 10 | | 5.45E−01 | 2.10E−01 | | |
| 11 | 6 | 6.56E−02 | 2.02E−01 | 1.54 | 55.9 |
| 12 | | −9.63E−01 | 3.20E−02 | | |
| 13 | Aperture Stop | 0.00E+00 | 1.86E−01 | | |
| 14 | 7 | 4.81E−01 | 4.03E−01 | 1.54 | 55.9 |
| 15 | | −3.28E−02 | 4.19E−01 | | |
| 16 | 8 | −2.72E−01 | 3.00E−01 | 1.63 | 23.4 |
| 17 | | −4.48E−02 | 3.83E−01 | | |
| 18 | 9 | −6.40E−01 | 5.83E−01 | 1.53 | 55.8 |
| 19 | | −7.63E−01 | 5.00E−02 | | |
| 20 | 10 | 6.86E−01 | 3.73E−01 | 1.53 | 55.8 |
| 21 | | 1.04E+00 | 2.39E−01 | | |
| 22 | 11 | 1.05E+00 | 4.60E−01 | 1.53 | 55.8 |
| 23 | | 8.49E−01 | 1.00E+00 | | |
| 24 | 12 | 0.00E+00 | 2.10E−01 | 1.52 | 64.2 |
| 25 | | 0.00E+00 | 4.97E−01 | | |

TABLE 5B

The aspheric data of fifth embodiment

| S.No | Conic | $4^{th}$ order | $6^{th}$ order | $8^{th}$ order | $10^{th}$ order | $12^{th}$ order | $14^{th}$ order | $16^{th}$ order |
|---|---|---|---|---|---|---|---|---|
| 0 | 0.00E+00 | 0.00E+00 | 0.00E+00 | 0.00E+00 | 0.00E+00 | 0.00E+00 | 0.00E+00 | 0.00E+00 |
| 1 | 0.00E+00 | 0.00E+00 | 0.00E+00 | 0.00E+00 | 0.00E+00 | 0.00E+00 | 0.00E+00 | 0.00E+00 |
| 2 | 0.00E+00 | 0.00E+00 | 0.00E+00 | 0.00E+00 | 0.00E+00 | 0.00E+00 | 0.00E+00 | 0.00E+00 |
| 3 | −4.10E+00 | 1.68E−01 | 5.01E−03 | −5.44E−03 | −4.59E−03 | −5.31E−04 | 0.00E+00 | 0.00E+00 |
| 4 | −4.10E+00 | 1.26E−01 | 2.32E−02 | −5.16E−03 | −1.88E−03 | −2.64E−03 | 0.00E+00 | 0.00E+00 |
| 5 | −5.54E+00 | 2.11E−01 | −1.21E−01 | 1.09E−01 | −3.56E−02 | −7.38E−04 | 1.27E−03 | 0.00E+00 |
| 6 | −7.55E+00 | 2.94E−01 | −3.52E−01 | 3.04E−01 | −1.46E−01 | −2.09E−02 | 4.53E−02 | 0.00E+00 |
| 7 | −1.09E+00 | 3.09E−01 | −1.05E+00 | 3.82E−01 | −5.46E+00 | 1.90E+00 | 6.41E+00 | 0.00E+00 |
| 8 | −9.88E+00 | 7.94E−01 | −5.19E+00 | 1.13E+01 | −1.18E+01 | 3.77E+01 | −5.34E+01 | −1.12E+02 |
| 9 | 1.00E+00 | −3.14E−01 | 1.42E+00 | −1.61E−01 | −8.23E+00 | −1.31E+01 | −2.45E+02 | 4.79E+02 |
| 10 | 4.79E−01 | 7.85E−01 | 3.55E+00 | 4.56E+00 | −1.22E+01 | −4.54E+02 | −1.72E+03 | 5.46E+03 |
| 11 | 1.00E+00 | 9.98E−01 | 4.93E+00 | 3.22E+00 | 7.63E+00 | 5.20E+02 | 2.80E+03 | −5.18E+04 |
| 12 | −2.35E+00 | 1.49E−01 | 2.61E+00 | 9.55E+00 | 5.65E+01 | 1.28E+02 | 9.01E+02 | 8.23E+03 |
| 13 | 0.00E+00 | 0.00E+00 | 0.00E+00 | 0.00E+00 | 0.00E+00 | 0.00E+00 | 0.00E+00 | 0.00E+00 |
| 14 | −2.35E+00 | −1.86E−02 | −8.14E−02 | −7.46E−02 | −1.10E−01 | −6.27E−02 | −1.10E−01 | −2.51E−01 |
| 15 | 1.00E+00 | −1.25E−01 | −1.54E−01 | −2.52E−02 | −1.49E−02 | −2.54E−01 | −3.42E−01 | 1.58E+00 |
| 16 | 4.79E−01 | −9.81E−02 | −1.11E−01 | −3.56E−02 | 2.38E−02 | 2.22E−01 | 2.09E−01 | −1.67E−01 |
| 17 | 1.00E+00 | 3.93E−02 | −4.43E−02 | 1.25E−03 | 1.61E−02 | 6.40E−03 | 2.99E−02 | −1.46E−02 |
| 18 | −9.88E+00 | −9.92E−02 | 1.62E−01 | −8.81E−02 | 2.30E−02 | −1.84E−02 | 6.52E−03 | 3.43E−03 |
| 19 | −1.09E+00 | −3.86E−02 | 3.29E−02 | −2.99E−03 | 1.07E−02 | −9.28E−04 | −7.82E−04 | 0.00E+00 |
| 20 | −7.55E+00 | −3.67E−02 | 1.10E−02 | −2.38E−03 | 2.84E−04 | 1.02E−05 | −5.54E−06 | 0.00E+00 |
| 21 | −5.54E+00 | −2.63E−02 | 3.80E−03 | −8.51E−04 | 6.95E−05 | 3.60E−07 | −1.55E−07 | 0.00E+00 |
| 22 | −4.10E+00 | −1.58E−02 | −7.24E−04 | 4.03E−05 | 3.68E−06 | 1.29E−06 | 0.00E+00 | 0.00E+00 |
| 23 | −4.10E+00 | −2.10E−02 | −1.57E−04 | 4.25E−05 | 8.96E−06 | 2.59E−07 | 0.00E+00 | 0.00E+00 |
| 24 | 0.00E+00 | 0.00E+00 | 0.00E+00 | 0.00E+00 | 0.00E+00 | 0.00E+00 | 0.00E+00 | 0.00E+00 |
| 25 | 0.00E+00 | 0.00E+00 | 0.00E+00 | 0.00E+00 | 0.00E+00 | 0.00E+00 | 0.00E+00 | 0.00E+00 |

The optical lens assembly of the fifth embodiment includes:

a first lens element having a planar object side surface, a planar image side surface, a thickness of about 0.105 mm, a refractive index of about 1.52, and Abbe number of about 64.2;

a second lens element having an object side surface of a radius of curvature of about −1.70 mm, an image side surface of a radius of curvature of about −2.11 mm, a thickness of about 0.23 mm, a refractive index of about 1.53, and Abbe number of about 55.8;

a third lens element having an object side surface of a radius of curvature of about −2.08 mm, an image side surface of a radius of curvature of about −1.37 mm, a thickness of about 0.187 mm, a refractive index of about 1.53, and Abbe number of about 55.8;

a fourth lens element having an object side surface of a radius of curvature of about 1.53 mm, an image side surface of a radius of curvature of about 1.28 mm, a thickness of about 0.292 mm, a refractive index of about 1.53, and Abbe number of about 55.8;

a fifth lens element having an object side surface of a radius of curvature of about 0.0897 mm, an image side surface of a radius of curvature of about 0.545 mm, a thickness of about 0.15 mm, a refractive index of about 1.63, and Abbe number of about 23.4;

a sixth lens element having an object side surface of a radius of curvature of about 0.0656 mm, an image side surface of a radius of curvature of about −0.963 mm, a thickness of about 0.202 mm, a refractive index of about 1.54, and Abbe number of about 55.9;

a seventh lens element having an object side surface of a radius of curvature of about 0.481 mm, an image side surface of a radius of curvature of about −0.0328 mm, a thickness of about 0.403 mm, a refractive index of about 1.54, and Abbe number of about 55.9;

an eighth lens element having an object side surface of a radius of curvature of about −0.272 mm, an image side surface of a radius of curvature of about −0.0448 mm, a thickness of about 0.30 mm, a refractive index of about 1.63, and Abbe number of about 23.4;

a ninth lens element having an object side surface of a radius of curvature of about −0.64 mm, an image side surface of a radius of curvature of about −0.763 mm, a thickness of about 0.583 mm, a refractive index of about 1.53, and Abbe number of about 55.8;

a tenth lens element having an object side surface of a radius of curvature of about 0.686 mm, an image side surface of a radius of curvature of about 1.04 mm, a thickness of about 0.373 mm, a refractive index of about 1.53, and Abbe number of about 55.8;

an eleventh lens element having an object side surface of a radius of curvature of about 1.05 mm, an image side surface of a radius of curvature of about 0.849 mm, a thickness of about 0.46 mm, a refractive index of about 1.53, and Abbe number of about 55.8; and a twelfth lens element having a planar object side surface, a planar image side surface, a thickness of about 0.21 mm, a refractive index of about 1.52, and Abbe number of about 64.2, wherein the optical lens assembly comprises an aperture stop positioned between the sixth lens element and the seventh lens element, wherein the aperture stop is a planar element having a thickness of about 0.186.

Example 6

Figure 10A:
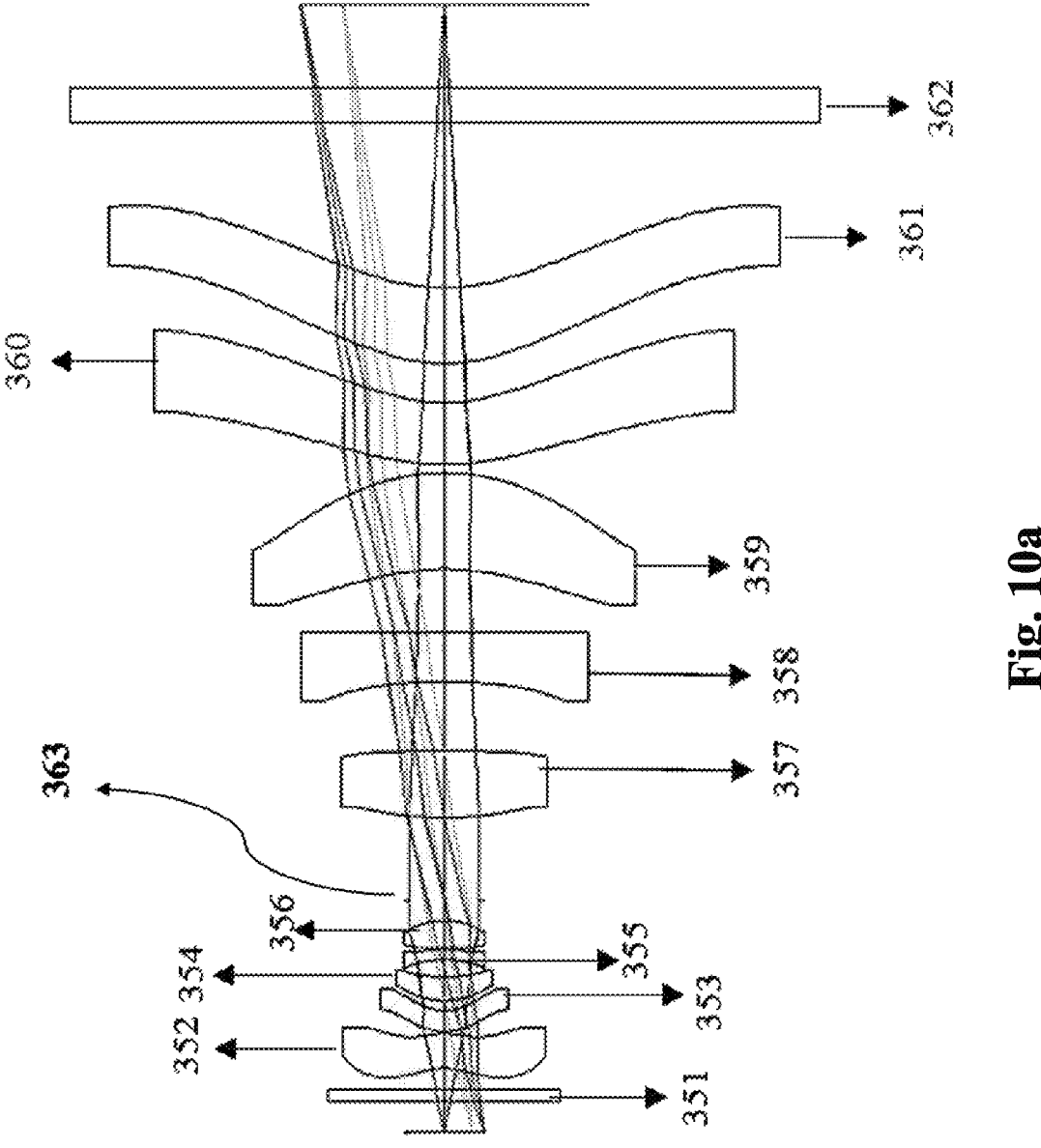

The optical lens assembly [3] in sixth embodiment comprises twelve elements which are sequentially arranged from object side to image side. The aperture stop [363] is located between the sixth and seventh lens elements. First six elements can act as objective assembly. The layout diagram is shown in FIG. 10a.

Figure 10B:
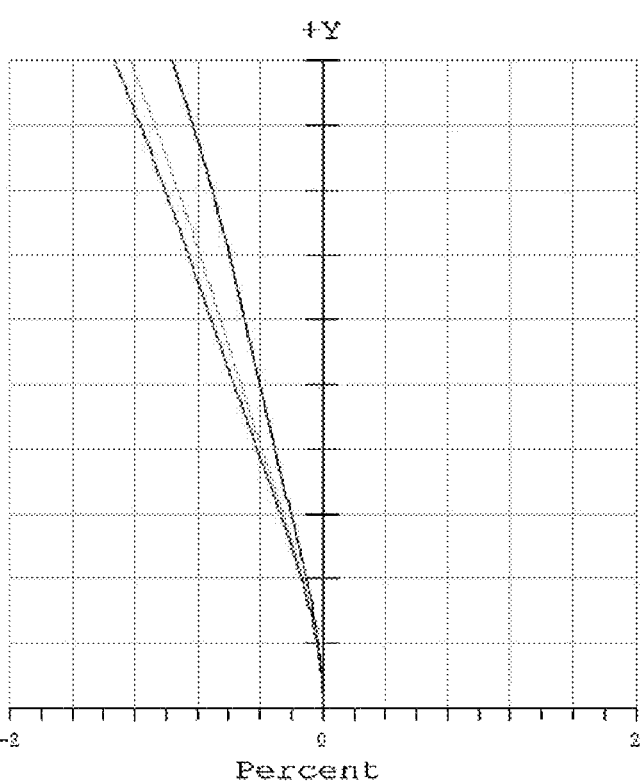
Figure 10C:
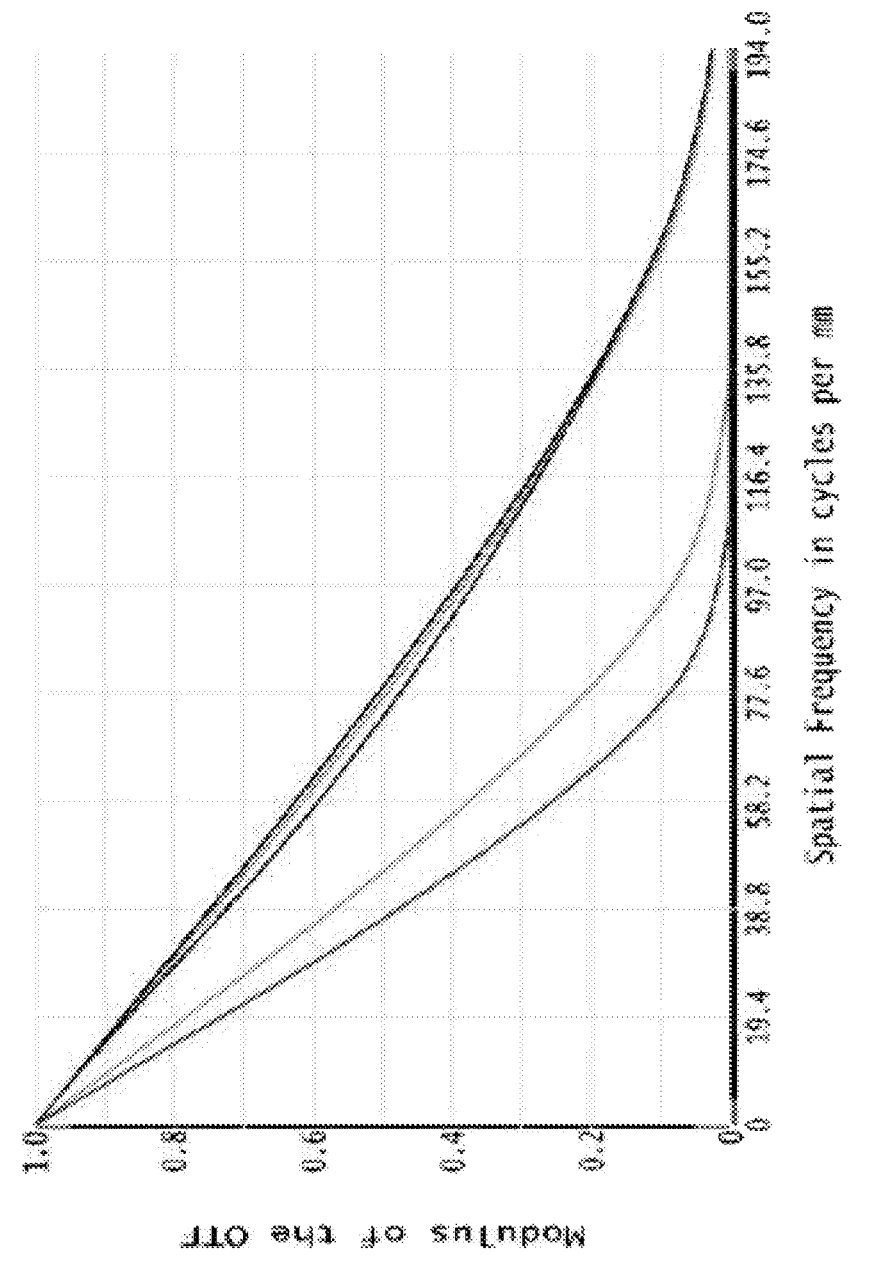

The first lens element [351] is protective layer or filter of glass or plastic or polymer or composite materials having refractive index is greater than 1. The second lens [352] element is having a refractive power. The image side surface of the second lens element is convex portion in vicinity of optical axis, concave portion in a vicinity of a periphery of the lens element. The third lens [353] element is having refractive power. The object side surface of the second lens element is Convex and image side surface is Concave in vicinity of axis. The fourth lens [354] element is having refractive power. The object side surface of third lens element is convex portion in vicinity of axis and image side surface is concave. The fifth lens [355] element is having negative refractive power. The object side surface of the fourth lens element is convex and image side surface is concave or plan surface. The sixth lens [356] element is having positive refractive power. The image side surface is Convex portion in vicinity of periphery. The seventh lens [357] element has positive refracting power. The object-side surface is a convex surface and meniscus. The eight-lens [358] element has negative refracting power. The object-side surface is a concave surface comprising a concave portion in a vicinity of the optical and is meniscus. The image-side surface is a convex surface comprising a convex portion in a vicinity of a periphery of the eighth lens element and is meniscus. The nine-lens [359] element has positive refracting power. The object-side surface is a concave surface near the vicinity of the optical axis and is meniscus. The image-side surface is convex near the optical axis. The tenth lens [360] element has negative refracting power. The object-side surface comprises a convex portion in a vicinity of the optical axis and a concave portion in a vicinity of a periphery of the tenth lens element. The eleventh lens [361] element has positive refracting power. The image-side surface comprises a concave portion in a vicinity of the optical axis and a convex portion in a vicinity of a periphery of the eleventh lens element. Twelfth element [362] is the filter or IR filter. The optical lens assembly data of sixth embodiment is shown in Table.6A and aspheric data is shown in Table.6B. The distortion plot and MTF plot is shown in FIGS. 10c and 10b. The optical assembly [3] of sixth embodiment has:

Magnifications=3×; Numerical aperture=0.059; Focal Length=0.9843 mm; System length=6.63 mm; HFOV=13 degree; Depth of field=20.01 micron; Airy radius=6.28 microns

TABLE 6A

Optical assembly data of sixth embodiment

| S. No | Lens Element Number | Radius of Curvature (mm) | Thickness (mm) of lens element OR air gap (mm) with the previous or next element | Refractive index | Abbe number |
|---|---|---|---|---|---|
| 0 | | Infinity | 1.83E−01 | | |
| 1 | 1 | Infinity | 7.50E−02 | 1.517 | 64.2 |
| 2 | | Infinity | 1.25E−01 | | |
| 3 | 2 | −2.70E+00 | 2.11E−01 | 1.54 | 56.1 |
| 4 | | −2.40E+00 | 1.30E−02 | | |
| 5 | 3 | 2.77E+00 | 1.24E−01 | 1.64 | 23.3 |
| 6 | | 4.40E+00 | 6.35E−02 | | |
| 7 | 4 | 2.05E+00 | 1.45E−01 | 1.54 | 56.1 |
| 8 | | 5.05E−01 | 1.02E−01 | | |
| 9 | 5 | −1.47E+00 | 5.75E−02 | 1.64 | 23.3 |
| 10 | | −5.21E−01 | 1.93E−02 | | |
| 11 | 6 | −2.41E−02 | 1.61E−01 | 1.54 | 56.1 |
| 12 | | −2.37E+00 | 1.23E−01 | | |
| 13 | Aperture Stop | 0.00E+00 | 5.00E−01 | | |
| 14 | 7 | 4.81E−01 | 4.03E−01 | 1.54 | 55.9 |
| 15 | | −3.28E−02 | 4.19E−01 | | |
| 16 | 8 | −2.72E−01 | 3.00E−01 | 1.63 | 23.4 |
| 17 | | −4.48E−02 | 3.83E−01 | | |
| 18 | 9 | −6.40E−01 | 5.83E−01 | 1.53 | 55.8 |
| 19 | | −7.63E−01 | 5.00E−02 | | |
| 20 | 10 | 6.86E−01 | 3.73E−01 | 1.53 | 55.8 |
| 21 | | 1.04E+00 | 2.39E−01 | | |
| 22 | 11 | 1.05E+00 | 4.60E−01 | 1.53 | 55.8 |
| 23 | | 8.49E−01 | 1.00E+00 | | |
| 24 | 12 | 0.00E+00 | 2.10E−01 | 1.52 | 64.2 |
| 25 | | 0.00E+00 | 4.97E−01 | | |

TABLE 6B

Aspheric data of sixth embodiment

| S. No | Conic | 4th order | 6th order | 8th order | 10th order | 12th order | 14th order | 16th order |
|---|---|---|---|---|---|---|---|---|
| 0 | 0.00E+00 | 0.00E+00 | 0.00E+00 | 0.00E+00 | 0.00E+00 | 0.00E+00 | 0.00E+00 | 0.00E+00 |
| 1 | 0.00E+00 | 0.00E+00 | 0.00E+00 | 0.00E+00 | 0.00E+00 | 0.00E+00 | 0.00E+00 | 0.00E+00 |
| 2 | 0.00E+00 | 0.00E+00 | 0.00E+00 | 0.00E+00 | 0.00E+00 | 0.00E+00 | 0.00E+00 | 0.00E+00 |
| 3 | −5.52E+00 | 5.00E+00 | −2.43E+01 | 9.01E+01 | −1.76E+02 | 5.51E+01 | 4.63E+02 | −6.25E+02 |
| 4 | −1.41E+01 | 9.36E+00 | −4.48E+01 | 5.94E+01 | 1.15E+02 | −4.32E+02 | 4.28E+02 | −1.24E+02 |
| 5 | −3.74E+00 | 9.57E+00 | −1.04E+02 | 2.28E+02 | −6.22E+02 | 1.20E+04 | −5.08E+04 | 5.87E+04 |
| 6 | −6.57E+00 | 2.06E+01 | −3.09E+02 | 2.83E+02 | 1.72E+04 | 6.57E+04 | −2.35E+06 | 1.06E+07 |
| 7 | −2.94E+01 | 2.32E+01 | −4.20E+02 | 4.84E+03 | −3.94E+04 | 1.98E+05 | 6.08E+05 | −1.16E+07 |
| 8 | 1.28E+01 | 4.76E+00 | 7.04E+00 | −9.63E+02 | 2.74E+04 | −2.10E+05 | 6.26E+05 | −1.71E+07 |
| 9 | −1.95E+00 | −9.18E−01 | −1.04E+01 | −9.83E+02 | 2.97E+04 | −3.41E+05 | −1.18E+06 | 1.88E+07 |

TABLE 6B-continued

| | | | | Aspheric data of sixth embodiment | | | |
|---|---|---|---|---|---|---|---|
| S. No | Conic | $4^{th}$ order | $6^{th}$ order | $8^{th}$ order | $10^{th}$ order | $12^{th}$ order | $14^{th}$ order | $16^{th}$ order |
| 10 | 0.00E+00 | 1.12E+00 | 1.82E+01 | −3.64E+02 | 9.62E+03 | 1.35E+05 | −4.80E+06 | 1.98E+07 |
| 11 | 0.00E+00 | 3.39E−01 | 4.16E+01 | −3.51E+02 | 1.27E+04 | −1.89E+04 | 1.74E+05 | −9.54E+06 |
| 12 | −3.37E−01 | −3.93E−01 | −9.26E+00 | 3.53E+02 | −5.95E+03 | 1.18E+05 | −4.45E+05 | 7.08E+06 |
| 13 | 0.00E+00 | 0.00E+00 | 0.00E+00 | 0.00E+00 | 0.00E+00 | 0.00E+00 | 0.00E+00 | 0.00E+00 |
| 14 | −2.35E+00 | −1.86E−02 | −8.14E−02 | −7.46E−02 | −1.10E−01 | −6.27E−02 | −1.10E−01 | −2.51E−01 |
| 15 | 1.00E+00 | −1.25E−01 | −1.54E−01 | −2.52E−02 | −1.49E−02 | −2.54E−01 | −3.42E−01 | 1.58E+00 |
| 16 | 4.79E−01 | −9.81E−02 | −1.11E−01 | −3.56E−02 | 2.38E−02 | 2.22E−01 | 2.09E−01 | −1.67E−01 |
| 17 | 1.00E+00 | 3.93E−02 | −4.43E−02 | 1.25E−03 | 1.61E−02 | 6.40E−03 | 2.99E−02 | −1.46E−02 |
| 18 | −9.88E+00 | −9.92E−02 | 1.62E−01 | −8.81E−02 | 2.30E−02 | −1.84E−02 | 6.52E−03 | 3.43E−03 |
| 19 | −1.09E+00 | −3.86E−02 | 3.29E−02 | −2.99E−03 | 1.07E−02 | −9.28E−04 | −7.82E−04 | 0.00E+00 |
| 20 | −7.55E+00 | −3.67E−02 | 1.10E−02 | −2.38E−03 | 2.84E−04 | 1.02E−05 | −5.54E−06 | 0.00E+00 |
| 21 | −5.54E+00 | −2.63E−02 | 3.80E−03 | −8.51E−04 | 6.95E−05 | 3.60E−07 | −1.55E−07 | 0.00E+00 |
| 22 | −4.10E+00 | −1.58E−02 | −7.24E−04 | 4.03E−05 | 3.68E−06 | 1.29E−06 | 0.00E+00 | 0.00E+00 |
| 23 | −4.10E+00 | −2.10E−02 | −1.57E−04 | 4.25E−05 | 8.96E−06 | 2.59E−07 | 0.00E+00 | 0.00E+00 |
| 24 | 0.00E+00 | 0.00E+00 | 0.00E+00 | 0.00E+00 | 0.00E+00 | 0.00E+00 | 0.00E+00 | 0.00E+00 |
| 25 | 0.00E+00 | 0.00E+00 | 0.00E+00 | 0.00E+00 | 0.00E+00 | 0.00E+00 | 0.00E+00 | 0.00E+00 |

The optical lens assembly of the sixth embodiment includes:

a first lens element having a planar object side surface, a planar image side surface, a thickness of about 0.075 mm, a refractive index of about 1.517, and Abbe number of about 64.2;

a second lens element having an object side surface of a radius of curvature of about −2.70 mm, an image side surface of a radius of curvature of about −2.40 mm, a thickness of about 0.211 mm, a refractive index of about 1.54, and Abbe number of about 56.1;

a third lens element having an object side surface of a radius of curvature of about 2.77 mm, an image side surface of a radius of curvature of about 4.40 mm, a thickness of about 0.124 mm, a refractive index of about 1.64, and Abbe number of about 23.3;

a fourth lens element having an object side surface of a radius of curvature of about 2.05 mm, an image side surface of a radius of curvature of about 0.505 mm, a thickness of about 0.145 mm, a refractive index of about 1.54, and Abbe number of about 56.1;

a fifth lens element having an object side surface of a radius of curvature of about −1.47 mm, an image side surface of a radius of curvature of about −0.521 mm, a thickness of about 0.0575 mm, a refractive index of about 1.64, and Abbe number of about 23.3;

a sixth lens element having an object side surface of a radius of curvature of about −0.0241 mm, an image side surface of a radius of curvature of about −2.37 mm, a thickness of about 0.161 mm, a refractive index of about 1.54, and Abbe number of about 56.1;

a seventh lens element having an object side surface of a radius of curvature of about 0.481 mm, an image side surface of a radius of curvature of about −0.0328 mm, a thickness of about 0.403 mm, a refractive index of about 1.54, and Abbe number of about 55.9;

an eighth lens element having an object side surface of a radius of curvature of about −0.272 mm, an image side surface of a radius of curvature of about −0.0448 mm, a thickness of about 0.30 mm, a refractive index of about 1.63, and Abbe number of about 23.4;

a ninth lens element having an object side surface of a radius of curvature of about −0.64 mm, an image side surface of a radius of curvature of about −0.763 mm, a thickness of about 0.583 mm, a refractive index of about 1.53, and Abbe number of about 55.8;

a tenth lens element having an object side surface of a radius of curvature of about 0.686 mm, an image side surface of a radius of curvature of about 1.04 mm, a thickness of about 0.373 mm, a refractive index of about 1.53, and Abbe number of about 55.8;

an eleventh lens element having an object side surface of a radius of curvature of about 1.05 mm, an image side surface of a radius of curvature of about 0.849 mm, a thickness of about 0.46 mm, a refractive index of about 1.53, and Abbe number of about 55.8; and a twelfth lens element having a planar object side surface, a planar image side surface, a thickness of about 0.21 mm, a refractive index of about 1.52, and Abbe number of about 64.2, wherein the optical lens assembly comprises an aperture stop positioned between the sixth lens element and the seventh lens element, wherein the aperture stop is a planar element having a thickness of about 0.50.

Example 7

Figure 11A:
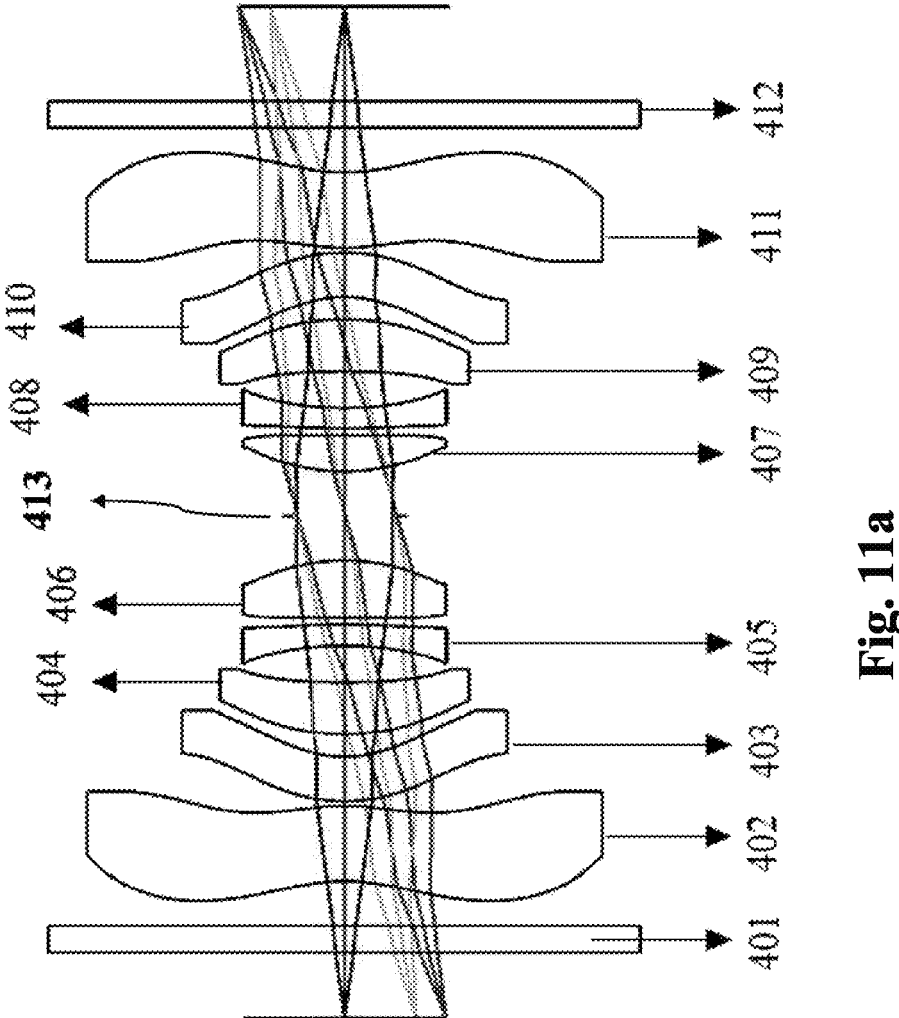

The optical lens assembly [3] in seventh embodiment comprises twelve elements which are sequentially arranged from object side to image side. The aperture stop [413] is located between the sixth and seventh lens elements. First six elements can act as objective assembly. The layout diagram is shown in FIG. 11a.

Figure 11B:
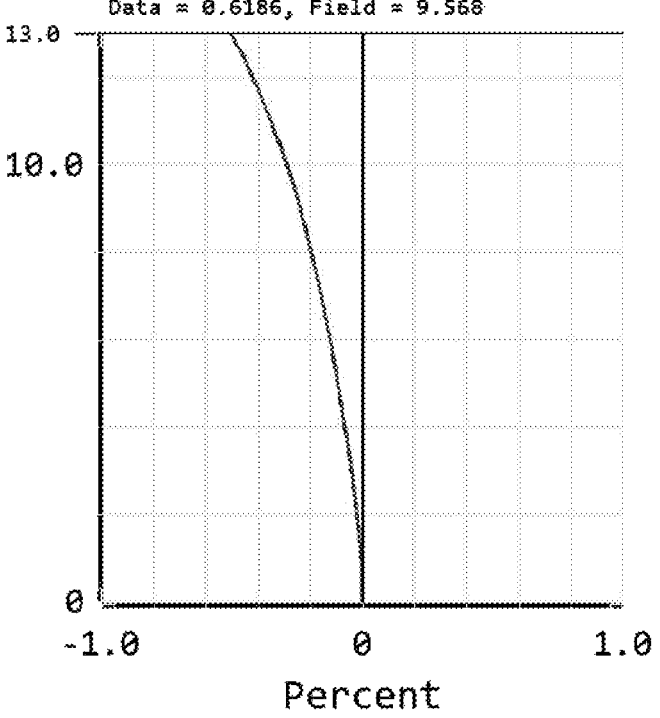
Figure 11C:
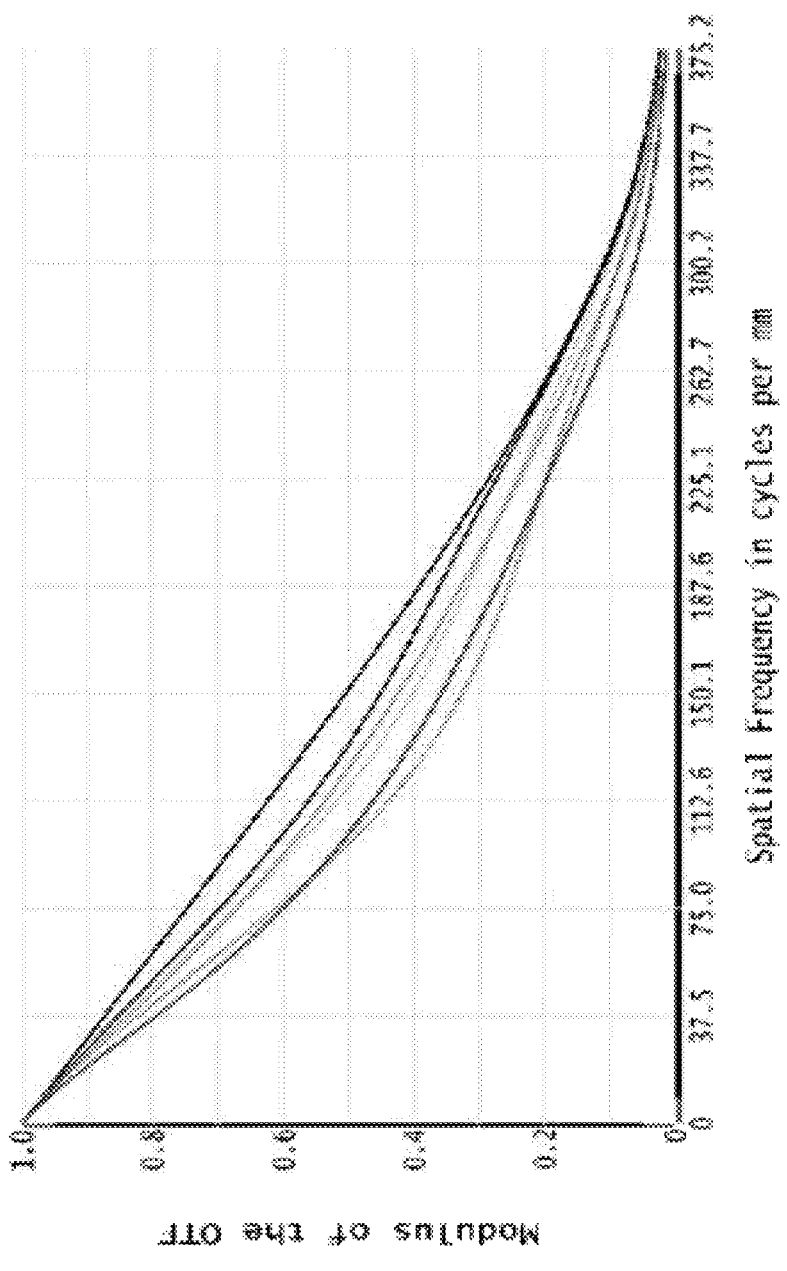

The first lens element [401] is protective layer or filter of glass or plastic or polymer or composite materials having refractive index is greater than 1. The second lens [402] element is having refractive power. The image side surface of the second lens element is Convex portion in vicinity of optical axis, concave portion in a vicinity of a periphery of the lens element. The third lens [403] element is having refractive power. The object side surface of the third lens element is Convex and image side surface is Concave in vicinity of axis. The fourth lens [404] element is having refractive power. The object side surface of fourth lens element is Convex portion in vicinity of axis and image side surface is concave. The fifth lens [405] element is having refractive power. The object side surface of the fifth lens element is concave and image side surface is concave or plan surface. The sixth lens [406] element is having refractive power. The image side surface is Convex portion in vicinity of periphery. The seventh lens [407] element has positive refracting power. The object-side surface is a convex surface. The eight-lens [408] element has negative refracting power. The object-side surface is a convex surface, and the image-side surface is a concave surface. The nine-lens [409] element has positive refracting power. The object-side surface is a concave surface comprising a concave portion in a vicinity of the optical axis. The image-side surface is a convex in vicinity of optical axis. The tenth lens [410] element has negative refracting power. The object-side surface is a concave surface, and the image-side surface is a convex surface. The eleventh lens [411] element has a refracting power. The object-side surface comprises a convex portion in a vicinity of the optical axis and a concave portion in a vicinity of a periphery of the eleventh lens element. The image-side surface comprises a concave portion in a vicinity of the optical axis and a convex portion in a vicinity of a periphery of the eleventh lens element. Twelfth element [412] is a filter or IR filter. The optical lens assembly data of seventh embodiment is shown in Table. 7A and aspheric data is shown in Table. 7B. The distortion plot and MTF plot is shown in FIGS. 11b and 11c. The optical assembly [3] of the seventh embodiment has:

Magnifications=1×; Numerical aperture=0.113; Focal Length=2.12 mm;

System length=11.3 mm; HFOV=13 degree; Depth of field=48.396 micron; Airy radius=3.25 micron

TABLE 7A

| S. No. | Lens Element Number | Radius of Curvature (mm) | Thickness (mm) of lens element OR air gap (mm) with the previous or next element | Refractive index | Abbe Number |
|---|---|---|---|---|---|
| | | Optical assembly data of seventh embodiment | | | |
| 0 | | Infinity | 7.33E−01 | | |
| 1 | 1 | Infinity | 3.00E−01 | 1.517 | 64.2 |
| 2 | | Infinity | 5.00E−01 | | |
| 3 | 2 | −1.48E+00 | 8.42E−01 | 1.544 | 56.114 |
| 4 | | −1.67E+00 | 5.20E−02 | | |
| 5 | 3 | 1.44E+00 | 4.94E−01 | 1.640 | 23.265 |
| 6 | | 9.10E−01 | 2.54E−01 | | |
| 7 | 4 | 1.95E+00 | 5.80E−01 | 1.544 | 56.114 |
| 8 | | 7.92E+00 | 4.09E−01 | | |
| 9 | 5 | −2.72E+00 | 2.30E−01 | 1.640 | 23.265 |
| 10 | | −7.68E+00 | 7.70E−02 | | |
| 11 | 6 | −1.66E+02 | 6.43E−01 | 1.544 | 56.114 |
| 12 | | −1.69E+00 | 4.93E−01 | | |
| 13 | Aperture Stop | Infinity | 5.00E−01 | | |
| 14 | 7 | 1.69E+00 | 4.03E−01 | 1.544 | 56.114 |
| 15 | | 1.66E+02 | 7.70E−02 | | |
| 16 | 8 | 7.68E+00 | 2.30E−01 | 1.640 | 23.265 |
| 17 | | 2.72E+00 | 4.09E−01 | | |
| 18 | 9 | −7.92E+00 | 5.80E−01 | 1.544 | 56.114 |
| 19 | | −1.95E+00 | 2.54E−01 | | |
| 20 | 10 | −9.10E−01 | 4.94E−01 | 1.640 | 23.265 |
| 21 | | −1.44E+00 | 5.20E−02 | | |
| 22 | 11 | 1.67E+00 | 8.42E−01 | 1.544 | 56.114 |
| 23 | | 1.48E+00 | 5.00E−01 | | |
| 24 | 12 | Infinity | 3.00E−01 | 1.517 | 64.2 |
| 25 | | Infinity | 1.05E+00 | | |

TABLE 7B

| S. No | Conic | Order 4 | Order 6 | Order 8 | Order 10 | Order 12 | Order 14 | Order 16 |
|---|---|---|---|---|---|---|---|---|
| | | Aspheric data of seventh embodiment | | | | | | |
| 0 | 0.00E+00 | 0.00E+00 | 0.00E+00 | 0.00E+00 | 0.00E+00 | 0.00E+00 | 0.00E+00 | 0.00E+00 |
| 1 | 0.00E+00 | 0.00E+00 | 0.00E+00 | 0.00E+00 | 0.00E+00 | 0.00E+00 | 0.00E+00 | 0.00E+00 |
| 2 | 0.00E+00 | 0.00E+00 | 0.00E+00 | 0.00E+00 | 0.00E+00 | 0.00E+00 | 0.00E+00 | 0.00E+00 |
| 3 | −5.52E+00 | 7.82E−02 | −2.38E−02 | 5.50E−03 | −6.72E−04 | 1.31E−05 | 6.90E−06 | −5.82E−07 |
| 4 | −1.41E+01 | 1.46E−01 | −4.38E−02 | 3.63E−03 | 4.38E−04 | −1.03E−04 | 6.37E−06 | −1.16E−07 |
| 5 | −3.74E+00 | 1.50E−01 | −1.02E−01 | 1.39E−02 | −2.37E−03 | 2.86E−03 | −7.57E−04 | 5.47E−05 |
| 6 | −6.57E+00 | 3.22E−01 | −3.02E−01 | 1.73E−02 | 6.57E−02 | 1.57E−02 | −3.50E−02 | 9.88E−03 |
| 7 | −2.94E+01 | 3.63E−01 | −4.11E−01 | 2.96E−01 | −1.50E−01 | 4.73E−02 | 9.06E−03 | −1.08E−02 |
| 8 | 1.28E+01 | 7.43E−02 | 6.88E−03 | −5.88E−02 | 1.05E−01 | −5.02E−02 | 9.33E−03 | −1.59E−02 |
| 9 | −1.95E+00 | −1.43E−02 | −1.01E−02 | −6.00E−02 | 1.13E−01 | −8.13E−02 | −1.76E−02 | 1.75E−02 |
| 10 | 0.00E+00 | 1.74E−02 | 1.77E−02 | −2.22E−02 | 3.67E−02 | 3.22E−02 | −7.15E−02 | 1.85E−02 |
| 11 | 0.00E+00 | 5.30E−03 | 4.06E−02 | −2.14E−02 | 4.85E−02 | −4.50E−03 | 2.59E−03 | −8.88E−03 |
| 12 | −3.37E−01 | −6.14E−03 | −9.04E−03 | 2.16E−02 | −2.27E−02 | 2.81E−02 | −6.64E−03 | 6.60E−03 |
| 13 | 0.00E+00 | 0.00E+00 | 0.00E+00 | 0.00E+00 | 0.00E+00 | 0.00E+00 | 0.00E+00 | 0.00E+00 |
| 14 | −3.37E−01 | 6.14E−03 | 9.04E−03 | −2.16E−02 | 2.27E−02 | −2.81E−02 | 6.64E−03 | −6.60E−03 |
| 15 | 0.00E+00 | −5.30E−03 | −4.06E−02 | 2.14E−02 | −4.85E−02 | 4.50E−03 | −2.59E−03 | 8.88E−03 |
| 16 | 0.00E+00 | −1.74E−02 | −1.77E−02 | 2.22E−02 | −3.67E−02 | −3.22E−02 | 7.15E−02 | −1.85E−02 |
| 17 | −1.95E+00 | 1.43E−02 | 1.01E−02 | 6.00E−02 | −1.13E−01 | 8.13E−02 | 1.76E−02 | −1.75E−02 |
| 18 | 1.28E+01 | −7.43E−02 | −6.88E−03 | 5.88E−02 | −1.05E−01 | 5.02E−02 | −9.33E−03 | 1.59E−02 |
| 19 | −2.94E+01 | −3.63E−01 | 4.11E−01 | −2.96E−01 | 1.50E−01 | −4.73E−02 | −9.06E−03 | 1.08E−02 |
| 20 | −6.57E+00 | −3.22E−01 | 3.02E−01 | −1.73E−02 | −6.57E−02 | −1.57E−02 | 3.50E−02 | −9.88E−03 |
| 21 | −3.74E+00 | −1.50E−01 | 1.02E−01 | −1.39E−02 | 2.37E−03 | −2.86E−03 | 7.57E−04 | −5.47E−05 |
| 22 | −1.41E+01 | −1.46E−01 | 4.38E−02 | −3.63E−03 | −4.38E−04 | 1.03E−04 | −6.37E−06 | 1.16E−07 |
| 23 | −5.52E+00 | −7.82E−02 | 2.38E−02 | −5.50E−03 | 6.72E−04 | −1.31E−05 | −6.90E−06 | 5.82E−07 |

TABLE 7B-continued

| | | | Aspheric data of seventh embodiment | | | | | |
| S. No | Conic | Order 4 | Order 6 | Order 8 | Order 10 | Order 12 | Order 14 | Order 16 |
|---|---|---|---|---|---|---|---|---|
| 24 | 0.00E+00 | 0.00E+00 | 0.00E+00 | 0.00E+00 | 0.00E+00 | 0.00E+00 | 0.00E+00 | 0.00E+00 |
| 25 | 0.00E+00 | 0.00E+00 | 0.00E+00 | 0.00E+00 | 0.00E+00 | 0.00E+00 | 0.00E+00 | 0.00E+00 |

The optical lens assembly of the seventh embodiment includes:

a first lens element having a planar object side surface, a planar image side surface, a thickness of about 0.30 mm, a refractive index of about 1.517, and Abbe number of about 64.2;

a second lens element having an object side surface of a radius of curvature of about −1.48 mm, an image side surface of a radius of curvature of about −1.67 mm, a thickness of about 0.842 mm, a refractive index of about 1.544, and Abbe number of about 56.114;

a third lens element having an object side surface of a radius of curvature of about 1.44 mm, an image side surface of a radius of curvature of about 0.91 mm, a thickness of about 0.494 mm, a refractive index of about 1.64, and Abbe number of about 23.265;

a fourth lens element having an object side surface of a radius of curvature of about 1.95 mm, an image side surface of a radius of curvature of about 7.92 mm, a thickness of about 0.58 mm, a refractive index of about 1.544, and Abbe number of about 56.114;

a fifth lens element having an object side surface of a radius of curvature of about −2.72 mm, an image side surface of a radius of curvature of about −7.68 mm, a thickness of about 0.23 mm, a refractive index of about 1.64, and Abbe number of about 23.265;

a sixth lens element having an object side surface of a radius of curvature of about −166 mm, an image side surface of a radius of curvature of about −1.69 mm, a thickness of about 0.643 mm, a refractive index of about 1.544, and Abbe number of about 56.114;

a seventh lens element having an object side surface of a radius of curvature of about 1.69 mm, an image side surface of a radius of curvature of about 166 mm, a thickness of about 0.403 mm, a refractive index of about 1.544, and Abbe number of about 56.114;

an eighth lens element having an object side surface of a radius of curvature of about 7.68 mm, an image side surface of a radius of curvature of about 2.72 mm, a thickness of about 0.23 mm, a refractive index of about 1.64, and Abbe number of about 23.265;

a ninth lens element having an object side surface of a radius of curvature of about −7.92 mm, an image side surface of a radius of curvature of about −1.95 mm, a thickness of about 0.58 mm, a refractive index of about 1.544, and Abbe number of about 56.114;

a tenth lens element having an object side surface of a radius of curvature of about −0.91 mm, an image side surface of a radius of curvature of about −1.44 mm, a thickness of about 0.494 mm, a refractive index of about 1.64, and Abbe number of about 23.265;

an eleventh lens element having an object side surface of a radius of curvature of about 1.67 mm, an image side surface of a radius of curvature of about 1.48 mm, a thickness of about 0.842 mm, a refractive index of about 1.544, and Abbe number of about 56.114; and a twelfth lens element having a planar object side surface, a planar image side surface, a thickness of about 0.30 mm, a refractive index of about 1.517, and Abbe number of about 64.2, wherein the optical lens assembly comprises an aperture stop positioned between the sixth lens element and the seventh lens element, wherein the aperture stop is a planar element having a thickness of about 0.50.

Example 8

Figure 12A:
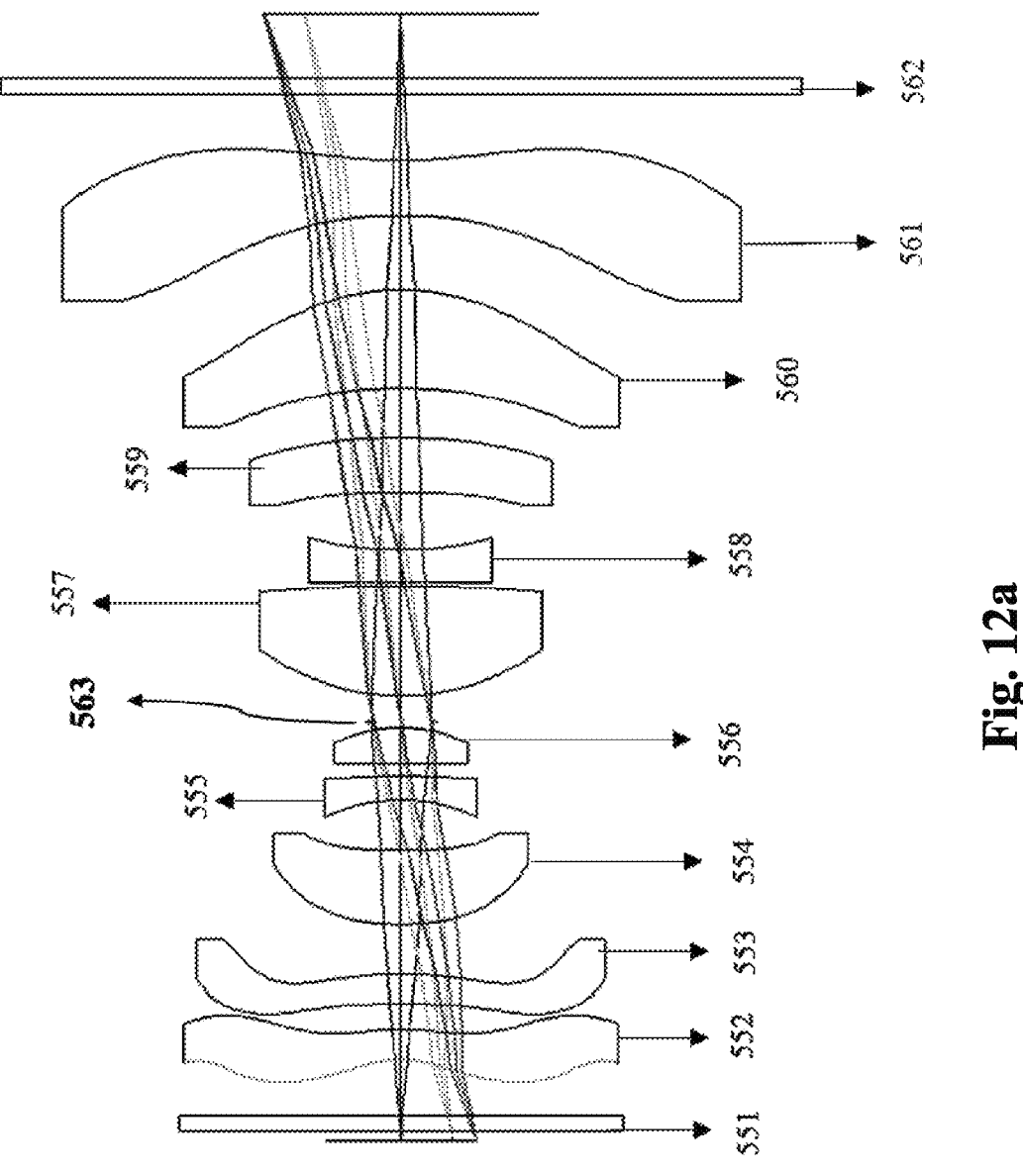

The optical lens assembly [3] in eighth embodiment comprises twelve elements which are sequentially arranged from object side to image side. The aperture stop [563] is located between the sixth and seventh lens elements. First six elements can act as objective assembly which can mount to any of the digital image capturing device to obtain the microscopy features of digital image capturing device. The layout diagram is shown in FIG. 12a.

Figure 12B:
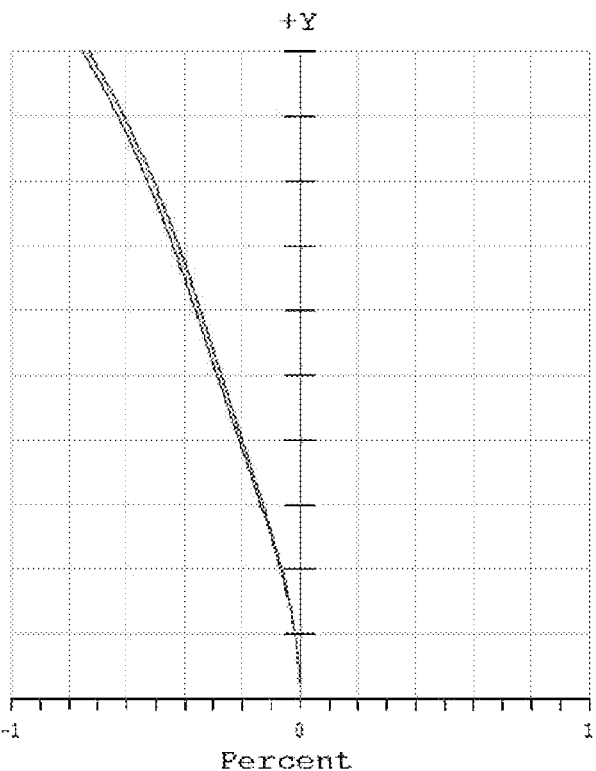
Figure 12C:
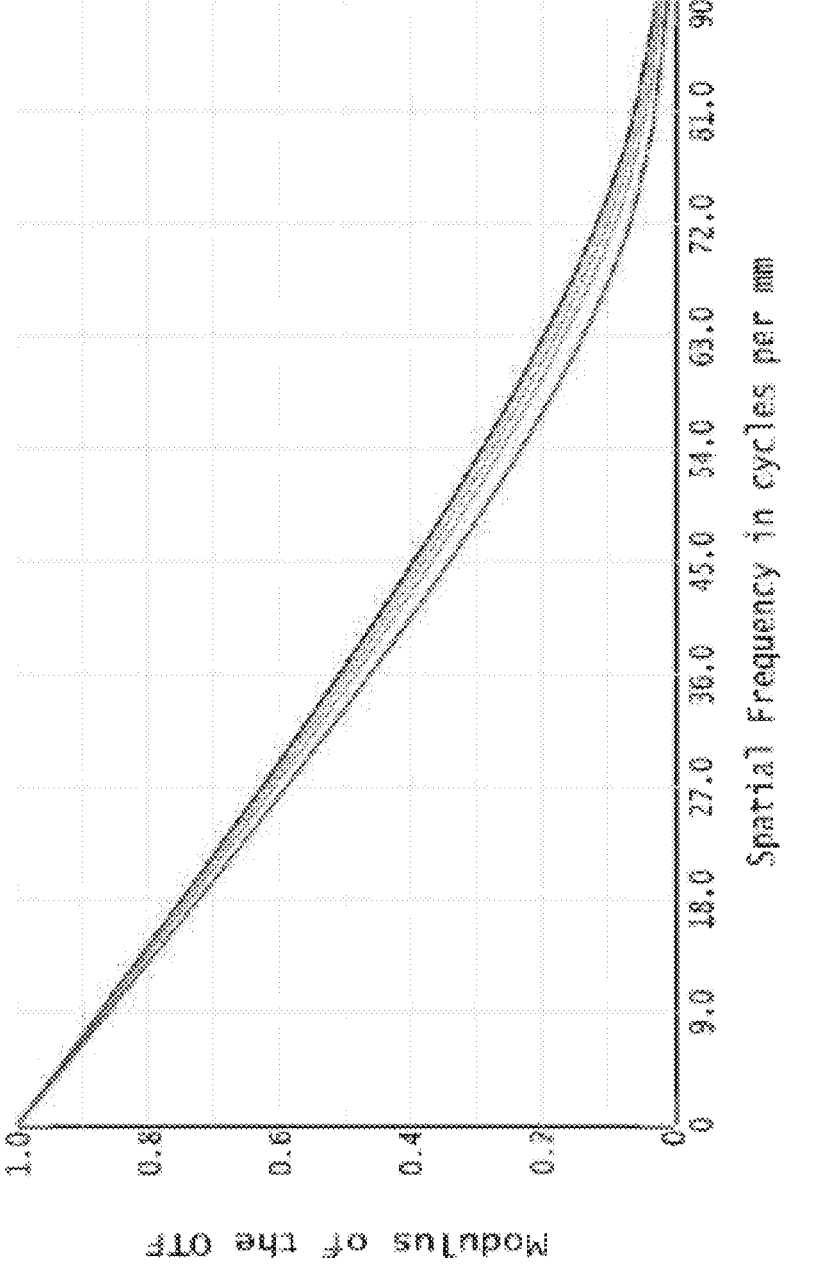

The first element [551] is protective layer or filter of glass or plastic or polymer or composite materials having refractive index is greater than 1. The second lens [552] element has refractive power. The object side surface of the second lens element is aspherical and convex surface in vicinity of optical axis and convex surface in vicinity of periphery. The third lens [553] elements aspherical and is having a positive refractive power. The object side surface of the third lens element is concave and image side surface is convex in vicinity of optical axis. The fourth lens [554] element is having a positive refractive power. The object side surface of fourth lens element is Convex and image side surface is concave. The fifth lens [555] element is having negative refractive power. The object side surface of the fifth lens element is Concave. The sixth lens [556] element is having positive refractive power. Image side surface of the sixth lens element is convex. However, the first two elements of objective are designed such that they manage the aberrations by other elements in objective. The seven-lens [557] element has positive refracting power. Both the object-side surface is convex surfaces. The eight-lens [558] element has negative refracting power. The image-side surface is a concave surface. The nine-lens [559] element has a refracting power. The object-side surface is a concave surface, and the image-side surface is a convex surface. The tenth lens [560] element has positive refracting power. The object-side surface is a concave surface near the vicinity of the optical axis and the image-side surface is a convex surface near the optical axis. The eleventh lens [561] element has negative refracting power. The object-side surface comprises a concave portion in a vicinity of the optical axis. The image-side surface comprises a concave portion in a vicinity of the optical axis and a convex portion in a vicinity of a periphery of the eleven-lens element. The twelfth element [562] is the filter or IR filter. The optical lens assembly data of eighth embodiment is shown in Table. 8A and aspheric data is shown in Table. 8B. The distortion plot and MTF plot is shown in FIGS. 12b and 12c. The optical assembly [3] of eighth embodiment has:

Magnifications=4×; Numerical aperture=0.027; Focal Length=0.835534 mm;
System length=8.2546 mm; HFOV=16 degree; Depth of field=51.58 microns;
Airy radius=13.44 microns

TABLE 8A

The optical assembly data for eighth embodiment

| S. No | Lens Element Number | Radius of Curvature (mm) | Thickness (mm) of lens element OR air gap (mm) with the previous or next element | Refractive index | Abbe number |
|---|---|---|---|---|---|
| 0 | | Infinity | 4.15E-02 | | |
| 1 | 1 | Infinity | 7.50E-02 | 1.52 | 64.2 |
| 2 | | Infinity | 2.50E-01 | | |
| 3 | 2 | -2.67E+00 | 1.38E-01 | 1.54 | 55.9 |
| 4 | | -1.24E+00 | 1.11E-01 | | |
| 5 | 3 | -4.00E-02 | 1.38E-01 | 1.54 | 55.9 |
| 6 | | -6.39E-01 | 2.25E-01 | | |
| 7 | 4 | 8.68E-01 | 3.35E-01 | 1.54 | 55.9 |
| 8 | | 2.98E-01 | 2.27E-01 | | |
| 9 | 5 | -1.49E+00 | 1.08E-01 | 1.63 | 23.4 |
| 10 | | -5.43E-01 | 5.80E-02 | | |
| 11 | 6 | -8.00E-02 | 1.61E-01 | 1.54 | 55.9 |
| 12 | | -1.68E+00 | 2.35E-02 | | |
| 13 | Aperture Stop | 0.00E+00 | 2.41E-01 | | |
| 14 | 7 | 5.35E-01 | 9.90E-01 | 1.54 | 56.2 |
| 15 | | -7.77E-02 | 3.00E-02 | | |
| 16 | 8 | -1.29E-02 | 3.00E-01 | 1.63 | 23.4 |
| 17 | | 3.19E-01 | 5.20E-01 | | |
| 18 | 9 | -1.28E-01 | 4.90E-01 | 1.63 | 23.4 |
| 19 | | -1.86E-01 | 4.50E-01 | | |
| 20 | 10 | -2.68E-01 | 8.90E-01 | 1.54 | 56.2 |
| 21 | | -5.79E-01 | 6.70E-01 | | |
| 22 | 11 | -2.67E-01 | 5.00E-01 | 1.54 | 56.2 |
| 23 | | 2.98E-01 | 6.00E-01 | | |
| 24 | 12 | 0.00E+00 | 1.50E-01 | 1.52 | 64.1 |
| 25 | | 0.00E+00 | 5.75E-01 | | |

The optical lens assembly of the eighth embodiment includes:

a first lens element having a planar object side surface, a planar image side surface, a thickness of about 0.075 mm, a refractive index of about 1.52, and Abbe number of about 64.2;

a second lens element having an object side surface of a radius of curvature of about −2.67 mm, an image side surface of a radius of curvature of about −1.24 mm, a thickness of about 0.138 mm, a refractive index of about 1.54, and Abbe number of about 55.9;

a third lens element having an object side surface of a radius of curvature of about −0.04 mm, an image side surface of a radius of curvature of about −0.639 mm, a thickness of about 0.138 mm, a refractive index of about 1.54, and Abbe number of about 55.9;

a fourth lens element having an object side surface of a radius of curvature of about 0.868 mm, an image side surface of a radius of curvature of about 0.298 mm, a thickness of about 0.335 mm, a refractive index of about 1.54, and Abbe number of about 55.9;

a fifth lens element having an object side surface of a radius of curvature of about −1.49 mm, an image side surface of a radius of curvature of about −0.543 mm, a thickness of about 0.108 mm, a refractive index of about 1.63, and Abbe number of about 23.4;

a sixth lens element having an object side surface of a radius of curvature of about −0.08 mm, an image side surface of a radius of curvature of about −1.68 mm, a thickness of about 0.161 mm, a refractive index of about 1.54, and Abbe number of about 55.9;

a seventh lens element having an object side surface of a radius of curvature of about 0.535 mm, an image side surface of a radius of curvature of about −0.0777 mm, a thickness of about 0.99 mm, a refractive index of about 1.54, and Abbe number of about 56.2;

an eighth lens element having an object side surface of a radius of curvature of about −0.0129 mm, an image

TABLE 8B

Aspheric data of eighth embodiment

| S.No | Conic | 4th order | 6th order | 8th order | 10th order | 12th order | 14th order | 16th order |
|---|---|---|---|---|---|---|---|---|
| 0 | 0.00E+00 | 0.00E+00 | 0.00E+00 | 0.00E+00 | 0.00E+00 | 0.00E+00 | 0.00E+00 | 0.00E+00 |
| 1 | 0.00E+00 | 0.00E+00 | 0.00E+00 | 0.00E+00 | 0.00E+00 | 0.00E+00 | 0.00E+00 | 0.00E+00 |
| 2 | 0.00E+00 | 0.00E+00 | 0.00E+00 | 0.00E+00 | 0.00E+00 | 0.00E+00 | 0.00E+00 | 0.00E+00 |
| 3 | -4.76E+00 | 1.92E+00 | -4.78E+00 | 8.64E+00 | -5.63E+00 | -3.37E+00 | 3.69E+00 | 0.00E+00 |
| 4 | -2.00E+01 | 2.78E+00 | -6.49E+00 | 5.80E+00 | -1.92E+00 | 0.00E+00 | 0.00E+00 | 0.00E+00 |
| 5 | -1.00E+00 | -1.88E+00 | 7.26E+00 | -9.36E+00 | 3.99E+00 | 7.82E-01 | 0.00E+00 | 0.00E+00 |
| 6 | -1.99E+00 | 1.07E-01 | 1.69E+00 | 2.18E+00 | -1.97E-01 | -6.97E+00 | 0.00E+00 | 0.00E+00 |
| 7 | 3.10E+00 | 1.67E+00 | -5.58E+00 | 2.00E+01 | -3.12E+01 | 0.00E+00 | 0.00E+00 | 0.00E+00 |
| 8 | -1.00E+00 | 1.55E+00 | -2.85E+00 | 5.13E+01 | -2.40E+02 | 1.62E+01 | 5.90E+03 | -2.41E+04 |
| 9 | -4.45E+00 | 1.27E-01 | -1.91E+01 | 9.15E+01 | -3.51E+02 | 0.00E+00 | 0.00E+00 | 0.00E+00 |
| 10 | -2.00E+01 | 2.29E+00 | -2.33E+01 | 1.20E+02 | -1.77E+02 | 0.00E+00 | 0.00E+00 | 0.00E+00 |
| 11 | -1.00E+00 | 6.28E-01 | -1.27E+01 | 9.43E+01 | -5.25E+02 | 0.00E+00 | 0.00E+00 | 0.00E+00 |
| 12 | 3.40E-02 | -1.61E-01 | -2.37E+00 | 1.85E+01 | 2.63E+02 | -2.61E+01 | 0.00E+00 | 0.00E+00 |
| 13 | 0.00E+00 | 0.00E+00 | 0.00E+00 | 0.00E+00 | 0.00E+00 | 0.00E+00 | 0.00E+00 | 0.00E+00 |
| 14 | 8.61E-02 | -3.69E-03 | -1.14E-03 | -2.92E-03 | 6.64E-04 | 3.53E-04 | -7.12E-04 | 0.00E+00 |
| 15 | -3.00E+01 | 4.47E-03 | 5.94E-03 | -2.09E-03 | -8.74E-03 | -4.98E-03 | 6.91E-03 | 0.00E+00 |
| 16 | -3.00E+01 | 8.27E-03 | 4.19E-02 | -2.66E-02 | -6.90E-03 | 9.56E-03 | 7.35E-05 | 0.00E+00 |
| 17 | -2.30E+00 | 2.27E-02 | 5.44E-02 | -3.29E-02 | 2.42E-02 | -1.22E-03 | 2.94E-04 | 0.00E+00 |
| 18 | 8.25E+00 | -4.32E-02 | -4.03E-03 | 1.57E-02 | -3.75E-03 | -8.88E-03 | 7.63E-03 | 0.00E+00 |
| 19 | 2.99E+00 | -2.26E-02 | 3.04E-03 | 2.19E-03 | -2.68E-04 | -1.46E-04 | 1.06E-04 | 0.00E+00 |
| 20 | 3.07E-01 | -8.54E-03 | 2.67E-03 | -6.87E-04 | 4.38E-05 | 8.97E-05 | 2.90E-07 | 0.00E+00 |
| 21 | -3.57E+00 | -3.59E-02 | 1.03E-02 | -2.05E-03 | 3.62E-04 | -3.27E-06 | -7.47E-07 | 0.00E+00 |
| 22 | -2.03E+00 | -3.54E-02 | 9.40E-03 | -4.07E-04 | -1.45E-04 | 2.68E-05 | -1.43E-06 | 0.00E+00 |
| 23 | -2.14E+01 | -2.92E-02 | 4.93E-03 | -6.84E-04 | 6.24E-05 | -4.40E-06 | 1.88E-07 | 0.00E+00 |
| 24 | 0.00E+00 | 0.00E+00 | 0.00E+00 | 0.00E+00 | 0.00E+00 | 0.00E+00 | 0.00E+00 | 0.00E+00 |
| 25 | 0.00E+00 | 0.00E+00 | 0.00E+00 | 0.00E+00 | 0.00E+00 | 0.00E+00 | 0.00E+00 | 0.00E+00 | side surface of a radius of curvature of about 0.319 mm, a thickness of about 0.30 mm, a refractive index of about 1.63, and Abbe number of about 23.4;

a ninth lens element having an object side surface of a radius of curvature of about –0.128 mm, an image side surface of a radius of curvature of about –0.186 mm, a thickness of about 0.49 mm, a refractive index of about 1.63, and Abbe number of about 23.4;

a tenth lens element having an object side surface of a radius of curvature of about –0.268 mm, an image side surface of a radius of curvature of about –0.579 mm, a thickness of about 0.89 mm, a refractive index of about 1.54, and Abbe number of about 56.2;

an eleventh lens element having an object side surface of a radius of curvature of about –0.267 mm, an image side surface of a radius of curvature of about 0.298 mm, a thickness of about 0.5 mm, a refractive index of about 1.54, and Abbe number of about 56.2; and a twelfth lens element having a planar object side surface, a planar image side surface, a thickness of about 0.15 mm, a refractive index of about 1.52, and Abbe number of about 64.1, wherein the optical lens assembly comprises an aperture stop positioned between the sixth lens element and the seventh lens element, wherein the aperture stop is a planar element having a thickness of about 0.241.

Example 9

Figure 13A:
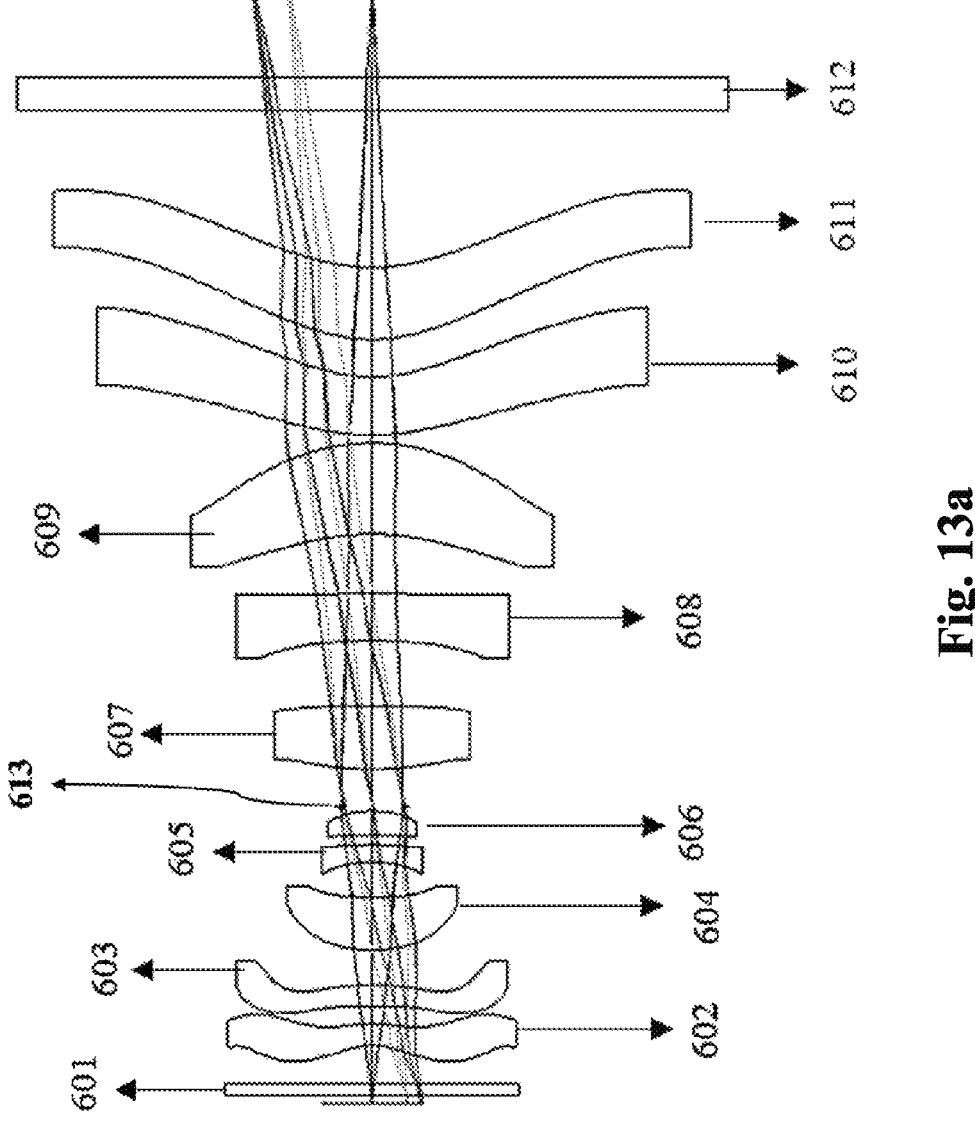

The optical lens assembly [3] in ninth embodiment comprises twelve elements which are sequentially arranged from object side to image side. The aperture stop [613] is located between the sixth and seventh lens elements. First six elements can act as objective assembly. The layout diagram is shown in FIG. 13a.

The first lens element [601] is protective layer or filter of glass or plastic or polymer or composite materials having refractive index is greater than 1. The second lens [602] element has refractive power. The object side surface of the second lens element is aspherical and convex surface in vicinity of optical axis and convex surface in vicinity of periphery. The third lens [603] element is aspherical and having a positive refractive power. The object side surface of the third lens element is concave and image side surface is convex in vicinity of optical axis. The fourth lens [604] element is having a positive refractive power. The object side surface of fourth lens element is Convex and image side surface is concave. The fifth lens [605] element is having negative refractive power. The object side surface of the fifth lens element is Concave. The sixth lens [606] element is having positive refractive power. Image side surface of the sixth lens element is convex. However, the first two elements of objective are designed such that they manage the aberrations by other elements in objective. The seventh lens [607] element has positive refracting power. The object-side surface is a convex surface and meniscus. The eight-lens [608] element has negative refracting power. The object-side surface is a convex surface and is meniscus. The ninth lens

Figure 13B:
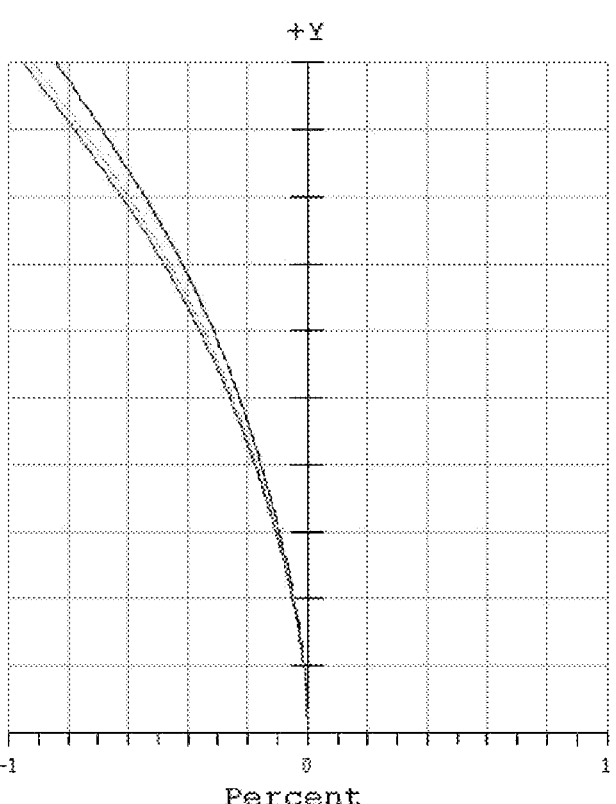
Figure 13C:
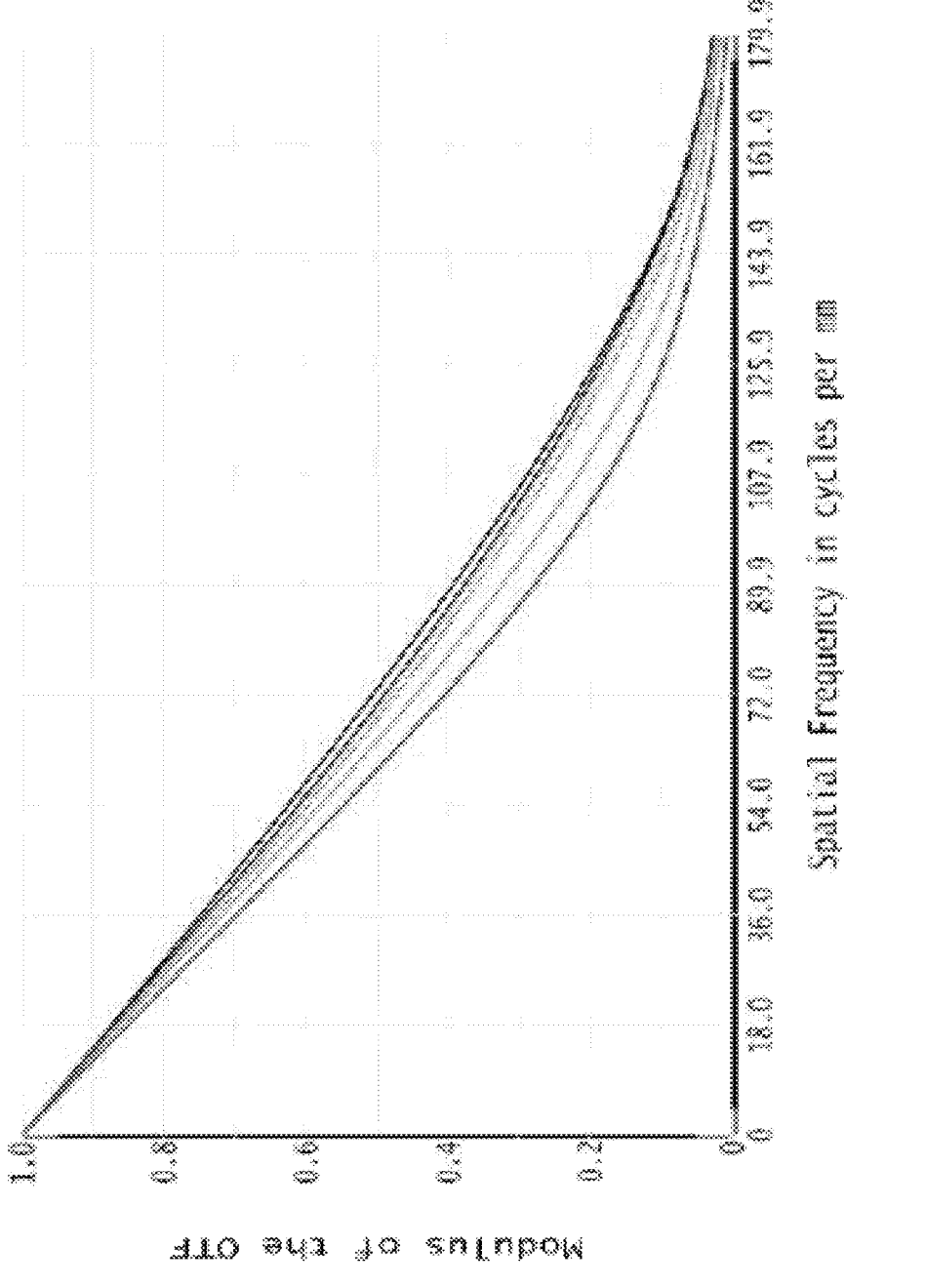

[609] element has positive refracting power. The object-side surface is a concave surface comprising a concave portion in a vicinity of the optical and is meniscus. The image-side surface is a convex surface comprising a convex portion in a vicinity of a periphery of the eighth lens element and is meniscus. The tenth lens [610] element has negative refracting power. The object-side surface is a concave surface near the vicinity of the optical axis and is meniscus. The image-side surface is convex near the optical axis. The eleventh lens [611] element has positive refracting power. The object-side surface comprises a concave portion in a vicinity of the optical axis and a concave portion in a vicinity of a periphery of the tenth lens element. The image-side surface comprises a concave portion in a vicinity of the optical axis and a convex portion in a vicinity of a periphery of the tenth lens element. The twelfth element [612] is the filter or IR filter. The optical lens assembly data of ninth embodiment is shown in Table. 9 A and aspheric data is shown in Table. 9 B. The distortion plot and MTF plot is shown in FIGS. 13b and 13c. The optical assembly [3] of ninth embodiment has:

Magnifications=2×; Numerical aperture=0.054; Focal Length=1.0945 mm;

System length=7.03983 mm; HFOV=16 degree; Depth of field=52.62 micron;

Airy radius=6.786 micron

TABLE 9A

The optical assembly data of ninth embodiment

| S. No | Lens Element Number | Radius of Curvature (mm) | Thickness (mm) of lens element OR air gap (mm) with the previous or next element | Refractive index | Abbe number |
|---|---|---|---|---|---|
| 0 | | Infinity | 4.15E–02 | | |
| 1 | 1 | Infinity | 7.50E–02 | 1.52 | 64.2 |
| 2 | | Infinity | 2.50E–01 | | |
| 3 | 2 | –2.67E+00 | 1.38E–01 | 1.54 | 55.9 |
| 4 | | –1.24E+00 | 1.11E–01 | | |
| 5 | 3 | –4.00E–02 | 1.38E–01 | 1.54 | 55.9 |
| 6 | | –6.39E–01 | 2.25E–01 | | |
| 7 | 4 | 8.68E–01 | 3.35E–01 | 1.54 | 55.9 |
| 8 | | 2.98E–01 | 2.27E–01 | | |
| 9 | 5 | –1.49E+00 | 1.08E–01 | 1.63 | 23.4 |
| 10 | | –5.43E–01 | 5.80E–02 | | |
| 11 | 6 | –8.00E–02 | 1.61E–01 | 1.54 | 55.9 |
| 12 | | –1.68E+00 | 2.40E–02 | | |
| 13 | Aperture Stop | 0.00E+00 | 2.41E–01 | | |
| 14 | 7 | 4.81E–01 | 4.03E–01 | 1.54 | 55.9 |
| 15 | | –3.28E–02 | 4.19E–01 | | |
| 16 | 8 | –2.72E–01 | 3.00E–01 | 1.63 | 23.4 |
| 17 | | –4.48E–02 | 3.83E–01 | | |
| 18 | 9 | –6.40E–01 | 5.83E–01 | 1.53 | 55.8 |
| 19 | | –7.63E–01 | 5.00E–02 | | |
| 20 | 10 | 6.86E–01 | 3.73E–01 | 1.53 | 55.8 |
| 21 | | 1.04E+00 | 2.39E–01 | | |
| 22 | 11 | 1.05E+00 | 4.60E–01 | 1.53 | 55.8 |
| 23 | | 8.49E–01 | 1.00E+00 | | |
| 24 | 12 | 0.00E+00 | 2.10E–01 | 1.52 | 64.2 |
| 25 | | 0.00E+00 | 5.28E–01 | | |

TABLE 9B

Aspheric data of ninth embodiment

| S. No | Conic | 4th order | 6th order | 8th order | 10th order | 12th order | 14th order | 16th order |
|---|---|---|---|---|---|---|---|---|
| 0 | 0.00E+00 | 0.00E+00 | 0.00E+00 | 0.00E+00 | 0.00E+00 | 0.00E+00 | 0.00E+00 | 0.00E+00 |
| 1 | 0.00E+00 | 0.00E+00 | 0.00E+00 | 0.00E+00 | 0.00E+00 | 0.00E+00 | 0.00E+00 | 0.00E+00 |

TABLE 9B-continued

| | | | | Aspheric data of ninth embodiment | | | | |
|---|---|---|---|---|---|---|---|---|
| S. No | Conic | $4^{th}$ order | $6^{th}$ order | $8^{th}$ order | $10^{th}$ order | $12^{th}$ order | $14^{th}$ order | $16^{th}$ order |
| 2 | 0.00E+00 | 0.00E+00 | 0.00E+00 | 0.00E+00 | 0.00E+00 | 0.00E+00 | 0.00E+00 | 0.00E+00 |
| 3 | −4.76E+00 | 1.92E+00 | −4.78E+00 | 8.64E+00 | −5.63E+00 | −3.37E+00 | 3.69E+00 | 0.00E+00 |
| 4 | −2.00E+01 | 2.78E+00 | −6.49E+00 | 5.80E+00 | −1.92E+00 | 0.00E+00 | 0.00E+00 | 0.00E+00 |
| 5 | −1.00E+00 | −1.88E+00 | 7.26E+00 | −9.36E+00 | 3.99E+00 | 7.82E−01 | 0.00E+00 | 0.00E+00 |
| 6 | −1.99E+00 | 1.07E−01 | 1.69E+00 | 2.18E+00 | −1.97E−01 | −6.97E+00 | 0.00E+00 | 0.00E+00 |
| 7 | 3.10E+00 | 1.67E+00 | −5.58E+00 | 2.00E+01 | −3.12E+01 | 0.00E+00 | 0.00E+00 | 0.00E+00 |
| 8 | −1.00E+00 | 1.55E+00 | −2.85E+00 | 5.13E+01 | −2.40E+02 | 1.62E+01 | 5.90E+03 | −2.41E+04 |
| 9 | −4.45E+00 | 1.27E−01 | −1.91E+01 | 9.15E+01 | −3.51E+02 | 0.00E+00 | 0.00E+00 | 0.00E+00 |
| 10 | −2.00E+01 | 2.29E+00 | −2.33E+01 | 1.20E+02 | −1.77E+02 | 0.00E+00 | 0.00E+00 | 0.00E+00 |
| 11 | −1.00E+00 | 6.28E−01 | −1.27E+01 | 9.43E+01 | −5.25E+02 | 0.00E+00 | 0.00E+00 | 0.00E+00 |
| 12 | 3.40E−02 | −1.61E−01 | −2.37E+00 | 1.85E+01 | 2.63E+02 | −2.61E+01 | 0.00E+00 | 0.00E+00 |
| 13 | 0.00E+00 | 0.00E+00 | 0.00E+00 | 0.00E+00 | 0.00E+00 | 0.00E+00 | 0.00E+00 | 0.00E+00 |
| 14 | −2.35E+00 | −1.86E−02 | −8.14E−02 | −7.46E−02 | −1.10E−01 | −6.27E−02 | −1.10E−01 | −2.51E−01 |
| 15 | 1.00E+00 | −1.25E−01 | −1.54E−01 | −2.52E−02 | −1.49E−02 | −2.54E−01 | −3.42E−01 | 1.58E+00 |
| 16 | 4.79E−01 | −9.81E−02 | −1.11E−01 | −3.56E−02 | 2.38E−02 | 2.22E−01 | 2.09E−01 | −1.67E−01 |
| 17 | 1.00E+00 | 3.93E−02 | −4.43E−02 | 1.25E−03 | 1.61E−02 | 6.40E−03 | 2.99E−02 | −1.46E−02 |
| 18 | −9.88E+00 | −9.92E−02 | 1.62E−01 | −8.81E−02 | 2.30E−02 | −1.84E−02 | 6.52E−03 | 3.43E−03 |
| 19 | −1.09E+00 | −3.86E−02 | 3.29E−02 | −2.99E−03 | 1.07E−02 | −9.28E−04 | −7.82E−04 | 0.00E+00 |
| 20 | −7.55E+00 | −3.67E−02 | 1.10E−02 | −2.38E−03 | 2.84E−04 | 1.02E−05 | −5.54E−06 | 0.00E+00 |
| 21 | −5.54E+00 | −2.63E−02 | 3.80E−03 | −8.51E−04 | 6.95E−05 | 3.60E−07 | −1.55E−07 | 0.00E+00 |
| 22 | −4.10E+00 | −1.58E−02 | −7.24E−04 | 4.03E−05 | 3.68E−06 | 1.29E−06 | 0.00E+00 | 0.00E+00 |
| 23 | −4.10E+00 | −2.10E−02 | −1.57E−04 | 4.25E−05 | 8.96E−06 | 2.59E−07 | 0.00E+00 | 0.00E+00 |
| 24 | 0.00E+00 | 0.00E+00 | 0.00E+00 | 0.00E+00 | 0.00E+00 | 0.00E+00 | 0.00E+00 | 0.00E+00 |
| 25 | 0.00E+00 | 0.00E+00 | 0.00E+00 | 0.00E+00 | 0.00E+00 | 0.00E+00 | 0.00E+00 | 0.00E+00 |

The optical lens assembly of the ninth embodiment includes:

a first lens element having a planar object side surface, a planar image side surface, a thickness of about 0.075 mm, a refractive index of about 1.52, and Abbe number of about 64.2;

a second lens element having an object side surface of a radius of curvature of about −2.67 mm, an image side surface of a radius of curvature of about −1.24 mm, a thickness of about 0.138 mm, a refractive index of about 1.54, and Abbe number of about 55.9;

a third lens element having an object side surface of a radius of curvature of about −0.04 mm, an image side surface of a radius of curvature of about −0.639 mm, a thickness of about 0.138 mm, a refractive index of about 1.54, and Abbe number of about 55.9;

a fourth lens element having an object side surface of a radius of curvature of about 0.868 mm, an image side surface of a radius of curvature of about 0.298 mm, a thickness of about 0.335 mm, a refractive index of about 1.54, and Abbe number of about 55.9;

a fifth lens element having an object side surface of a radius of curvature of about −1.49 mm, an image side surface of a radius of curvature of about −0.543 mm, a thickness of about 0.108 mm, a refractive index of about 1.63, and Abbe number of about 23.4;

a sixth lens element having an object side surface of a radius of curvature of about −0.08 mm, an image side surface of a radius of curvature of about −1.68 mm, a thickness of about 0.161 mm, a refractive index of about 1.54, and Abbe number of about 55.9;

a seventh lens element having an object side surface of a radius of curvature of about 0.481 mm, an image side surface of a radius of curvature of about −0.328 mm, a thickness of about 0.403 mm, a refractive index of about 1.54, and Abbe number of about 55.9;

an eighth lens element having an object side surface of a radius of curvature of about −0.272 mm, an image side surface of a radius of curvature of about −0.0448 mm, a thickness of about 0.30 mm, a refractive index of about 1.63, and Abbe number of about 23.4;

a ninth lens element having an object side surface of a radius of curvature of about −0.64 mm, an image side surface of a radius of curvature of about −0.763 mm, a thickness of about 0.583 mm, a refractive index of about 1.53, and Abbe number of about 55.8;

a tenth lens element having an object side surface of a radius of curvature of about 0.686 mm, an image side surface of a radius of curvature of about 1.04 mm, a thickness of about 0.373 mm, a refractive index of about 1.53, and Abbe number of about 55.8;

an eleventh lens element having an object side surface of a radius of curvature of about 1.05 mm, an image side surface of a radius of curvature of about 0.849 mm, a thickness of about 0.46 mm, a refractive index of about 1.53, and Abbe number of about 55.8; and a twelfth lens element having a planar object side surface, a planar image side surface, a thickness of about 0.21 mm, a refractive index of about 1.52, and Abbe number of about 64.2, wherein the optical lens assembly comprises an aperture stop positioned between the sixth lens element and the seventh lens element, wherein the aperture stop is a planar element having a thickness of about 0.241.

Example 10

Figure 14A:
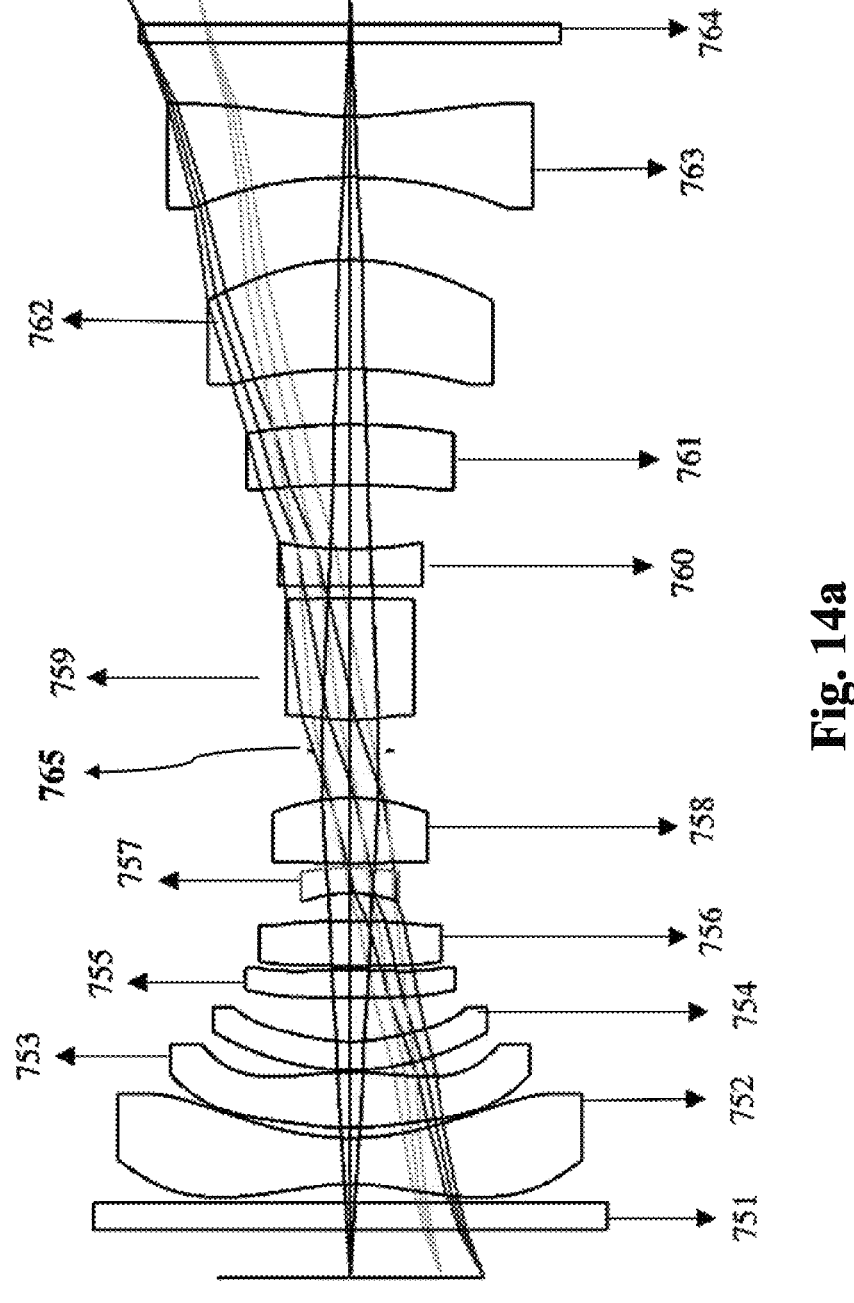

The optical lens assembly [3] in tenth embodiment comprises fourteen elements which are sequentially arranged from object side to image side. The aperture stop [765] is located between the eighth and ninth lens elements. First eight elements can act as objective assembly. The layout diagram is shown in FIG. 14a.

Figure 14B:
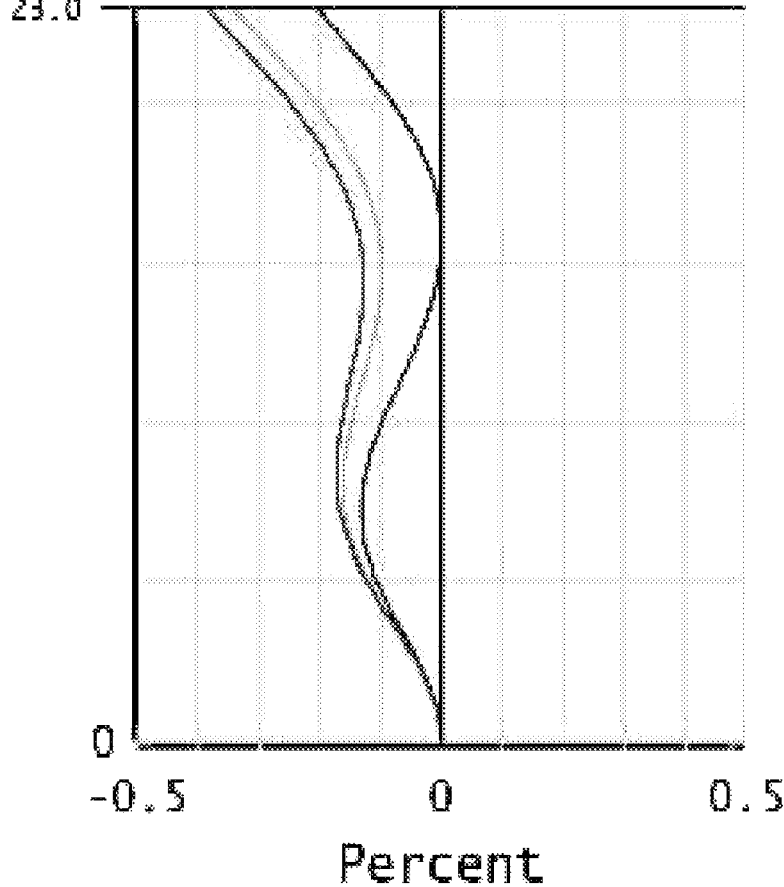
Figure 14C:
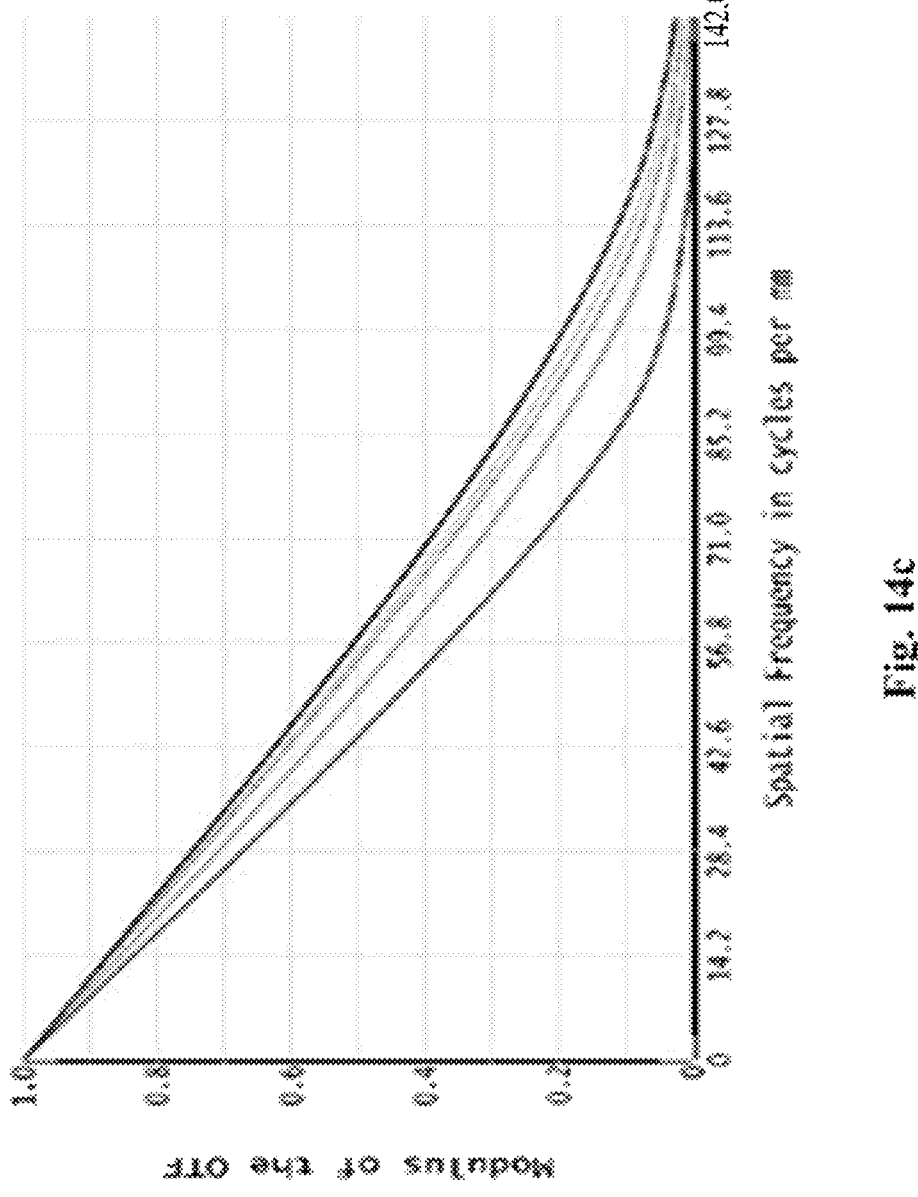

The first lens element [751] is protective layer or filter of glass or plastic or polymer or composite materials having refractive index is greater than 1. The second lens [752] element is having refractive power. The object side surface of the second lens element is concave portion in vicinity of optical axis and convex in the vicinity of a periphery. The image side surface of second lens element is concave portion in vicinity of optical axis. The third lens [753] element is having negative refractive power. The image side surface of the second lens element is Convex portion in vicinity of optical axis, concave portion in a vicinity of a periphery of the lens element and object side surface is Convex surface. The fourth lens [754] element is having refractive power. The object side surface of fourth lens element is Convex surface and image side surface is Concave surface. The fifth lens [755] element is having refractive power. The sixth lens [756] element is having negative refractive power. Both Object side and image side surface of the sixth lens element are convex surface. The seventh lens [757] element is having positive refractive power. The image side surface of the seventh lens element is convex and object side surface is Concave. The eighth lens [758] element is having positive refractive power. The image side surface of the eighth element is convex on both sides. The ninth [759] element has positive refracting power. Both the object-side surface is convex surfaces. The tenth [760] element has negative refracting power. The image-side surface is a concave surface. The eleventh lens [761] element has are refracting power. The object-side surface is a concave surface, and the image-side surface is a convex surface. The twelfth lens [762] element has positive refracting power. The object-side surface is a concave surface near the vicinity of the optical axis and the image-side surface is a convex surface near the optical axis. The thirteenth lens [763] element has negative refracting power. The object-side surface comprises a concave portion in a vicinity of the optical axis. The image-side surface comprises a concave portion in a vicinity of the optical axis and a convex portion in a vicinity of a periphery of the thirteen-lens element. The fourteenth element [764] is the filter or IR filter. The optical lens assembly data of tenth embodiment is shown in Table. 10A and aspheric data is shown in Table. 10B. The distortion plot and MTF plot is shown in FIGS. 14*b* and 14*c*. The optical assembly [3] of tenth embodiment has:

Magnifications=1.6×; Numerical aperture=0.042; Focal Length=1.362; System length=10.03 mm; HFOV=23 degree; Depth of field=337.71 microns; Airy radius=8.507 microns

TABLE 10A

| S. No. | Lens Element Number | Radius of Curvature (mm) | Thickness (mm) of lens element OR air gap (mm) with the previous or next element | Refractive Index | Abbe Number |
|---|---|---|---|---|---|
| 0 | | Infinity | 3.88E−01 | | |
| 1 | 1 | Infinity | 2.25E−01 | 1.52 | 64.2 |
| 2 | | Infinity | 1.50E−01 | | |
| 3 | 2 | −1.45E+00 | 3.75E−01 | 1.53 | 56.2 |
| 4 | | 2.08E+00 | 7.95E−02 | | |
| 5 | 3 | 1.71E+00 | 4.52E−01 | 1.53 | 56.2 |
| 6 | | −2.46E+00 | 1.88E−02 | | |
| 7 | 4 | 1.84E+00 | 2.31E−01 | 1.64 | 56.2 |
| 8 | | 1.29E+00 | 3.59E−01 | | |
| 9 | 5 | −2.09E+02 | 2.25E−01 | 1.53 | 23.9 |
| 10 | | −5.36E+00 | 3.00E−02 | | |
| 11 | 6 | 1.11E+01 | 3.66E−01 | 1.52 | 56.2 |
| 12 | | −8.62E+00 | 2.28E−01 | | |
| 13 | 7 | −9.53E−01 | 2.10E−01 | 1.64 | 23.9 |
| 14 | | −1.75E+00 | 3.30E−02 | | |
| 15 | 8 | 6.29E+00 | 5.30E−01 | 1.53 | 56.2 |
| 16 | | −1.59E+00 | 3.88E−01 | | |
| 17 | Aperture Stop | Infinity | 2.50E−01 | | |
| 18 | 9 | 1.87E+00 | 9.90E−01 | 1.54 | 56.2 |
| 19 | | −1.29E+01 | 1.00E−01 | | |
| 20 | 10 | −7.78E+01 | 3.00E−01 | 1.63 | 23.4 |
| 21 | | 3.13E+00 | 5.20E−01 | | |
| 22 | 11 | −7.80E+00 | 4.90E−01 | 1.63 | 23.4 |
| 23 | | −5.36E+00 | 4.50E−01 | | |
| 24 | 12 | −3.73E+00 | 8.90E−01 | 1.54 | 56.2 |
| 25 | | −1.73E+00 | 6.70E−01 | | |
| 26 | 13 | −3.74E+00 | 5.00E−01 | 1.54 | 56.2 |
| 27 | | 3.35E+00 | 6.00E−01 | | |
| 28 | 14 | Infinity | 1.50E−01 | 1.52 | 64.1 |
| 29 | | Infinity | 2.27E−01 | | |

TABLE 10B

| S.No | Conic | order 4 | order 6 | order 8 | order 10 | order 12 | order 14 | order 16 |
|---|---|---|---|---|---|---|---|---|
| 0 | 0.00E+00 | 0.00E+00 | 0.00E+00 | 0.00E+00 | 0.00E+00 | 0.00E+00 | 0.00E+00 | 0.00E+00 |
| 1 | 0.00E+00 | 0.00E+00 | 0.00E+00 | 0.00E+00 | 0.00E+00 | 0.00E+00 | 0.00E+00 | 0.00E+00 |
| 2 | 0.00E+00 | 0.00E+00 | 0.00E+00 | 0.00E+00 | 0.00E+00 | 0.00E+00 | 0.00E+00 | 0.00E+00 |
| 3 | −1.82E+01 | 7.62E−02 | −2.16E−02 | 5.92E−03 | 1.51E−04 | −1.10E−04 | −2.71E−05 | 3.49E−07 |
| 4 | −3.71E+00 | 6.20E−03 | −6.26E−03 | −9.18E−04 | −4.99E−04 | 6.23E−05 | 7.48E−05 | −1.40E−05 |
| 5 | −2.58E+01 | −1.26E−01 | 1.74E−01 | −2.92E−02 | −1.89E−02 | 6.47E−03 | 0.00E+00 | 0.00E+00 |
| 6 | −1.32E+01 | 2.32E−01 | −1.08E−01 | 1.38E−01 | −1.69E−02 | −2.11E−02 | 0.00E+00 | 0.00E+00 |
| 7 | −1.80E+00 | 2.68E−02 | −5.93E−02 | 5.36E−02 | 3.71E−03 | −1.11E−02 | 0.00E+00 | 0.00E+00 |
| 8 | 7.24E−01 | −5.32E−01 | 6.86E−01 | −6.38E−01 | 2.50E−01 | 7.39E−02 | −1.01E−01 | 0.00E+00 |
| 9 | 0.00E+00 | 9.81E−02 | 2.03E−01 | 2.38E−02 | −5.73E−01 | 4.56E−01 | −2.35E−01 | −1.63E−04 |
| 10 | 0.00E+00 | 2.31E−01 | 1.22E−01 | −2.96E−02 | −5.21E−01 | 3.45E−01 | −6.68E−10 | −7.32E−11 |
| 11 | 0.00E+00 | 2.45E−02 | 5.71E−02 | −1.29E−01 | 1.18E−01 | 1.75E−01 | 3.73E−10 | −4.59E−11 |
| 12 | 4.18E+01 | −1.43E−01 | 9.62E−02 | −1.75E−01 | 4.89E−01 | −6.63E−01 | 4.52E−01 | 6.06E−04 |
| 13 | −3.68E+00 | −2.03E−03 | −7.21E−03 | −1.88E−01 | 3.30E−01 | −2.07E−01 | −1.33E−02 | 4.38E−06 |
| 14 | −1.34E+01 | 2.26E−02 | 7.74E−02 | −1.59E−01 | 3.86E−01 | 7.51E−02 | −1.75E−02 | −3.77E−05 |
| 15 | 0.00E+00 | −9.79E−02 | 6.67E−02 | 2.85E−02 | −5.86E−02 | −1.77E−02 | 5.46E−02 | 0.00E+00 |
| 16 | −2.61E−01 | −7.71E−03 | 2.15E−03 | 2.54E−02 | 1.59E−02 | −6.92E−02 | 5.32E−02 | 0.00E+00 |
| 17 | 0.00E+00 | 0.00E+00 | 0.00E+00 | 0.00E+00 | 0.00E+00 | 0.00E+00 | 0.00E+00 | 0.00E+00 |
| 18 | 8.61E−02 | −3.69E−03 | −1.14E−03 | −2.92E−03 | 6.64E−04 | 3.53E−04 | −7.12E−04 | 0.00E+00 |
| 19 | −3.00E+01 | 4.47E−03 | 5.94E−03 | −2.09E−03 | −8.74E−03 | −4.98E−03 | 6.91E−03 | 0.00E+00 |
| 20 | −3.00E+01 | 8.27E−03 | 4.19E−02 | −2.66E−02 | −6.90E−03 | 9.56E−03 | 7.35E−05 | 0.00E+00 |

Aspheric data of tenth embodiment

TABLE 10B-continued

| | | | | Aspheric data of tenth embodiment | | | | |
|---|---|---|---|---|---|---|---|---|
| S.No | Conic | order 4 | order 6 | order 8 | order 10 | order 12 | order 14 | order 16 |
| 21 | −2.30E+00 | 2.27E−02 | 5.44E−02 | −3.29E−02 | 2.42E−02 | −1.22E−03 | 2.94E−04 | 0.00E+00 |
| 22 | 8.25E+00 | −4.32E−02 | −4.03E−03 | 1.57E−02 | −3.75E−03 | −8.88E−03 | 7.63E−03 | 0.00E+00 |
| 23 | 2.99E+00 | −2.26E−02 | 3.04E−03 | 2.19E−03 | −2.68E−04 | −1.46E−04 | 1.06E−04 | 0.00E+00 |
| 24 | 3.07E−01 | −8.54E−02 | 2.67E−03 | −6.87E−04 | 4.38E−05 | 8.97E−05 | 2.90E−07 | 0.00E+00 |
| 25 | −3.57E+00 | −3.59E−02 | 1.03E−02 | −2.05E−03 | 3.62E−04 | −3.27E−06 | −7.47E−07 | 0.00E+00 |
| 26 | −2.03E+00 | −3.54E−02 | 9.40E−03 | −4.07E−04 | −1.45E−04 | 2.68E−05 | −1.43E−06 | 0.00E+00 |
| 27 | −2.14E+01 | −2.92E−02 | 4.93E−03 | −6.84E−04 | 6.24E−05 | −4.40E−06 | 1.88E−07 | 0.00E+00 |
| 28 | 0.00E+00 | 0.00E+00 | 0.00E+00 | 0.00E+00 | 0.00E+00 | 0.00E+00 | 0.00E+00 | 0.00E+00 |
| 29 | 0.00E+00 | 0.00E+00 | 0.00E+00 | 0.00E+00 | 0.00E+00 | 0.00E+00 | 0.00E+00 | 0.00E+00 |

The optical lens assembly of the tenth embodiment includes:

a first lens element having a planar object side surface, a planar image side surface, a thickness of about 0.225 mm, a refractive index of about 1.52, and Abbe number of about 64.2;

a second lens element having an object side surface of a radius of curvature of about −1.45 mm, an image side surface of a radius of curvature of about −2.08 mm, a thickness of about 0.375 mm, a refractive index of about 1.53, and Abbe number of about 56.2;

a third lens element having an object side surface of a radius of curvature of about 1.71 mm, an image side surface of a radius of curvature of about −2.46 mm, a thickness of about 0.452 mm, a refractive index of about 1.53, and Abbe number of about 56.2;

a fourth lens element having an object side surface of a radius of curvature of about 1.84 mm, an image side surface of a radius of curvature of about 1.29 mm, a thickness of about 0.231 mm, a refractive index of about 1.64, and Abbe number of about 56.2;

a fifth lens element having an object side surface of a radius of curvature of about −209 mm, an image side surface of a radius of curvature of about −5.36 mm, a thickness of about 0.225 mm, a refractive index of about 1.53, and Abbe number of about 23.9;

a sixth lens element having an object side surface of a radius of curvature of about 1.11 mm, an image side surface of a radius of curvature of about −8.62 mm, a thickness of about 0.366 mm, a refractive index of about 1.52, and Abbe number of about 56.2;

a seventh lens element having an object side surface of a radius of curvature of about −0.953 mm, an image side surface of a radius of curvature of about −1.75 mm, a thickness of about 0.21 mm, a refractive index of about 1.64, and Abbe number of about 23.9;

an eighth lens element having an object side surface of a radius of curvature of about 6.29 mm, an image side surface of a radius of curvature of about −1.59 mm, a thickness of about 0.53 mm, a refractive index of about 1.53, and Abbe number of about 56.2;

a ninth lens element having an object side surface of a radius of curvature of about 1.87 mm, an image side surface of a radius of curvature of about −12.9 mm, a thickness of about 0.99 mm, a refractive index of about 1.54, and Abbe number of about 56.2;

a tenth lens element having an object side surface of a radius of curvature of about −77.8 mm, an image side surface of a radius of curvature of about 3.13 mm, a thickness of about 0.3 mm, a refractive index of about 1.63, and Abbe number of about 23.4;

an eleventh lens element having an object side surface of a radius of curvature of about −7.8 mm, an image side surface of a radius of curvature of about −5.36 mm, a thickness of about 0.49 mm, a refractive index of about 1.63, and Abbe number of about 23.4;

a twelfth lens element having an object side surface of a radius of curvature of about −3.73 mm, an image side surface of a radius of curvature of about −1.73 mm, a thickness of about 0.89 mm, a refractive index of about 1.54, and Abbe number of about 56.2;

a thirteenth lens element having an object side surface of a radius of curvature of about −3.74 mm, an image side surface of a radius of curvature of about 3.35 mm, a thickness of about 0.5 mm, a refractive index of about 1.54, and Abbe number of about 56.2; and a fourteenth lens element having a planar object side surface, a planar image side surface, a thickness of about 0.15 mm, a refractive index of about 1.52, and Abbe number of about 64.1, wherein the optical lens assembly comprises an aperture stop positioned between the eighth lens element and the ninth lens element, wherein the aperture stop is a planar element having a thickness of about 0.25.

Example 11

Figure 15A:
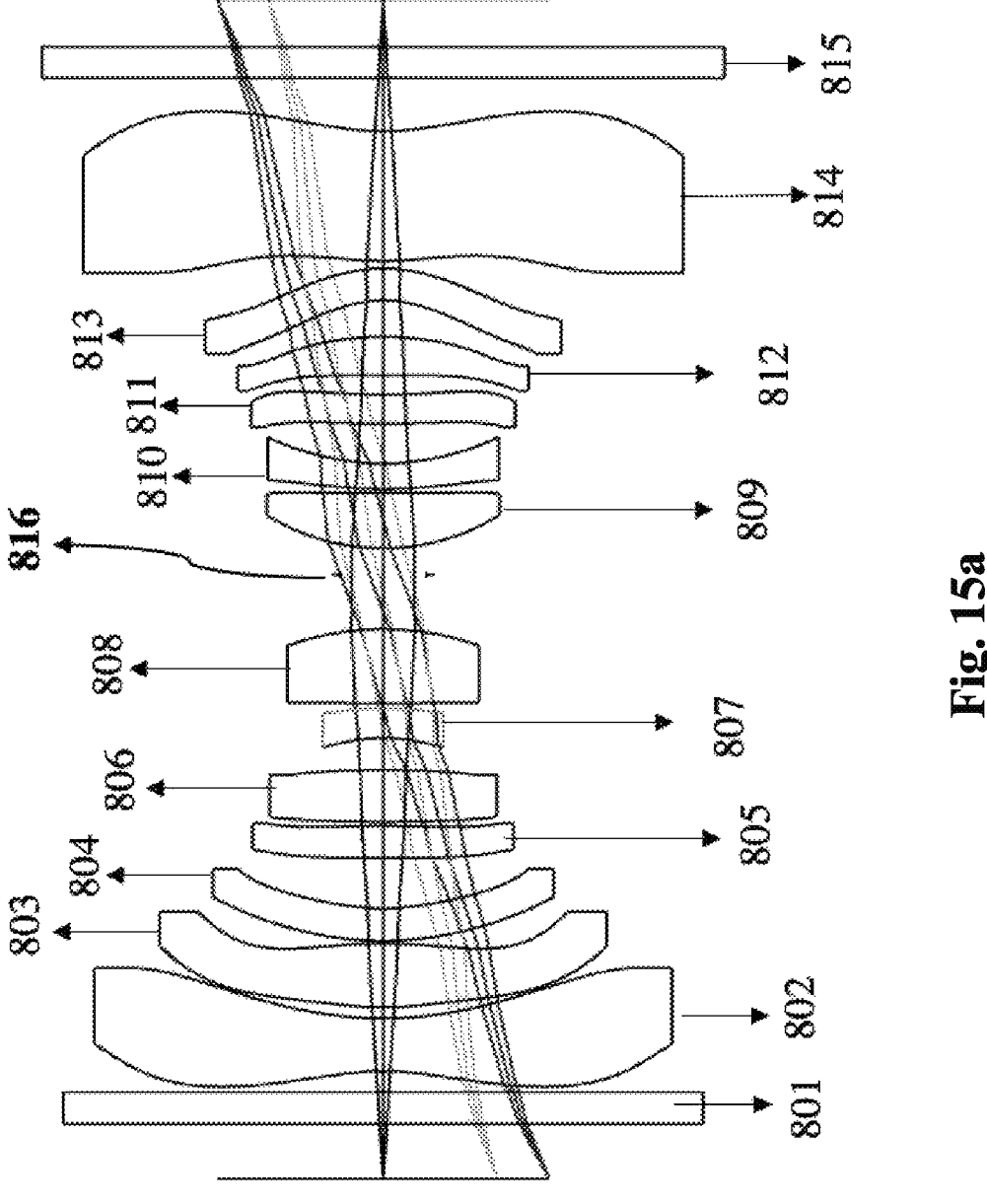

The optical lens assembly [3] in eleventh embodiment comprises fifteen elements which are sequentially arranged from object side to image side. The aperture stop [816] is located between the eighth and ninth lens elements. First eight elements can act as objective assembly. The layout diagram is shown in FIG. 15a.

Figure 15B:
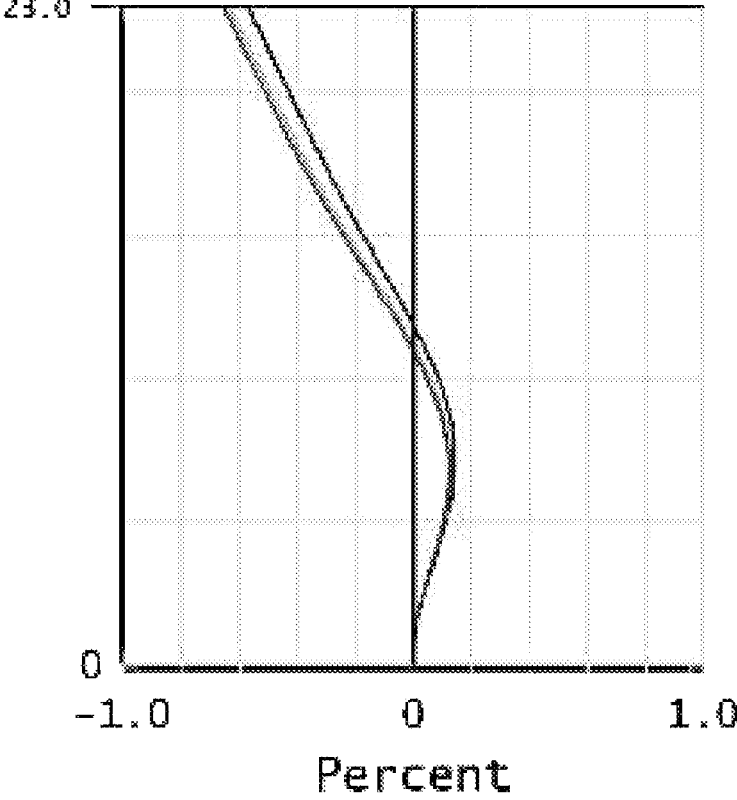
Figure 15C:
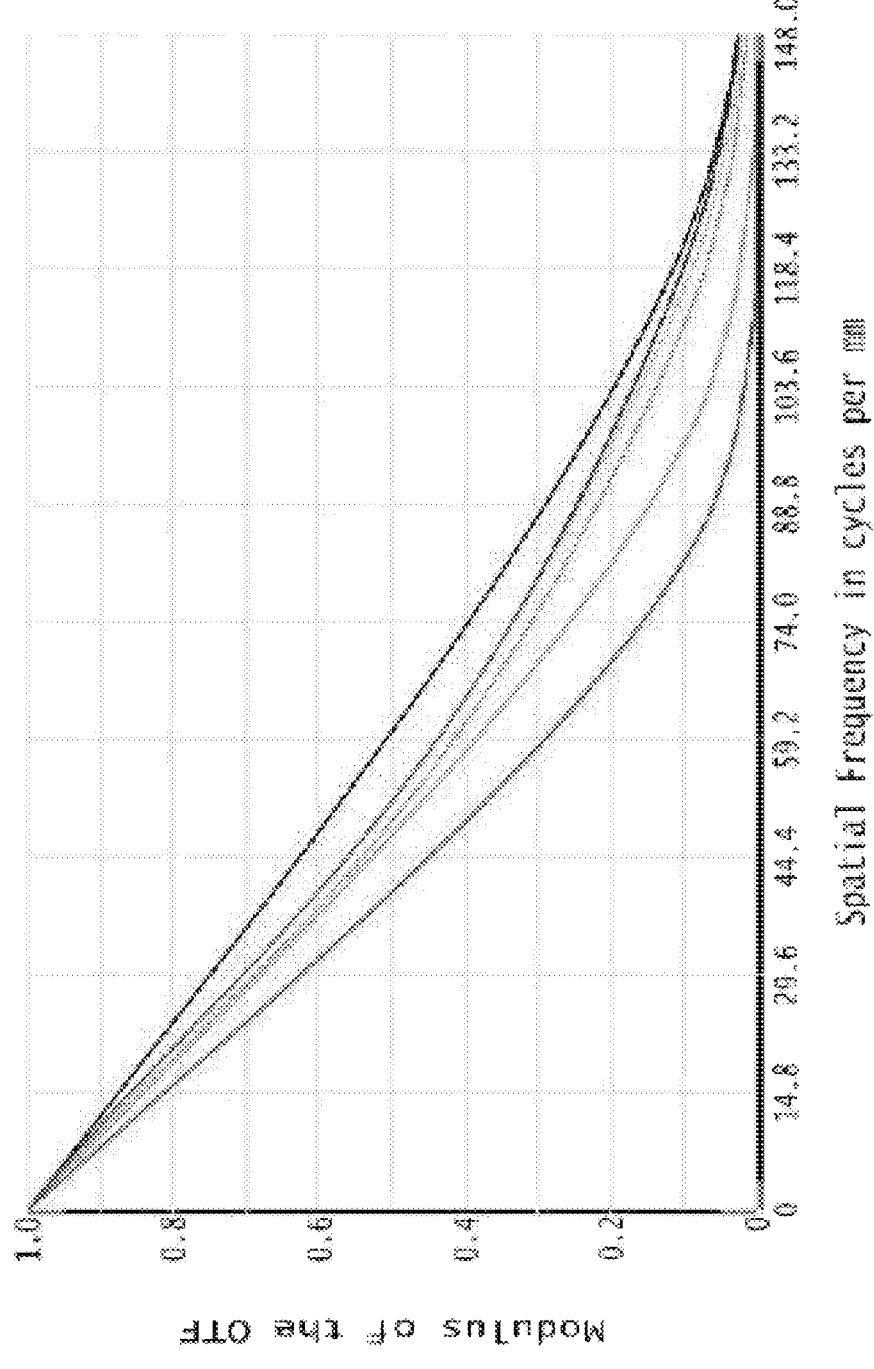

The first lens element [801] is protective layer or filter of glass or plastic or polymer or composite materials having refractive index is greater than 1. The second lens [802] element is having refractive power. The object side surface of the second lens element is concave portion in vicinity of optical axis and convex in the vicinity of a periphery. The image side surface of second lens element is concave portion in vicinity of optical axis. The third lens [803] element is having negative refractive power. The image side surface of the second lens element is Convex portion in vicinity of optical axis, concave portion in a vicinity of a periphery of the lens element and object side surface is Convex surface. The fourth lens [804] element having refractive power. The object side surface of fourth lens element is Convex surface and image side surface is Concave surface. The fifth lens [805] element having refractive power. The sixth lens [806] element is having negative refractive power. Both Object side and image side surface of the sixth lens element are convex surface. The seventh lens [807] element is having positive refractive power. The image side surface of the seventh lens element is convex and object side surface is Concave. The eighth lens [808] element is having positive refractive power. The image side surface of the eighth element is convex on both sides. The nine-lens [809] element has positive refracting power. The object-side surface is a convex surface, and the image-side surface is a concave surface. The tenth lens [810] element has negative refracting power. The image side surface is a concave surface comprising a concave portion in a vicinity of the optical axis. The eleventh lens [811] element has refracting power. The object-side surface is a convex surface near the optical axis. And the image-side surface is a concave surface and is meniscus near the optical axis. The twelve-lens [812] element has refracting power. The object-side surface comprises a concave portion and is meniscus in the vicinity of the optical axis. The image-side surface comprises a convex portion and is meniscus in the vicinity of the optical. The thirteen-lens [813] element has negative refracting power. The object-side surface comprises a concave portion in a vicinity of the optical axis. The image-side surface comprises a convex portion in a vicinity of the optical axis. The fourteenth [814] lens element has refracting power. The object-side surface comprises a convex portion in a vicinity of the optical axis and a concave portion in a vicinity of a periphery of the fifth lens element. The image-side surface comprises a concave portion in a vicinity of the optical axis and a convex portion in a vicinity of a periphery of the fourteenth lens element. The fifteenth [815] element is a filter or IR filter. The optical lens assembly data of eleventh embodiment is shown in Table. 11A and aspheric data is shown in Table. 11B. The distortion plot and MTF plot is shown in FIGS. 15b and 15c. The [3] of eleventh embodiment has:

Magnifications=2×; Numerical aperture=0.044; Focal Length=1.1388 mm;

System length=8.046 mm; HFOV=23 degree; Depth of field=78.899 microns;

Airy radius=8.205 microns

TABLE 11A

The optical assembly data for eleventh embodiment

| S. No. | Lens Element Number | Radius of Curvature (mm) | Thickness (mm) of lens element OR air gap (mm) with the previous or next element | Refractive Index | Abbe Number |
|---|---|---|---|---|---|
| 0 | | Infinity | 2.59E−01 | | |
| 1 | 1 | Infinity | 1.50E−01 | 1.52 | 64.2 |
| 2 | | Infinity | 1.00E−01 | | |
| 3 | 2 | −9.70E−01 | 2.50E−01 | 1.53 | 56.2 |
| 4 | | 1.38E+00 | 5.30E−02 | | |
| 5 | 3 | 1.14E+00 | 3.02E−01 | 1.53 | 56.2 |
| 6 | | −1.64E+00 | 1.25E−02 | | |
| 7 | 4 | 1.23E+00 | 1.54E−01 | 1.64 | 23.9 |
| 8 | | 8.62E−01 | 2.40E−01 | | |
| 9 | 5 | −1.40E+02 | 1.50E−01 | 1.53 | 56.2 |
| 10 | | −3.57E+00 | 2.00E−02 | | |
| 11 | 6 | 7.39E+00 | 2.44E−01 | 1.53 | 56.2 |
| 12 | | −5.75E+00 | 1.52E−01 | | |
| 13 | 7 | −6.36E−01 | 1.40E−01 | 1.64 | 23.9 |
| 14 | | −1.16E+00 | 2.20E−02 | | |
| 15 | 8 | 4.19E+00 | 3.53E−01 | 1.53 | 56.2 |
| 16 | | −1.06E+00 | 2.59E−01 | | |
| 17 | Aperture Stop | Infinity | 2.50E−01 | | |
| 18 | 9 | 1.69E+00 | 5.23E−01 | 1.54 | 55.9 |
| 19 | | 4.77E+01 | 3.60E−02 | | |
| 20 | 10 | 3.04E+00 | 2.40E−01 | 1.64 | 23.3 |
| 21 | | 1.69E+00 | 3.80E−01 | | |
| 22 | 11 | 7.91E+00 | 2.74E−01 | 1.54 | 55.9 |
| 23 | | 4.95E+00 | 1.86E−01 | | |
| 24 | 12 | −2.05E+02 | 3.60E−01 | 1.54 | 55.9 |
| 25 | | −2.49E+00 | 3.47E−01 | | |
| 26 | 13 | −8.18E−01 | 3.00E−01 | 1.64 | 23.3 |
| 27 | | −1.15E+00 | 7.20E−02 | | |
| 28 | 14 | 2.29E+00 | 1.23E+00 | 1.54 | 55.9 |
| 29 | | 1.95E+00 | 5.00E−01 | | |
| 30 | 15 | Infinity | 3.00E−01 | 1.52 | 64.2 |
| 31 | | Infinity | 4.49E−01 | | |

TABLE 11B

Aspheric data of eleventh embodiment

| S.No | Conic | order 4 | order 6 | order 8 | order 10 | order 12 | order 14 | order 16 |
|---|---|---|---|---|---|---|---|---|
| 0 | 0.00E+00 | 0.00E+00 | 0.00E+00 | 0.00E+00 | 0.00E+00 | 0.00E+00 | 0.00E+00 | 0.00E+00 |
| 1 | 0.00E+00 | 0.00E+00 | 0.00E+00 | 0.00E+00 | 0.00E+00 | 0.00E+00 | 0.00E+00 | 0.00E+00 |
| 2 | 0.00E+00 | 0.00E+00 | 0.00E+00 | 0.00E+00 | 0.00E+00 | 0.00E+00 | 0.00E+00 | 0.00E+00 |
| 3 | −1.82E+01 | 2.57E−01 | −1.64E−01 | 1.01E−01 | 5.80E−03 | −9.48E−03 | −5.27E−03 | 1.53E−04 |
| 4 | −3.71E+00 | 2.09E−02 | −4.75E−02 | −1.57E−02 | −1.92E−02 | 5.39E−03 | 1.46E−02 | −6.15E−03 |
| 5 | −2.58E+01 | −4.24E−01 | 1.32E+00 | −4.99E−01 | −7.27E−01 | 5.60E−01 | 0.00E+00 | 0.00E+00 |
| 6 | −1.32E+01 | 7.84E−01 | −8.21E−01 | 2.36E+00 | −6.50E−01 | −1.83E+00 | 0.00E+00 | 0.00E+00 |
| 7 | −1.80E+00 | 9.03E−02 | −4.51E−01 | 9.17E−01 | 1.43E−01 | −9.64E−01 | 0.00E+00 | 0.00E+00 |
| 8 | 7.24E−01 | −1.80E+00 | 5.21E+00 | −1.09E+01 | 9.62E+00 | 6.39E+00 | −1.96E+01 | 0.00E+00 |
| 9 | 0.00E+00 | 3.31E−01 | 1.54E+00 | 4.07E−01 | −2.20E+01 | 3.94E+01 | −4.57E+01 | −7.14E−02 |
| 10 | 0.00E+00 | 7.79E−01 | 9.25E−01 | −5.06E−01 | −2.00E+01 | 2.99E+01 | −1.30E−07 | −3.21E−08 |
| 11 | 0.00E+00 | 8.26E−02 | 4.33E−01 | −2.21E+00 | 4.54E+00 | 1.52E+01 | 7.26E−08 | −2.01E−08 |
| 12 | 4.18E+01 | −4.83E−01 | 7.31E−01 | −2.99E+00 | 1.88E+01 | −5.73E+01 | 8.79E+01 | 2.65E−01 |
| 13 | −3.68E+00 | −6.86E−03 | −5.47E−02 | −3.21E+00 | 1.27E+01 | −1.79E+01 | −2.59E+00 | 1.92E−03 |
| 14 | −1.34E+01 | 7.62E−01 | 5.88E−01 | −2.71E+00 | 1.49E+00 | 6.50E+00 | −3.41E+00 | −1.65E−02 |
| 15 | 0.00E+00 | −3.30E−01 | 5.07E−01 | 4.88E−01 | −2.25E+00 | −1.53E+00 | 1.06E+01 | 0.00E+00 |
| 16 | −2.61E−01 | −2.60E−02 | 1.63E−02 | 4.35E−01 | 6.10E−01 | −5.99E+00 | 1.03E+01 | 0.00E+00 |
| 17 | 0.00E+00 | 0.00E+00 | 0.00E+00 | 0.00E+00 | 0.00E+00 | 0.00E+00 | 0.00E+00 | 0.00E+00 |
| 18 | 1.87E−01 | −6.19E−04 | 2.84E−02 | −5.01E−02 | −3.41E−01 | 9.96E−02 | −7.75E−02 | 0.00E+00 |
| 19 | 5.00E+00 | −4.55E−02 | 1.26E−01 | −1.08E−01 | −1.12E−02 | 4.29E−02 | −3.65E−02 | 0.00E+00 |
| 20 | −2.08E+01 | −7.12E−02 | 1.27E−01 | −3.61E−02 | −1.22E−01 | 4.49E−02 | 1.52E−02 | 0.00E+00 |
| 21 | −5.06E+00 | 2.54E−03 | 4.21E−02 | 9.49E−02 | −2.29E−01 | 1.53E−01 | −2.43E−02 | 0.00E+00 |
| 22 | 0.00E+00 | −7.05E−02 | −4.28E−02 | 6.10E−02 | −4.24E−02 | −4.00E−11 | 0.00E+00 | 0.00E+00 |
| 23 | 0.00E+00 | −7.85E−02 | −1.09E−02 | −2.65E−02 | 1.43E−03 | −2.61E−10 | 0.00E+00 | 0.00E+00 |
| 24 | −4.00E+01 | −9.72E−02 | −5.61E−03 | 6.68E−03 | −3.66E−02 | −8.14E−03 | 9.16E−02 | −4.85E−02 |
| 25 | 1.64E+00 | −4.40E−02 | −1.77E−02 | 2.72E−02 | 3.65E−02 | −3.58E−03 | −6.59E−03 | 0.00E+00 |
| 26 | −3.79E+00 | −4.96E−02 | −1.42E−02 | 1.21E−01 | −5.28E−02 | −1.06E−02 | 4.82E−03 | 4.01E−04 |
| 27 | −8.17E−01 | 1.35E−01 | −3.79E−02 | 1.77E−02 | 8.43E−03 | −3.20E−03 | −2.54E−03 | 8.16E−04 |

TABLE 11B-continued

| | Aspheric data of eleventh embodiment | | | | | | |
| S.No | Conic | order 4 | order 6 | order 8 | order 10 | order 12 | order 14 | order 16 |
|---|---|---|---|---|---|---|---|---|
| 28 | −3.16E+01 | −1.28E−01 | 7.01E−02 | −4.19E−02 | 2.10E−02 | −5.90E−03 | 8.22E−04 | −4.49E−05 |
| 29 | −9.11E+00 | −5.19E−02 | 2.04E−02 | −8.27E−03 | 2.25E−03 | −3.85E−04 | 3.66E−05 | −1.43E−06 |
| 30 | 0.00E+00 | 0.00E+00 | 0.00E+00 | 0.00E+00 | 0.00E+00 | 0.00E+00 | 0.00E+00 | 0.00E+00 |
| 31 | 0.00E+00 | 0.00E+00 | 0.00E+00 | 0.00E+00 | 0.00E+00 | 0.00E+00 | 0.00E+00 | 0.00E+00 |

The optical lens assembly of the eleventh embodiment includes:

a first lens element having a planar object side surface, a planar image side surface, a thickness of about 0.15 mm, a refractive index of about 1.52, and Abbe number of about 64.2;

a second lens element having an object side surface of a radius of curvature of about −0.97 mm, an image side surface of a radius of curvature of about 1.38 mm, a thickness of about 0.25 mm, a refractive index of about 1.53, and Abbe number of about 56.2;

a third lens element having an object side surface of a radius of curvature of about 1.14 mm, an image side surface of a radius of curvature of about −1.64 mm, a thickness of about 0.302 mm, a refractive index of about 1.53, and Abbe number of about 56.2;

a fourth lens element having an object side surface of a radius of curvature of about 1.23 mm, an image side surface of a radius of curvature of about 0.862 mm, a thickness of about 0.154 mm, a refractive index of about 1.64, and Abbe number of about 23.9;

a fifth lens element having an object side surface of a radius of curvature of about −140 mm, an image side surface of a radius of curvature of about −3.57 mm, a thickness of about 0.15 mm, a refractive index of about 1.53, and Abbe number of about 56.2;

a sixth lens element having an object side surface of a radius of curvature of about 7.39 mm, an image side surface of a radius of curvature of about −5.75 mm, a thickness of about 0.244 mm, a refractive index of about 1.53, and Abbe number of about 56.2;

a seventh lens element having an object side surface of a radius of curvature of about −0.636 mm, an image side surface of a radius of curvature of about −1.16 mm, a thickness of about 0.14 mm, a refractive index of about 1.64, and Abbe number of about 23.9;

an eighth lens element having an object side surface of a radius of curvature of about 4.19 mm, an image side surface of a radius of curvature of about −1.06 mm, a thickness of about 0.353 mm, a refractive index of about 1.53, and Abbe number of about 56.2;

a ninth lens element having an object side surface of a radius of curvature of about 1.69 mm, an image side surface of a radius of curvature of about 47.7 mm, a thickness of about 0.523 mm, a refractive index of about 1.54, and Abbe number of about 55.9;

a tenth lens element having an object side surface of a radius of curvature of about 3.04 mm, an image side surface of a radius of curvature of about 1.69 mm, a thickness of about 0.24 mm, a refractive index of about 1.64, and Abbe number of about 23.3;

an eleventh lens element having an object side surface of a radius of curvature of about 7.91 mm, an image side surface of a radius of curvature of about 4.95 mm, a thickness of about 0.274 mm, a refractive index of about 1.54, and Abbe number of about 55.9;

a twelfth lens element having an object side surface of a radius of curvature of about −205 mm, an image side surface of a radius of curvature of about −2.49 mm, a thickness of about 0.36 mm, a refractive index of about 1.54, and Abbe number of about 55.9;

a thirteenth lens element having an object side surface of a radius of curvature of about −81.8 mm, an image side surface of a radius of curvature of about −1.15 mm, a thickness of about 0.3 mm, a refractive index of about 1.64, and Abbe number of about 23.3;

a fourteenth lens element having an object side surface of a radius of curvature of about 2.29 mm, an image side surface of a radius of curvature of about 1.95 mm, a thickness of about 1.23 mm, a refractive index of about 1.54, and Abbe number of about 55.9; and a fifteenth lens element having a planar object side surface, a planar image side surface, a thickness of about 0.3 mm, a refractive index of about 1.52, and Abbe number of about 64.2, wherein the optical lens assembly comprises an aperture stop positioned between the eighth lens element and the ninth lens element, wherein the aperture stop is a planar element having a thickness of about 0.25.

Example 12

Figure 16A:
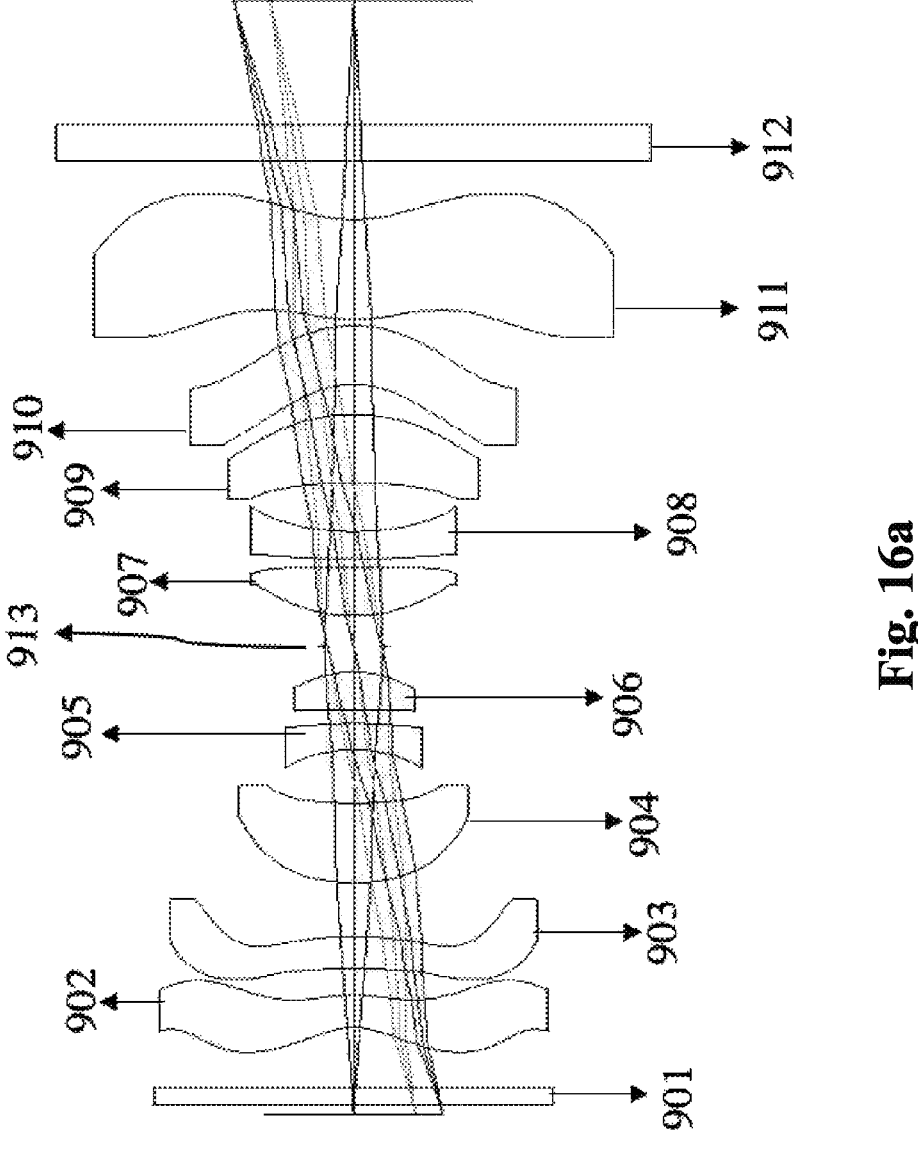

The optical lens assembly [3] in twelfth embodiment comprises twelve elements which are sequentially arranged from object side to image side. The aperture stop [913] is located between the sixth and seventh lens elements. First six elements can act as objective assembly. The layout diagram is shown in FIG. 16a.

Figure 16B:
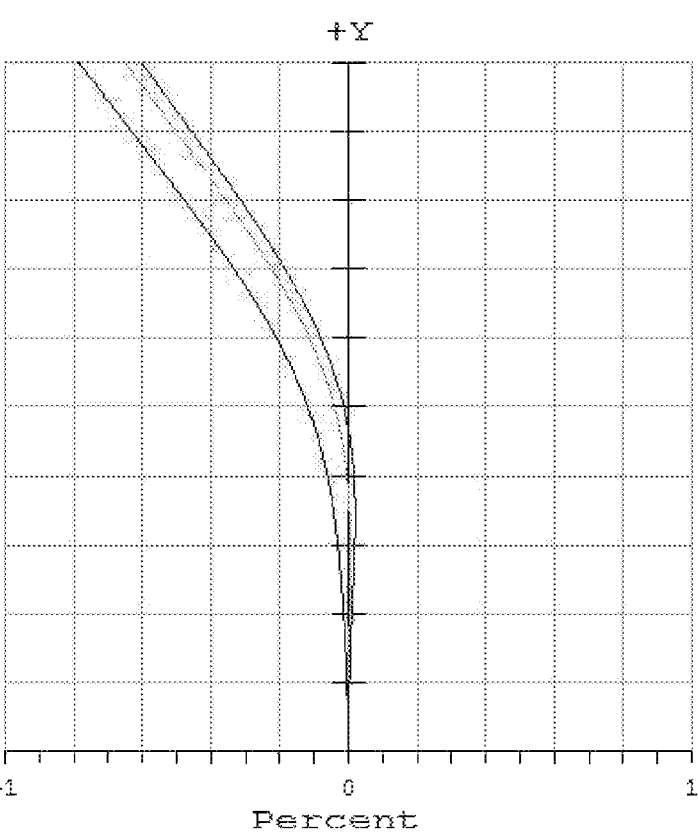
Figure 16C:
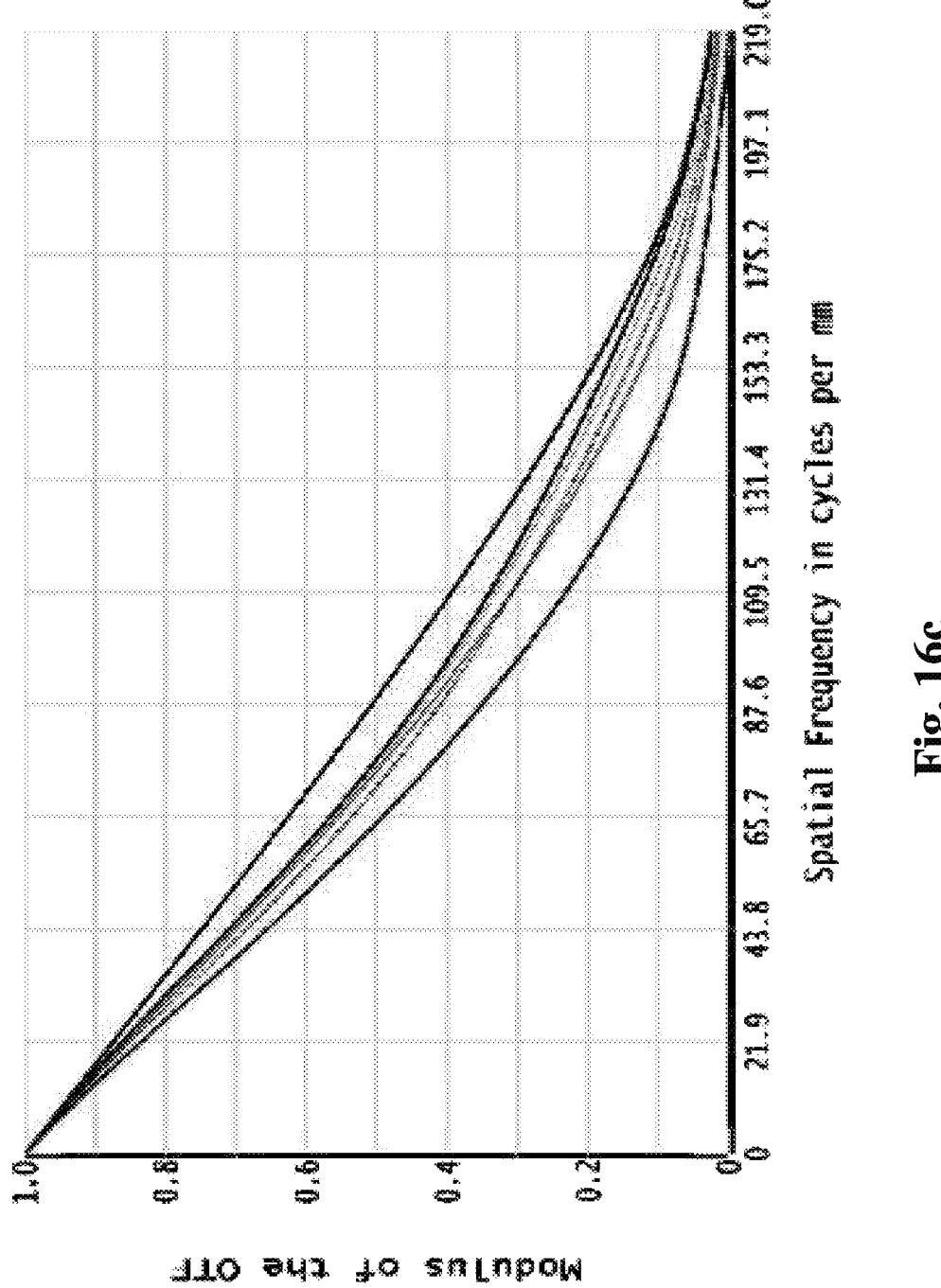

The first lens element [901] is protective layer or filter of glass or plastic or polymer or composite materials having refractive index is greater than 1. The second lens [902] element has refractive power. The object side surface of the second lens element is aspherical and concave surface in vicinity of optical axis and convex surface in vicinity of periphery. The third lens [903] element is aspherical and having a positive refractive power. The object side surface of the third lens element is concave and image side surface is convex in vicinity of optical axis. The fourth lens [904] element is having a positive refractive power. The object side surface of fourth lens element is Convex and image side surface is concave. The fifth lens [905] element is having negative refractive power. The object side surface of the fifth lens element is Concave. The sixth lens [906] element is having positive refractive power. Image side surface of the sixth lens element is convex. However, the first two elements of objective are designed such that they manage the aberrations by other elements in objective. The seventh lens [907] element has positive refracting power. The object-side surface is a convex surface. The eight-lens [908] element has negative refracting power. The object-side surface is a convex surface, and the image-side surface is a concave surface. The nine-lens [909] element has positive refracting power. The object-side surface is a concave surface comprising a concave portion in a vicinity of the optical axis. The image-side surface is a convex in vicinity of optical axis. The tenth lens [910] element has negative refracting power. The object-side surface is a concave surface, and the image-side surface is a convex surface. The eleventh lens [911] element has a refracting power. The object-side surface comprises a convex portion in a vicinity of the optical axis and a concave portion in a vicinity of a periphery of the eleventh lens element. The image-side surface comprises a concave portion in a vicinity of the optical axis and a convex portion in a vicinity of a periphery of the eleventh lens element. Twelfth element [912] is the filter or IR filter. The optical lens assembly data of twelfth embodiment is shown in Table. 12A and aspheric data is shown in Table. 12B. The distortion plot and MTF plot is shown in FIGS. 16*b* and 16*c*. The optical assembly [3] of the twelfth embodiment has:

Magnifications=1×; Numerical aperture=0.066; Focal Length=1.53861 mm;

System length=9.39775 mm; HFOV=20 degree; Depth of field=33.90 microns;

Airy radius=5.56 microns

TABLE 12A

The optical assembly data for twelfth embodiment

| S. No. | Lens Element Number | Radius of Curvature (mm) | Thickness (mm) of lens element OR air gap (mm) with the previous or next element | Refractive Index | Abbe Number |
|---|---|---|---|---|---|
| 0 | | Infinity | 8.30E−02 | | |
| 1 | 1 | Infinity | 1.50E−01 | 1.52 | 64.2 |
| 2 | | Infinity | 5.00E−01 | | |
| 3 | 2 | −1.33E+00 | 2.75E−01 | 1.54 | 55.9 |
| 4 | | −6.20E−01 | 2.22E−01 | | |
| 5 | 3 | −2.00E−02 | 2.75E−01 | 1.54 | 55.9 |
| 6 | | −3.19E−01 | 4.50E−01 | | |
| 7 | 4 | 4.34E−01 | 6.71E−01 | 1.54 | 55.9 |
| 8 | | 1.49E−01 | 4.54E−01 | | |
| 9 | 5 | −7.43E−01 | 2.16E−01 | 1.63 | 23.4 |
| 10 | | −2.71E−01 | 1.16E−01 | | |
| 11 | 6 | −4.00E−02 | 3.22E−01 | 1.54 | 55.9 |
| 12 | | −8.42E−01 | 2.13E−01 | | |
| 13 | Aperture Stop | 0.00E+00 | 2.59E−01 | | |
| 14 | 7 | 5.93E−01 | 4.03E−01 | 1.54 | 56.1 |
| 15 | | 6.03E−03 | 7.70E−02 | | |
| 16 | 8 | 1.30E−01 | 2.30E−01 | 1.64 | 23.3 |
| 17 | | 3.68E−01 | 4.09E−01 | | |
| 18 | 9 | −1.26E−01 | 5.80E−01 | 1.54 | 56.1 |
| 19 | | −5.12E−01 | 2.54E−01 | | |
| 20 | 10 | −1.10E+00 | 4.94E−01 | 1.64 | 23.3 |
| 21 | | −6.93E−01 | 5.20E−02 | | |
| 22 | 11 | 6.00E−01 | 8.42E−01 | 1.54 | 56.1 |
| 23 | | 6.76E−01 | 5.00E−01 | | |
| 24 | 12 | 0.00E+00 | 3.00E−01 | 1.517 | 64.2 |
| 25 | | 0.00E+00 | 1.05E+00 | | |

TABLE 12B

Aspheric data of twelfth embodiment

| S.No | Conic | order 4 | order 6 | order 8 | order 10 | order 12 | order 14 | order 16 |
|---|---|---|---|---|---|---|---|---|
| 0 | 0.00E+00 | 0.00E+00 | 0.00E+00 | 0.00E+00 | 0.00E+00 | 0.00E+00 | 0.00E+00 | 0.00E+00 |
| 1 | 0.00E+00 | 0.00E+00 | 0.00E+00 | 0.00E+00 | 0.00E+00 | 0.00E+00 | 0.00E+00 | 0.00E+00 |
| 2 | 0.00E+00 | 0.00E+00 | 0.00E+00 | 0.00E+00 | 0.00E+00 | 0.00E+00 | 0.00E+00 | 0.00E+00 |
| 3 | −4.76E+00 | 2.40E−01 | −1.49E−01 | 6.75E−02 | −1.10E−02 | −1.65E−03 | 4.50E−04 | 0.00E+00 |
| 4 | −2.00E+01 | 3.47E−01 | −2.03E−01 | 4.53E−02 | −3.76E−03 | 0.00E+00 | 0.00E+00 | 0.00E+00 |
| 5 | −1.00E+00 | −2.35E−01 | 2.27E−01 | −7.31E−02 | 7.79E−03 | 3.82E−04 | 0.00E+00 | 0.00E+00 |
| 6 | −1.99E+00 | 1.34E−02 | 5.28E−02 | 1.71E−02 | −3.85E−04 | −3.40E−03 | 0.00E+00 | 0.00E+00 |
| 7 | 3.10E+00 | 2.09E−01 | −1.74E−01 | 1.56E−01 | −6.09E−02 | 0.00E+00 | 0.00E+00 | 0.00E+00 |
| 8 | −1.00E+00 | 1.93E−01 | −8.90E−02 | 4.01E−01 | −4.69E−01 | 7.93E−03 | 7.20E−01 | −7.34E−01 |
| 9 | −4.45E+00 | 1.59E−02 | −5.96E−01 | 7.15E−01 | −6.86E−01 | 0.00E+00 | 0.00E+00 | 0.00E+00 |
| 10 | −2.00E+01 | 2.86E−01 | −7.29E−01 | 9.35E−01 | −3.45E−01 | 0.00E+00 | 0.00E+00 | 0.00E+00 |
| 11 | −1.00E+00 | 7.85E−02 | −3.96E−01 | 7.37E−01 | −1.03E+00 | 0.00E+00 | 0.00E+00 | 0.00E+00 |
| 12 | 3.40E−02 | −2.01E−02 | −7.40E−02 | 1.45E−01 | 5.13E−01 | −1.27E−02 | 0.00E+00 | 0.00E+00 |
| 13 | 0.00E+00 | 0.00E+00 | 0.00E+00 | 0.00E+00 | 0.00E+00 | 0.00E+00 | 0.00E+00 | 0.00E+00 |
| 14 | −3.37E−01 | 6.14E−03 | 9.04E−03 | −2.16E−02 | 2.27E−02 | −2.81E−02 | 6.64E−03 | −6.60E−03 |
| 15 | 0.00E+00 | −5.30E−03 | −4.06E−02 | 2.14E−02 | −4.85E−02 | 4.50E−02 | −2.59E−03 | 8.88E−03 |
| 16 | 0.00E+00 | −1.74E−02 | −1.77E−02 | 2.22E−02 | −3.67E−02 | −3.22E−02 | 7.15E−02 | −1.85E−02 |
| 17 | −1.95E+00 | 1.43E−02 | 1.01E−02 | 6.00E−02 | −1.13E−01 | 8.13E−02 | 1.76E−02 | −1.75E−02 |
| 18 | 1.28E+01 | −7.43E−02 | −6.88E−03 | 5.88E−02 | −1.05E−01 | 5.02E−02 | −9.33E−03 | 1.59E−02 |
| 19 | −2.94E+01 | −3.63E−01 | 4.11E−01 | −2.96E−01 | 1.50E−01 | −4.73E−02 | −9.06E−03 | 1.08E−02 |
| 20 | −6.57E+00 | −3.22E−01 | 3.02E−01 | −1.73E−02 | −6.57E−02 | −1.57E−02 | 3.50E−02 | −9.88E−03 |
| 21 | −3.74E+00 | −1.50E−01 | 1.02E−01 | −1.39E−02 | 2.37E−03 | −2.86E−03 | 7.57E−04 | −5.47E−05 |
| 22 | −1.41E+01 | −1.46E−01 | 4.38E−02 | −3.63E−03 | −4.38E−04 | 1.03E−04 | −6.37E−06 | 1.16E−07 |
| 23 | −5.52E+00 | −7.82E−02 | 2.38E−02 | −5.50E−03 | 6.72E−04 | −1.31E−05 | −6.90E−06 | 5.82E−07 |
| 24 | 0.00E+00 | 0.00E+00 | 0.00E+00 | 0.00E+00 | 0.00E+00 | 0.00E+00 | 0.00E+00 | 0.00E+00 |
| 25 | 0.00E+00 | 0.00E+00 | 0.00E+00 | 0.00E+00 | 0.00E+00 | 0.00E+00 | 0.00E+00 | 0.00E+00 |

The optical lens assembly of the twelfth embodiment includes:

a first lens element having a planar object side surface, a planar image side surface, a thickness of about 0.15 mm, a refractive index of about 1.52, and Abbe number of about 64.2;

a second lens element having an object side surface of a radius of curvature of about −1.33 mm, an image side surface of a radius of curvature of about −0.62 mm, a thickness of about 0.275 mm, a refractive index of about 1.54, and Abbe number of about 55.9;

a third lens element having an object side surface of a radius of curvature of about −0.02 mm, an image side surface of a radius of curvature of about −0.319 mm, a thickness of about 0.275 mm, a refractive index of about 1.54, and Abbe number of about 55.9;

a fourth lens element having an object side surface of a radius of curvature of about 0.434 mm, an image side surface of a radius of curvature of about 0.149 mm, a thickness of about 0.671 mm, a refractive index of about 1.54, and Abbe number of about 55.9;

surface of a radius of curvature of about −0.693 mm, a thickness of about 0.494 mm, a refractive index of about 1.64, and Abbe number of about 23.3;

an eleventh lens element having an object side surface of a radius of curvature of about 0.6 mm, an image side surface of a radius of curvature of about 0.676 mm, a thickness of about 0.842 mm, a refractive index of about 1.54, and Abbe number of about 56.1; and a twelfth lens element having a planar object side surface, a planar image side surface, a thickness of about 0.3 mm, a refractive index of about 1.517, and Abbe number of about 64.2, wherein the optical lens assembly comprises an aperture stop positioned between the sixth lens element and the seventh lens element, wherein the aperture stop is a planar element having a thickness of about 0.259.

Table 13 tabulates the optical parameters of the twelve example embodiments described herein.

TABLE 13

| | | | | System | Depth of | |
| | | | Optical | length | field | Airy radius |
| Embodiment | HFOV [Degree] | NA | magnification | (mm) | (micron) | (Micron) |
|---|---|---|---|---|---|---|
| | | | Optical parameter of all embodiments | | | |
| 1 | 12.6 | 0.072 | 1× | 12.67 | 103.83 | 4.76 |
| 2 | 12.6 | 0.015 | 7.8× | 56.87 | 68.55 | 23.25 |
| 3 | 30 | 0.025 | 5× | 7.66 | 39.73 | 14.74 |
| 4 | 30 | 0.024 | 6× | 9.03 | 30.17 | 8.28 |
| 5 | 25 | 0.05 | 2× | 7.35 | 58.23 | 7.14 |
| 6 | 13 | 0.059 | 3× | 6.63 | 20.01 | 6.28 |
| 7 | 13 | 0.113 | 1× | 11.30 | 48.39 | 3.25 |
| 8 | 16 | 0.027 | 4× | 8.25 | 51.58 | 13.44 |
| 9 | 16 | 0.054 | 2× | 7.04 | 52.62 | 6.79 |
| 10 | 23 | 0.041 | 1.6× | 10.03 | 337.71 | 8.51 |
| 11 | 23 | 0.044 | 2× | 8.05 | 76.89 | 8.21 |
| 12 | 20 | 0.066 | 1× | 9.39 | 33.90 | 5.56 | a fifth lens element having an object side surface of a radius of curvature of about −0.743 mm, an image side surface of a radius of curvature of about −0.271 mm, a thickness of about 0.216 mm, a refractive index of about 1.63, and Abbe number of about 23.4;

a sixth lens element having an object side surface of a radius of curvature of about −0.04 mm, an image side surface of a radius of curvature of about −0.842 mm, a thickness of about 0.322 mm, a refractive index of about 1.54, and Abbe number of about 55.9;

a seventh lens element having an object side surface of a radius of curvature of about 0.593 mm, an image side surface of a radius of curvature of about 0.00603 mm, a thickness of about 0.403 mm, a refractive index of about 1.54, and Abbe number of about 56.1;

an eighth lens element having an object side surface of a radius of curvature of about 0.13 mm, an image side surface of a radius of curvature of about 0.368 mm, a thickness of about 0.23 mm, a refractive index of about 1.64, and Abbe number of about 23.3;

a ninth lens element having an object side surface of a radius of curvature of about −0.126 mm, an image side surface of a radius of curvature of about −0.512 mm, a thickness of about 0.58 mm, a refractive index of about 1.54, and Abbe number of about 56.1;

a tenth lens element having an object side surface of a radius of curvature of about −1.1 mm, an image side In an example, a portable imaging system includes an optical microscopy device as described in the description herein. The portable imaging system is one of a smartphone, a portable computing device, a portable medical device, a portable microscope, and a portable analytical instrument.

We claim:

1. An optical microscopy device for a portable imaging system, the optical microscopy device comprising:

an optical lens assembly with eight to fifteen lens elements, wherein the optical lens assembly has:

a first lens element having a planar object side surface and a planar image side surface;

an optical magnification in a range of about 1× to about 7.8×;

an airy radius in a range of about 3 microns to about 23.25 microns;

a depth of field in a range of about 20 microns to about 338 microns;

a numerical aperture in a range of about 0.015 to about 0.115;

a half field of view in a range of about 12 degrees to about 30 degrees; and a length in a range of about 6.5 millimeter (mm) to about 57 mm.

2. The optical microscopy device as claimed in claim 1, the optical microscopy device comprising a focusing unit having a barrel, wherein the optical lens assembly is disposed within the barrel of the focusing unit, and wherein the focusing unit is to operate the optical lens assembly for focusing while imaging an object.

3. The optical microscopy device as claimed in claim 1, the optical microscopy device comprising a light guiding unit to pass light of a specific wavelength therethrough.

4. The optical microscopy device as claimed in claim 3, wherein the light guiding element is the first lens element of the optical lens assembly configured as a wavelength specific optical filter.

5. The optical microscopy device as claimed in claim 3, wherein the light guiding element is a wavelength specific optical filter positioned:

between the first lens element and a second lens element of the optical lens assembly; or in front of the first lens element; or after the last lens element of the optical lens assembly; or between an adjacent pair of lens elements of the optical lens assembly.

6. The optical microscopy device as claimed in claim 1, the optical microscopy device comprising a light source placed adjacent to the optical lens assembly to emit light such that the emitted light is incident on a sample held within a sample holder, when the sample holder is placed over the optical lens assembly.

7. The optical microscopy device as claimed in claim 1, the optical microscopy device comprising an image capturing unit adjacent to the optical lens assembly to image an object in field of view of the optical lens assembly, wherein the image capturing unit is a photo sensor or a camera with a pixel size in a range of 0.3 megapixel (MP) to 350 MP.

8. The optical microscopy device as claimed in claim 1, wherein the optical lens assembly has an optical magnification of about 1×, a numerical aperture of about 0.072, a length of about 12.67 mm, a half field of view of about 12.6 degrees, a depth of field of about 103.83 microns, and an airy radius of about 4.767 microns, wherein the optical lens assembly comprises ten lens elements having:

the first lens element having a thickness of about 0.40 mm, a refractive index of about 1.52, and Abbe number of about 64.2;

a second lens element having an object side surface of a radius of curvature of about 13.10 mm, an image side surface of a radius of curvature of about −1.80 mm, a thickness of about 1.35 mm, a refractive index of about 1.53, and Abbe number of about 55.8;

a third lens element having an object side surface of a radius of curvature of about 1.02 mm, an image side surface of a radius of curvature of about 0.508 mm, a thickness of about 0.345 mm, a refractive index of about 1.63, and Abbe number of about 23.4;

a fourth lens element having an object side surface of a radius of curvature of about 1.28 mm, an image side surface of a radius of curvature of about 5.20 mm, a thickness of about 1.03 mm, a refractive index of about 1.52, and Abbe number of about 52.2;

a fifth lens element having an object side surface of a radius of curvature of about 2.51 mm, an image side surface of a radius of curvature of about −40.70 mm, a thickness of about 0.375 mm, a refractive index of about 1.54, and Abbe number of about 55.9;

a sixth lens element having an object side surface of a radius of curvature of about −3.85 mm, an image side surface of a radius of curvature of about −7.23 mm, a thickness of about 0.315 mm, a refractive index of about 1.63, and Abbe number of about 23.4;

a seventh lens element having an object side surface of a radius of curvature of about −1.54 mm, an image side surface of a radius of curvature of about −1.25 mm, a thickness of about 0.684 mm, a refractive index of about 1.53, and Abbe number of about 55.8;

an eighth lens element having an object side surface of a radius of curvature of about 2.26 mm, an image side surface of a radius of curvature of about 1.29 mm, a thickness of about 0.301 mm, a refractive index of about 1.61, and Abbe number of about 25.6;

a ninth lens element having an object side surface of a radius of curvature of about 1.00 mm, an image side surface of a radius of curvature of about 1.22 mm, a thickness of about 0.627 mm, a refractive index of about 1.53, and Abbe number of about 55.8; and a tenth lens element having a planar object side surface, a planar image side surface, a thickness of about 0.21 mm, a refractive index of about 1.52, and Abbe number of about 66.2, wherein the optical lens assembly comprises an aperture stop positioned between the fourth lens element and the fifth lens element, wherein the aperture stop is a planar element having a thickness of about 0.321.

9. The optical microscopy device as claimed in claim 1, wherein the optical lens assembly has an optical magnification of about 7.8×, a numerical aperture of about 0.015, a length of about 56.87 mm, a half field of view of about 12.6 degrees, a depth of field of about 68.55 microns, and an airy radius of about 23.25 microns, wherein the optical lens assembly comprises eight lens elements having:

the first lens element having a thickness of about 0.40 mm, a refractive index of about 1.517, and Abbe number of about 64.2;

a second lens element having an object side surface of a radius of curvature of about 13.10 mm, an image side surface of a radius of curvature of about −1.80 mm, a thickness of about 1.35 mm, a refractive index of about 1.53, and Abbe number of about 55.8;

a third lens element having an object side surface of a radius of curvature of about 1.02 mm, an image side surface of a radius of curvature of about 0.508 mm, a thickness of about 0.345 mm, a refractive index of about 1.632, and Abbe number of about 23.4;

a fourth lens element having an object side surface of a radius of curvature of about 1.28 mm, an image side surface of a radius of curvature of about 5.20 mm, a thickness of about 1.03 mm, a refractive index of about 1.522, and Abbe number of about 52.2;

a fifth lens element having a first sub-lens element and a second sub-lens element abutting each other, the first sub-lens element having an object side surface of a radius of curvature of about 23.00 mm, an image side surface of a radius of curvature of about 23.00 mm, a thickness of about 10.7 mm, a refractive index of about 1.7433, and Abbe number of about 49.2, and the second sub-lens element having an object side surface of a radius of curvature of about −23.00 mm, an image side surface of a radius of curvature of about 414.00 mm, a thickness of about 3.2 mm, a refractive index of about 1.8466, and Abbe number of about 23.8;

a sixth lens element having an object side surface of a radius of curvature of about −7.59 mm, an image side surface of a radius of curvature of about −8.31 mm, a thickness of about 5.84 mm, a refractive index of about 1.50914, and Abbe number of about 56.4;

a seventh lens element having an object side surface of a radius of curvature of about 12.90 mm, an image side surface of a radius of curvature of about 11.30 mm, a thickness of about 4.96 mm, a refractive index of about 1.50914, and Abbe number of about 56.4;

an eighth lens element having a planar object side surface, a planar image side surface, a thickness of about 6.40 mm, a refractive index of about 1.5168, and Abbe number of about 64.2, wherein the optical lens assembly comprises an aperture stop positioned between the fourth lens element and the fifth lens element, wherein the aperture stop is a planar element having a thickness of about 0.321.

10. The optical microscopy device as claimed in claim 1, wherein the optical lens assembly has an optical magnification of about 5×, a numerical aperture of about 0.025, a length of about 7.66 mm, a half field of view of about 30 degrees, a depth of field of about 39.73 microns, and an airy radius of about 14.74 microns, wherein the optical lens assembly comprises eleven lens elements having:

the first lens element having a thickness of about 0.105 mm, a refractive index of about 1.517, and Abbe number of about 64.2;

a second lens element having an object side surface of a radius of curvature of about –0.284 mm, an image side surface of a radius of curvature of about –0.409 mm, a thickness of about 0.154 mm, a refractive index of about 1.535, and Abbe number of about 56.0;

a third lens element having an object side surface of a radius of curvature of about 1.04 mm, an image side surface of a radius of curvature of about –2.41 mm, a thickness of about 0.293 mm, a refractive index of about 1.544, and Abbe number of about 56.1;

a fourth lens element having an object side surface of a radius of curvature of about 0.837 mm, an image side surface of a radius of curvature of about 0.365 mm, a thickness of about 0.145 mm, a refractive index of about 1.635, and Abbe number of about 23.9;

a fifth lens element having an object side surface of a radius of curvature of about 1.03 mm, an image side surface of a radius of curvature of about –0.75 mm, a thickness of about 0.237 mm, a refractive index of about 1.544, and Abbe number of about 56.1;

a sixth lens element having an object side surface of a radius of curvature of about 1.87 mm, an image side surface of a radius of curvature of about –12.90 mm, a thickness of about 0.99 mm, a refractive index of about 1.545, and Abbe number of about 56.2;

a seventh lens element having an object side surface of a radius of curvature of about –7.78 mm, an image side surface of a radius of curvature of about 3.13 mm, a thickness of about 0.30 mm, a refractive index of about 1.632, and Abbe number of about 23.4;

an eighth lens element having an object side surface of a radius of curvature of about –7.80 mm, an image side surface of a radius of curvature of about –5.36 mm, a thickness of about 0.49 mm, a refractive index of about 1.632, and Abbe number of about 23.4;

a ninth lens element having an object side surface of a radius of curvature of about –3.73 mm, an image side surface of a radius of curvature of about –1.73 mm, a thickness of about 0.89 mm, a refractive index of about 1.545, and Abbe number of about 56.2;

a tenth lens element having an object side surface of a radius of curvature of about –3.74 mm, an image side surface of a radius of curvature of about 3.35 mm, a thickness of about 0.50 mm, a refractive index of about 1.545, and Abbe number of about 56.2; and an eleventh lens element having a planar object side surface, a planar image side surface, a thickness of about 0.15 mm, a refractive index of about 1.516, and Abbe number of about 64.1, wherein the optical lens assembly comprises an aperture stop positioned between the fifth lens element and the sixth lens element, wherein the aperture stop is a planar element having a thickness of about 0.10.

11. The optical microscopy device as claimed in claim 1, wherein the optical lens assembly has an optical magnification of about 6×, a numerical aperture of about 0.024, a length of about 9.03 mm, a half field of view of about 30 degrees, a depth of field of about 30.17 microns, and an airy radius of about 8.28 microns, wherein the optical lens assembly comprises eleven lens elements having:

the first lens element having a thickness of about 0.105 mm, a refractive index of about 1.5167, and Abbe number of about 64.2;

a second lens element having an object side surface of a radius of curvature of about –0.284 mm, an image side surface of a radius of curvature of about –0.409 mm, a thickness of about 0.154 mm, a refractive index of about 1.5348, and Abbe number of about 56.0;

a third lens element having an object side surface of a radius of curvature of about 1.04 mm, an image side surface of a radius of curvature of about –2.41 mm, a thickness of about 0.293 mm, a refractive index of about 1.5441, and Abbe number of about 56.1;

a fourth lens element having an object side surface of a radius of curvature of about 0.837 mm, an image side surface of a radius of curvature of about 0.365 mm, a thickness of about 0.145 mm, a refractive index of about 1.6355, and Abbe number of about 23.9;

a fifth lens element having an object side surface of a radius of curvature of about 1.03 mm, an image side surface of a radius of curvature of about –0.75 mm, a thickness of about 0.237 mm, a refractive index of about 1.5441, and Abbe number of about 56.1;

a sixth lens element having an object side surface of a radius of curvature of about 2.37 mm, an image side surface of a radius of curvature of about 50.00 mm, a thickness of about 0.644 mm, a refractive index of about 1.544, and Abbe number of about 55.9;

a seventh lens element having an object side surface of a radius of curvature of about 7.37 mm, an image side surface of a radius of curvature of about 2.69 mm, a thickness of about 0.432 mm, a refractive index of about 1.632, and Abbe number of about 23.4;

an eighth lens element having an object side surface of a radius of curvature of about –13.40 mm, an image side surface of a radius of curvature of about –4.61 mm, a thickness of about 1.34 mm, a refractive index of about 1.544, and Abbe number of about 55.9;

a ninth lens element having an object side surface of a radius of curvature of about 6.26 mm, an image side surface of a radius of curvature of about 10.0 mm, a thickness of about 0.55 mm, a refractive index of about 1.544, and Abbe number of about 55.9;

a tenth lens element having an object side surface of a radius of curvature of about –3.23 mm, an image side surface of a radius of curvature of about 1.50 mm, a thickness of about 0.55 mm, a refractive index of about 1.544, and Abbe number of about 55.9; and an eleventh lens element having a planar object side surface, a planar image side surface, a thickness of about 0.30 mm, a refractive index of about 1.517, and Abbe number of about 64.2, wherein the optical lens assembly comprises an aperture stop positioned between the fifth lens element and the sixth lens element, wherein the aperture stop is a planar element having a thickness of about 0.05.

12. The optical microscopy device as claimed in claim 1, wherein the optical lens assembly has an optical magnification of about 2×, a numerical aperture of about 0.05, a length of about 7.35 mm, a half field of view of about 25 degrees, a depth of field of about 58.23 microns, and an airy radius of about 7.14 microns, wherein the optical lens assembly comprises twelve lens elements having:

the first lens element having a thickness of about 0.105 mm, a refractive index of about 1.52, and Abbe number of about 64.2;

a second lens element having an object side surface of a radius of curvature of about −1.70 mm, an image side surface of a radius of curvature of about −2.11 mm, a thickness of about 0.23 mm, a refractive index of about 1.53, and Abbe number of about 55.8;

a third lens element having an object side surface of a radius of curvature of about −2.08 mm, an image side surface of a radius of curvature of about −1.37 mm, a thickness of about 0.187 mm, a refractive index of about 1.53, and Abbe number of about 55.8;

a fourth lens element having an object side surface of a radius of curvature of about 1.53 mm, an image side surface of a radius of curvature of about 1.28 mm, a thickness of about 0.292 mm, a refractive index of about 1.53, and Abbe number of about 55.8;

a fifth lens element having an object side surface of a radius of curvature of about 0.0897 mm, an image side surface of a radius of curvature of about 0.545 mm, a thickness of about 0.15 mm, a refractive index of about 1.63, and Abbe number of about 23.4;

a sixth lens element having an object side surface of a radius of curvature of about 0.0656 mm, an image side surface of a radius of curvature of about −0.963 mm, a thickness of about 0.202 mm, a refractive index of about 1.54, and Abbe number of about 55.9;

a seventh lens element having an object side surface of a radius of curvature of about 0.481 mm, an image side surface of a radius of curvature of about −0.0328 mm, a thickness of about 0.403 mm, a refractive index of about 1.54, and Abbe number of about 55.9;

an eighth lens element having an object side surface of a radius of curvature of about −0.272 mm, an image side surface of a radius of curvature of about −0.0448 mm, a thickness of about 0.30 mm, a refractive index of about 1.63, and Abbe number of about 23.4;

a ninth lens element having an object side surface of a radius of curvature of about −0.64 mm, an image side surface of a radius of curvature of about −0.763 mm, a thickness of about 0.583 mm, a refractive index of about 1.53, and Abbe number of about 55.8;

a tenth lens element having an object side surface of a radius of curvature of about 0.686 mm, an image side surface of a radius of curvature of about 1.04 mm, a thickness of about 0.373 mm, a refractive index of about 1.53, and Abbe number of about 55.8;

an eleventh lens element having an object side surface of a radius of curvature of about 1.05 mm, an image side surface of a radius of curvature of about 0.849 mm, a thickness of about 0.46 mm, a refractive index of about 1.53, and Abbe number of about 55.8; and a twelfth lens element having a planar object side surface, a planar image side surface, a thickness of about 0.21 mm, a refractive index of about 1.52, and Abbe number of about 64.2, wherein the optical lens assembly comprises an aperture stop positioned between the sixth lens element and the seventh lens element, wherein the aperture stop is a planar element having a thickness of about 0.186.

13. The optical microscopy device as claimed in claim 1, wherein the optical lens assembly has an optical magnification of about 3×, a numerical aperture of about 0.059, a length of about 6.63 mm, a half field of view of about 13 degrees, a depth of field of about 20.01 microns, and an airy radius of about 6.28 microns, wherein the optical lens assembly comprises twelve lens elements having:

the first lens element having a thickness of about 0.075 mm, a refractive index of about 1.517, and Abbe number of about 64.2;

a second lens element having an object side surface of a radius of curvature of about −2.70 mm, an image side surface of a radius of curvature of about −2.40 mm, a thickness of about 0.211 mm, a refractive index of about 1.54, and Abbe number of about 56.1;

a third lens element having an object side surface of a radius of curvature of about 2.77 mm, an image side surface of a radius of curvature of about 4.40 mm, a thickness of about 0.124 mm, a refractive index of about 1.64, and Abbe number of about 23.3;

a fourth lens element having an object side surface of a radius of curvature of about 2.05 mm, an image side surface of a radius of curvature of about 0.505 mm, a thickness of about 0.145 mm, a refractive index of about 1.54, and Abbe number of about 56.1;

a fifth lens element having an object side surface of a radius of curvature of about −1.47 mm, an image side surface of a radius of curvature of about −0.521 mm, a thickness of about 0.0575 mm, a refractive index of about 1.64, and Abbe number of about 23.3;

a sixth lens element having an object side surface of a radius of curvature of about −0.0241 mm, an image side surface of a radius of curvature of about −2.37 mm, a thickness of about 0.161 mm, a refractive index of about 1.54, and Abbe number of about 56.1;

a seventh lens element having an object side surface of a radius of curvature of about 0.481 mm, an image side surface of a radius of curvature of about −0.0328 mm, a thickness of about 0.403 mm, a refractive index of about 1.54, and Abbe number of about 55.9;

an eighth lens element having an object side surface of a radius of curvature of about −0.272 mm, an image side surface of a radius of curvature of about −0.0448 mm, a thickness of about 0.30 mm, a refractive index of about 1.63, and Abbe number of about 23.4;

a ninth lens element having an object side surface of a radius of curvature of about −0.64 mm, an image side surface of a radius of curvature of about −0.763 mm, a thickness of about 0.583 mm, a refractive index of about 1.53, and Abbe number of about 55.8;

a tenth lens element having an object side surface of a radius of curvature of about 0.686 mm, an image side surface of a radius of curvature of about 1.04 mm, a thickness of about 0.373 mm, a refractive index of about 1.53, and Abbe number of about 55.8;

an eleventh lens element having an object side surface of a radius of curvature of about 1.05 mm, an image side surface of a radius of curvature of about 0.849 mm, a thickness of about 0.46 mm, a refractive index of about 1.53, and Abbe number of about 55.8; and a twelfth lens element having a planar object side surface, a planar image side surface, a thickness of about 0.21 mm, a refractive index of about 1.52, and Abbe number of about 64.2, wherein the optical lens assembly comprises an aperture stop positioned between the sixth lens element and the seventh lens element, wherein the aperture stop is a planar element having a thickness of about 0.50.

14. The optical microscopy device as claimed in claim 1, wherein the optical lens assembly has an optical magnification of about 1×, a numerical aperture of about 0.113, a length of about 11.3 mm, a half field of view of about 13 degrees, a depth of field of about 48.39 microns, and an airy radius of about 3.25 microns, wherein the optical lens assembly comprises twelve lens elements having:

the first lens element having a thickness of about 0.30 mm, a refractive index of about 1.517, and Abbe number of about 64.2;

a second lens element having an object side surface of a radius of curvature of about −1.48 mm, an image side surface of a radius of curvature of about −1.67 mm, a thickness of about 0.842 mm, a refractive index of about 1.544, and Abbe number of about 56.114;

a third lens element having an object side surface of a radius of curvature of about 1.44 mm, an image side surface of a radius of curvature of about 0.91 mm, a thickness of about 0.494 mm, a refractive index of about 1.64, and Abbe number of about 23.265;

a fourth lens element having an object side surface of a radius of curvature of about 1.95 mm, an image side surface of a radius of curvature of about 7.92 mm, a thickness of about 0.58 mm, a refractive index of about 1.544, and Abbe number of about 56.114;

a fifth lens element having an object side surface of a radius of curvature of about −2.72 mm, an image side surface of a radius of curvature of about −7.68 mm, a thickness of about 0.23 mm, a refractive index of about 1.64, and Abbe number of about 23.265;

a sixth lens element having an object side surface of a radius of curvature of about −166 mm, an image side surface of a radius of curvature of about −1.69 mm, a thickness of about 0.643 mm, a refractive index of about 1.544, and Abbe number of about 56.114;

a seventh lens element having an object side surface of a radius of curvature of about 1.69 mm, an image side surface of a radius of curvature of about 166 mm, a thickness of about 0.403 mm, a refractive index of about 1.544, and Abbe number of about 56.114;

an eighth lens element having an object side surface of a radius of curvature of about 7.68 mm, an image side surface of a radius of curvature of about 2.72 mm, a thickness of about 0.23 mm, a refractive index of about 1.64, and Abbe number of about 23.265;

a ninth lens element having an object side surface of a radius of curvature of about −7.92 mm, an image side surface of a radius of curvature of about −1.95 mm, a thickness of about 0.58 mm, a refractive index of about 1.544, and Abbe number of about 56.114;

a tenth lens element having an object side surface of a radius of curvature of about −0.91 mm, an image side surface of a radius of curvature of about −1.44 mm, a thickness of about 0.494 mm, a refractive index of about 1.64, and Abbe number of about 23.265;

an eleventh lens element having an object side surface of a radius of curvature of about 1.67 mm, an image side surface of a radius of curvature of about 1.48 mm, a thickness of about 0.842 mm, a refractive index of about 1.544, and Abbe number of about 56.114; and a twelfth lens element having a planar object side surface, a planar image side surface, a thickness of about 0.30 mm, a refractive index of about 1.517, and Abbe number of about 64.2, wherein the optical lens assembly comprises an aperture stop positioned between the sixth lens element and the seventh lens element, wherein the aperture stop is a planar element having a thickness of about 0.50.

15. The optical microscopy device as claimed in claim 1, wherein the optical lens assembly has an optical magnification of about 4×, a numerical aperture of about 0.027, a length of about 8.25 mm, a half field of view of about 16 degrees, a depth of field of about 51.58 microns, and an airy radius of about 13.44 microns, wherein the optical lens assembly comprises twelve lens elements having:

the first lens element having a thickness of about 0.075 mm, a refractive index of about 1.52, and Abbe number of about 64.2;

a second lens element having an object side surface of a radius of curvature of about −2.67 mm, an image side surface of a radius of curvature of about −1.24 mm, a thickness of about 0.138 mm, a refractive index of about 1.54, and Abbe number of about 55.9;

a third lens element having an object side surface of a radius of curvature of about −0.04 mm, an image side surface of a radius of curvature of about −0.639 mm, a thickness of about 0.138 mm, a refractive index of about 1.54, and Abbe number of about 55.9;

a fourth lens element having an object side surface of a radius of curvature of about 0.868 mm, an image side surface of a radius of curvature of about 0.298 mm, a thickness of about 0.335 mm, a refractive index of about 1.54, and Abbe number of about 55.9;

a fifth lens element having an object side surface of a radius of curvature of about −1.49 mm, an image side surface of a radius of curvature of about −0.543 mm, a thickness of about 0.108 mm, a refractive index of about 1.63, and Abbe number of about 23.4;

a sixth lens element having an object side surface of a radius of curvature of about −0.08 mm, an image side surface of a radius of curvature of about −1.68 mm, a thickness of about 0.161 mm, a refractive index of about 1.54, and Abbe number of about 55.9;

a seventh lens element having an object side surface of a radius of curvature of about 0.535 mm, an image side surface of a radius of curvature of about −0.0777 mm, a thickness of about 0.99 mm, a refractive index of about 1.54, and Abbe number of about 56.2;

an eighth lens element having an object side surface of a radius of curvature of about −0.0129 mm, an image side surface of a radius of curvature of about 0.319 mm, a thickness of about 0.30 mm, a refractive index of about 1.63, and Abbe number of about 23.4;

a ninth lens element having an object side surface of a radius of curvature of about −0.128 mm, an image side surface of a radius of curvature of about −0.186 mm, a thickness of about 0.49 mm, a refractive index of about 1.63, and Abbe number of about 23.4;

a tenth lens element having an object side surface of a radius of curvature of about −0.268 mm, an image side surface of a radius of curvature of about −0.579 mm, a thickness of about 0.89 mm, a refractive index of about 1.54, and Abbe number of about 56.2;

an eleventh lens element having an object side surface of
a radius of curvature of about −0.267 mm, an image
side surface of a radius of curvature of about 0.298 mm,
a thickness of about 0.5 mm, a refractive index of about
1.54, and Abbe number of about 56.2; and
a twelfth lens element having a planar object side surface,
a planar image side surface, a thickness of about 0.15
mm, a refractive index of about 1.52, and Abbe number
of about 64.1,
wherein the optical lens assembly comprises an aperture
stop positioned between the sixth lens element and the
seventh lens element, wherein the aperture stop is a
planar element having a thickness of about 0.241.

16. The optical microscopy device as claimed in claim 1,
wherein the optical lens assembly has an optical magnifi-
cation of about 2×, a numerical aperture of about 0.054, a
length of about 7.04 mm, a half field of view of about 16
degrees, a depth of field of about 52.62 microns, and an airy
radius of about 6.79 microns, wherein the optical lens
assembly comprises twelve lens elements having:
the first lens element having a thickness of about 0.075
mm, a refractive index of about 1.52, and Abbe number
of about 64.2;
a second lens element having an object side surface of a
radius of curvature of about −2.67 mm, an image side
surface of a radius of curvature of about −1.24 mm, a
thickness of about 0.138 mm, a refractive index of
about 1.54, and Abbe number of about 55.9;
a third lens element having an object side surface of a
radius of curvature of about −0.04 mm, an image side
surface of a radius of curvature of about −0.639 mm, a
thickness of about 0.138 mm, a refractive index of
about 1.54, and Abbe number of about 55.9;
a fourth lens element having an object side surface of a
radius of curvature of about 0.868 mm, an image side
surface of a radius of curvature of about 0.298 mm, a
thickness of about 0.335 mm, a refractive index of
about 1.54, and Abbe number of about 55.9;
a fifth lens element having an object side surface of a
radius of curvature of about −1.49 mm, an image side
surface of a radius of curvature of about −0.543 mm, a
thickness of about 0.108 mm, a refractive index of
about 1.63, and Abbe number of about 23.4;
a sixth lens element having an object side surface of a
radius of curvature of about −0.08 mm, an image side
surface of a radius of curvature of about −1.68 mm, a
thickness of about 0.161 mm, a refractive index of
about 1.54, and Abbe number of about 55.9;
a seventh lens element having an object side surface of a
radius of curvature of about 0.481 mm, an image side
surface of a radius of curvature of about −0.328 mm, a
thickness of about 0.403 mm, a refractive index of
about 1.54, and Abbe number of about 55.9;
an eighth lens element having an object side surface of a
radius of curvature of about −0.272 mm, an image side
surface of a radius of curvature of about −0.0448 mm,
a thickness of about 0.30 mm, a refractive index of
about 1.63, and Abbe number of about 23.4;
a ninth lens element having an object side surface of a
radius of curvature of about −0.64 mm, an image side
surface of a radius of curvature of about −0.763 mm, a
thickness of about 0.583 mm, a refractive index of
about 1.53, and Abbe number of about 55.8;
a tenth lens element having an object side surface of a
radius of curvature of about 0.686 mm, an image side
surface of a radius of curvature of about 1.04 mm, a thickness of about 0.373 mm, a refractive index of
about 1.53, and Abbe number of about 55.8;
an eleventh lens element having an object side surface of
a radius of curvature of about 1.05 mm, an image side
surface of a radius of curvature of about 0.849 mm, a
thickness of about 0.46 mm, a refractive index of about
1.53, and Abbe number of about 55.8; and
a twelfth lens element having a planar object side surface,
a planar image side surface, a thickness of about 0.21
mm, a refractive index of about 1.52, and Abbe number
of about 64.2,
wherein the optical lens assembly comprises an aperture
stop positioned between the sixth lens element and the
seventh lens element, wherein the aperture stop is a
planar element having a thickness of about 0.241.

17. The optical microscopy device as claimed in claim 1,
wherein the optical lens assembly has an optical magnifi-
cation of about 1.6×, a numerical aperture of about 0.041, a
length of about 10.03 mm, a half field of view of about 23
degrees, a depth of field of about 337.71 microns, and an airy
radius of about 8.51 microns, wherein the optical lens
assembly comprises fourteen lens elements having:
the first lens element having a thickness of about 0.225
mm, a refractive index of about 1.52, and Abbe number
of about 64.2;
a second lens element having an object side surface of a
radius of curvature of about −1.45 mm, an image side
surface of a radius of curvature of about −2.08 mm, a
thickness of about 0.375 mm, a refractive index of
about 1.53, and Abbe number of about 56.2;
a third lens element having an object side surface of a
radius of curvature of about 1.71 mm, an image side
surface of a radius of curvature of about −2.46 mm, a
thickness of about 0.452 mm, a refractive index of
about 1.53, and Abbe number of about 56.2;
a fourth lens element having an object side surface of a
radius of curvature of about 1.84 mm, an image side
surface of a radius of curvature of about 1.29 mm, a
thickness of about 0.231 mm, a refractive index of
about 1.64, and Abbe number of about 56.2;
a fifth lens element having an object side surface of a
radius of curvature of about −209 mm, an image side
surface of a radius of curvature of about −5.36 mm, a
thickness of about 0.225 mm, a refractive index of
about 1.53, and Abbe number of about 23.9;
a sixth lens element having an object side surface of a
radius of curvature of about 1.11 mm, an image side
surface of a radius of curvature of about −8.62 mm, a
thickness of about 0.366 mm, a refractive index of
about 1.52, and Abbe number of about 56.2;
a seventh lens element having an object side surface of a
radius of curvature of about −0.953 mm, an image side
surface of a radius of curvature of about −1.75 mm, a
thickness of about 0.21 mm, a refractive index of about
1.64, and Abbe number of about 23.9;
an eighth lens element having an object side surface of a
radius of curvature of about 6.29 mm, an image side
surface of a radius of curvature of about −1.59 mm, a
thickness of about 0.53 mm, a refractive index of about
1.53, and Abbe number of about 56.2;
a ninth lens element having an object side surface of a
radius of curvature of about 1.87 mm, an image side
surface of a radius of curvature of about −12.9 mm, a
thickness of about 0.99 mm, a refractive index of about
1.54, and Abbe number of about 56.2;
a tenth lens element having an object side surface of a
radius of curvature of about −77.8 mm, an image side surface of a radius of curvature of about 3.13 mm, a thickness of about 0.3 mm, a refractive index of about 1.63, and Abbe number of about 23.4;

an eleventh lens element having an object side surface of a radius of curvature of about −7.8 mm, an image side surface of a radius of curvature of about −5.36 mm, a thickness of about 0.49 mm, a refractive index of about 1.63, and Abbe number of about 23.4;

a twelfth lens element having an object side surface of a radius of curvature of about −3.73 mm, an image side surface of a radius of curvature of about −1.73 mm, a thickness of about 0.89 mm, a refractive index of about 1.54, and Abbe number of about 56.2;

a thirteenth lens element having an object side surface of a radius of curvature of about −3.74 mm, an image side surface of a radius of curvature of about 3.35 mm, a thickness of about 0.5 mm, a refractive index of about 1.54, and Abbe number of about 56.2; and a fourteenth lens element having a planar object side surface, a planar image side surface, a thickness of about 0.15 mm, a refractive index of about 1.52, and Abbe number of about 64.1, wherein the optical lens assembly comprises an aperture stop positioned between the eighth lens element and the ninth lens element, wherein the aperture stop is a planar element having a thickness of about 0.25.

18. The optical microscopy device as claimed in claim 1, wherein the optical lens assembly has an optical magnification of about 2×, a numerical aperture of about 0.044, a length of about 8.05 mm, a half field of view of about 23 degrees, a depth of field of about 76.89 microns, and an airy radius of about 8.21 microns, wherein the optical lens assembly comprises fourteen lens elements having:

the first lens element having a thickness of about 0.15 mm, a refractive index of about 1.52, and Abbe number of about 64.2;

a second lens element having an object side surface of a radius of curvature of about −0.97 mm, an image side surface of a radius of curvature of about 1.38 mm, a thickness of about 0.25 mm, a refractive index of about 1.53, and Abbe number of about 56.2;

a third lens element having an object side surface of a radius of curvature of about 1.14 mm, an image side surface of a radius of curvature of about −1.64 mm, a thickness of about 0.302 mm, a refractive index of about 1.53, and Abbe number of about 56.2;

a fourth lens element having an object side surface of a radius of curvature of about 1.23 mm, an image side surface of a radius of curvature of about 0.862 mm, a thickness of about 0.154 mm, a refractive index of about 1.64, and Abbe number of about 23.9;

a fifth lens element having an object side surface of a radius of curvature of about −140 mm, an image side surface of a radius of curvature of about −3.57 mm, a thickness of about 0.15 mm, a refractive index of about 1.53, and Abbe number of about 56.2;

a sixth lens element having an object side surface of a radius of curvature of about 7.39 mm, an image side surface of a radius of curvature of about −5.75 mm, a thickness of about 0.244 mm, a refractive index of about 1.53, and Abbe number of about 56.2;

a seventh lens element having an object side surface of a radius of curvature of about −0.636 mm, an image side surface of a radius of curvature of about −1.16 mm, a thickness of about 0.14 mm, a refractive index of about 1.64, and Abbe number of about 23.9;

an eighth lens element having an object side surface of a radius of curvature of about 4.19 mm, an image side surface of a radius of curvature of about −1.06 mm, a thickness of about 0.353 mm, a refractive index of about 1.53, and Abbe number of about 56.2;

a ninth lens element having an object side surface of a radius of curvature of about 1.69 mm, an image side surface of a radius of curvature of about 47.7 mm, a thickness of about 0.523 mm, a refractive index of about 1.54, and Abbe number of about 55.9;

a tenth lens element having an object side surface of a radius of curvature of about 3.04 mm, an image side surface of a radius of curvature of about 1.69 mm, a thickness of about 0.24 mm, a refractive index of about 1.64, and Abbe number of about 23.3;

an eleventh lens element having an object side surface of a radius of curvature of about 7.91 mm, an image side surface of a radius of curvature of about 4.95 mm, a thickness of about 0.274 mm, a refractive index of about 1.54, and Abbe number of about 55.9;

a twelfth lens element having an object side surface of a radius of curvature of about −205 mm, an image side surface of a radius of curvature of about −2.49 mm, a thickness of about 0.36 mm, a refractive index of about 1.54, and Abbe number of about 55.9;

a thirteenth lens element having an object side surface of a radius of curvature of about −81.8 mm, an image side surface of a radius of curvature of about −1.15 mm, a thickness of about 0.3 mm, a refractive index of about 1.64, and Abbe number of about 23.3;

a fourteenth lens element having an object side surface of a radius of curvature of about 2.29 mm, an image side surface of a radius of curvature of about 1.95 mm, a thickness of about 1.23 mm, a refractive index of about 1.54, and Abbe number of about 55.9; and a fifteenth lens element having a planar object side surface, a planar image side surface, a thickness of about 0.3 mm, a refractive index of about 1.52, and Abbe number of about 64.2, wherein the optical lens assembly comprises an aperture stop positioned between the eighth lens element and the ninth lens element, wherein the aperture stop is a planar element having a thickness of about 0.25.

19. The optical microscopy device as claimed in claim 1, wherein the optical lens assembly has an optical magnification of about 1×, a numerical aperture of about 0.066, a length of about 9.39 mm, a half field of view of about 20 degrees, a depth of field of about 33.9 microns, and an airy radius of about 5.56 microns, wherein the optical lens assembly comprises twelve lens elements having:

the first lens element having a thickness of about 0.15 mm, a refractive index of about 1.52, and Abbe number of about 64.2;

a second lens element having an object side surface of a radius of curvature of about −1.33 mm, an image side surface of a radius of curvature of about −0.62 mm, a thickness of about 0.275 mm, a refractive index of about 1.54, and Abbe number of about 55.9;

a third lens element having an object side surface of a radius of curvature of about −0.02 mm, an image side surface of a radius of curvature of about −0.319 mm, a thickness of about 0.275 mm, a refractive index of about 1.54, and Abbe number of about 55.9;

a fourth lens element having an object side surface of a radius of curvature of about 0.434 mm, an image side surface of a radius of curvature of about 0.149 mm, a thickness of about 0.671 mm, a refractive index of about 1.54, and Abbe number of about 55.9;

a fifth lens element having an object side surface of a radius of curvature of about −0.743 mm, an image side surface of a radius of curvature of about −0.271 mm, a thickness of about 0.216 mm, a refractive index of about 1.63, and Abbe number of about 23.4;

a sixth lens element having an object side surface of a radius of curvature of about −0.04 mm, an image side surface of a radius of curvature of about −0.842 mm, a thickness of about 0.322 mm, a refractive index of about 1.54, and Abbe number of about 55.9;

a seventh lens element having an object side surface of a radius of curvature of about 0.593 mm, an image side surface of a radius of curvature of about 0.00603 mm, a thickness of about 0.403 mm, a refractive index of about 1.54, and Abbe number of about 56.1;

an eighth lens element having an object side surface of a radius of curvature of about 0.13 mm, an image side surface of a radius of curvature of about 0.368 mm, a thickness of about 0.23 mm, a refractive index of about 1.64, and Abbe number of about 23.3;

a ninth lens element having an object side surface of a radius of curvature of about −0.126 mm, an image side surface of a radius of curvature of about −0.512 mm, a thickness of about 0.58 mm, a refractive index of about 1.54, and Abbe number of about 56.1;

a tenth lens element having an object side surface of a radius of curvature of about −1.1 mm, an image side surface of a radius of curvature of about −0.693 mm, a thickness of about 0.494 mm, a refractive index of about 1.64, and Abbe number of about 23.3;

an eleventh lens element having an object side surface of a radius of curvature of about 0.6 mm, an image side surface of a radius of curvature of about 0.676 mm, a thickness of about 0.842 mm, a refractive index of about 1.54, and Abbe number of about 56.1; and a twelfth lens element having a planar object side surface, a planar image side surface, a thickness of about 0.3 mm, a refractive index of about 1.517, and Abbe number of about 64.2, wherein the optical lens assembly comprises an aperture stop positioned between the sixth lens element and the seventh lens element, wherein the aperture stop is a planar element having a thickness of about 0.259.

20. A portable imaging system comprising an optical microscopy device as claimed in claim 1, wherein the portable imaging system is one of a smartphone, a portable computing device, a portable medical device, a portable microscope, and a portable analytical instrument.

* * * * *